US012453494B1

(12) United States Patent
Goode et al.

(10) Patent No.: US 12,453,494 B1
(45) Date of Patent: Oct. 28, 2025

(54) METHODS AND SYSTEMS FOR MEASURING GLUCOSE HAVING IMPROVED DECAY RATES AND LAG TIMES

(71) Applicant: Glucotrack, Inc., Rutherford, NJ (US)

(72) Inventors: Paul V. Goode, Temple, TX (US); Mark Allan Tapsak, Front Royal, VA (US); James Patrick Thrower, Bethesda, MD (US); Peter Koziar, Jr., Lititz, PA (US)

( * ) Notice: Subject to any disclaimer, the term of this patent is extended or adjusted under 35 U.S.C. 154(b) by 0 days.

(21) Appl. No.: 19/177,166

(22) Filed: Apr. 11, 2025

Related U.S. Application Data

(60) Provisional application No. 63/661,648, filed on Jun. 19, 2024, provisional application No. 63/633,647, filed on Apr. 12, 2024.

(51) Int. Cl.
*A61B 5/1486* (2006.01)
*A61B 5/145* (2006.01)

(52) U.S. Cl.
CPC ...... *A61B 5/14532* (2013.01); *A61B 5/14865* (2013.01)

(58) Field of Classification Search
CPC ............ A61B 5/14532; A61B 5/14865; A61B 5/4839; A61M 5/1723; A61M 2230/201
See application file for complete search history.

(56) References Cited

U.S. PATENT DOCUMENTS

| | | | |
|---|---|---|---|
| 5,395,341 A | 3/1995 | Slater | |
| 6,558,351 B1 | 5/2003 | Steil | |
| 6,702,857 B2 | 3/2004 | Brauker | |
| 6,862,465 B2 | 3/2005 | Shults | |
| 6,931,327 B2 | 8/2005 | Goode, Jr. | |
| 6,954,662 B2 | 10/2005 | Freger | |
| 7,108,778 B2 | 9/2006 | Simpson | |
| 7,134,999 B2 | 11/2006 | Brauker | |
| 7,136,689 B2 | 11/2006 | Shults | |
| 7,192,450 B2 | 3/2007 | Brauker | |
| 7,226,978 B2 | 6/2007 | Tapsak | |
| 7,276,029 B2 | 10/2007 | Goode, Jr. | |
| 7,366,556 B2 | 4/2008 | Brister | |
| 7,379,765 B2 | 5/2008 | Petisce | |

(Continued)

FOREIGN PATENT DOCUMENTS

| | | |
|---|---|---|
| CN | 100546535 C | 10/2009 |
| CN | 102858242 B | 5/2014 |

(Continued)

OTHER PUBLICATIONS

International Search Report for PCT/US22/76435, Jan. 30, 2023.

(Continued)

*Primary Examiner* — Eric J Messersmith
(74) *Attorney, Agent, or Firm* — Novel IP

(57) ABSTRACT

A device for continuously monitoring glucose levels in a patient includes a lead assembly in electrical communication with an electronics assembly. The electronics assembly is configured to be positioned in the subcutaneous tissue and the lead assembly is configured to be positioned in a vessel of the patient, such as in a vein or in an epidural space. The lead assembly has a lumen, and includes at least one electrode in electrical communication with the electronics assembly.

13 Claims, 21 Drawing Sheets

(56) References Cited

U.S. PATENT DOCUMENTS

| | | |
|---|---|---|
| 7,424,318 B2 | 9/2008 | Brister |
| 7,460,898 B2 | 12/2008 | Brister |
| 7,471,972 B2 | 12/2008 | Rhodes |
| 7,583,990 B2 | 9/2009 | Goode, Jr. |
| 7,591,801 B2 | 9/2009 | Brauker |
| 7,599,726 B2 | 10/2009 | Goode, Jr. |
| 7,615,007 B2 | 11/2009 | Shults |
| 7,632,228 B2 | 12/2009 | Brauker |
| 7,657,297 B2 | 2/2010 | Simpson |
| 7,715,893 B2 | 5/2010 | Kamath |
| 7,761,130 B2 | 7/2010 | Simpson |
| 7,778,680 B2 | 8/2010 | Goode, Jr. |
| 7,797,028 B2 | 9/2010 | Goode, Jr. |
| 7,811,763 B2 | 10/2010 | Poli |
| 7,826,981 B2 | 11/2010 | Goode, Jr. |
| 7,828,728 B2 | 11/2010 | Boock |
| 7,860,545 B2 | 12/2010 | Shults |
| 7,885,697 B2 | 2/2011 | Brister |
| 7,896,809 B2 | 3/2011 | Simpson |
| 7,914,450 B2 | 3/2011 | Goode, Jr. |
| 7,917,186 B2 | 3/2011 | Kamath |
| 7,920,906 B2 | 4/2011 | Goode, Jr. |
| 7,925,321 B2 | 4/2011 | Goode, Jr. |
| 7,933,639 B2 | 4/2011 | Goode, Jr. |
| 7,935,057 B2 | 5/2011 | Goode, Jr. |
| 7,955,261 B2 | 6/2011 | Goode |
| 7,959,569 B2 | 6/2011 | Goode |
| 7,976,492 B2 | 7/2011 | Brauker |
| 7,979,104 B2 | 7/2011 | Kamath |
| 7,986,986 B2 | 7/2011 | Goode |
| 7,998,071 B2 | 8/2011 | Goode, Jr. |
| 8,005,525 B2 | 8/2011 | Goode, Jr. |
| 8,010,174 B2 | 8/2011 | Goode, Jr. |
| 8,050,731 B2 | 11/2011 | Tapsak |
| 8,052,601 B2 | 11/2011 | Goode, Jr. |
| 8,053,018 B2 | 11/2011 | Tapsak |
| 8,060,173 B2 | 11/2011 | Goode, Jr. |
| RE43,039 E | 12/2011 | Brister |
| 8,073,519 B2 | 12/2011 | Goode, Jr. |
| 8,073,520 B2 | 12/2011 | Kamath |
| 8,086,323 B2 | 12/2011 | Reghabi |
| 8,118,877 B2 | 2/2012 | Brauker |
| 8,128,562 B2 | 3/2012 | Goode, Jr. |
| 8,150,488 B2 | 4/2012 | Goode, Jr. |
| 8,155,723 B2 | 4/2012 | Shults |
| 8,160,671 B2 | 4/2012 | Kamath |
| RE43,399 E | 5/2012 | Simpson |
| 8,167,801 B2 | 5/2012 | Goode, Jr. |
| 8,195,265 B2 | 6/2012 | Goode, Jr. |
| 8,206,297 B2 | 6/2012 | Kamath |
| 8,229,536 B2 | 7/2012 | Goode, Jr. |
| 8,235,897 B2 | 8/2012 | Gal |
| 8,249,684 B2 | 8/2012 | Kamath |
| 8,255,030 B2 | 8/2012 | Petisce |
| 8,255,032 B2 | 8/2012 | Petisce |
| 8,255,033 B2 | 8/2012 | Petisce |
| 8,277,713 B2 | 10/2012 | Petisce |
| 8,285,354 B2 | 10/2012 | Goode |
| 8,290,562 B2 | 10/2012 | Goode, Jr. |
| 8,292,810 B2 | 10/2012 | Goode, Jr. |
| 8,298,142 B2 | 10/2012 | Simpson |
| 8,332,008 B2 | 12/2012 | Goode |
| 8,346,338 B2 | 1/2013 | Goode, Jr. |
| 8,364,229 B2 | 1/2013 | Simpson |
| 8,364,230 B2 | 1/2013 | Simpson |
| 8,364,231 B2 | 1/2013 | Kamath |
| 8,386,004 B2 | 2/2013 | Kamath |
| 8,396,528 B2 | 3/2013 | Kamath |
| 8,412,301 B2 | 4/2013 | Goode, Jr. |
| 8,425,416 B2 | 4/2013 | Brister |
| 8,428,678 B2 | 4/2013 | Kamath |
| 8,428,679 B2 | 4/2013 | Goode, Jr. |
| 8,435,179 B2 | 5/2013 | Goode, Jr. |
| 8,442,610 B2 | 5/2013 | Goode |
| 8,444,560 B2 | 5/2013 | Hayter |
| 8,449,464 B2 | 5/2013 | Simpson |
| 8,460,231 B2 | 6/2013 | Brauker |
| 8,483,793 B2 | 7/2013 | Simpson |
| 8,491,474 B2 | 7/2013 | Goode, Jr. |
| 8,509,871 B2 | 8/2013 | Rhodes |
| 8,527,026 B2 | 9/2013 | Shults |
| 8,532,730 B2 | 9/2013 | Brister |
| 8,540,648 B2 | 9/2013 | Uihlein |
| 8,548,551 B2 | 10/2013 | Kamath |
| 8,548,553 B2 | 10/2013 | Kamath |
| 8,560,037 B2 | 10/2013 | Goode, Jr. |
| 8,560,038 B2 | 10/2013 | Hayter |
| 8,560,039 B2 | 10/2013 | Simpson |
| 8,565,849 B2 | 10/2013 | Kamath |
| 8,565,867 B2 | 10/2013 | Armstrong |
| 8,571,625 B2 | 10/2013 | Kamath |
| 8,579,816 B2 | 11/2013 | Kamath |
| 8,588,882 B2 | 11/2013 | Kamath |
| 8,600,681 B2 | 12/2013 | Hayter |
| 8,622,905 B2 | 1/2014 | Kamath |
| 8,657,747 B2 | 2/2014 | Kamath |
| 8,672,845 B2 | 3/2014 | Kamath |
| 8,676,287 B2 | 3/2014 | Kamath |
| 8,721,585 B2 | 5/2014 | Brauker |
| 8,761,856 B2 | 6/2014 | Goode, Jr. |
| 8,771,187 B2 | 7/2014 | Goode, Jr. |
| 8,774,888 B2 | 7/2014 | Kamath |
| 8,788,006 B2 | 7/2014 | Kamath |
| 8,788,008 B2 | 7/2014 | Goode, Jr. |
| 8,790,260 B2 | 7/2014 | Goode, Jr. |
| 8,792,955 B2 | 7/2014 | Brister |
| 8,795,177 B2 | 8/2014 | Goode, Jr. |
| 8,801,612 B2 | 8/2014 | Goode |
| 8,808,182 B2 | 8/2014 | Goode, Jr. |
| 8,812,073 B2 | 8/2014 | Goode, Jr. |
| 8,821,400 B2 | 9/2014 | Goode, Jr. |
| 8,840,552 B2 | 9/2014 | Brauker |
| 8,843,187 B2 | 9/2014 | Goode, Jr. |
| 8,862,197 B2 | 10/2014 | Kamath |
| 8,865,249 B2 | 10/2014 | Tapsak |
| 8,880,371 B2 | 11/2014 | Beyer |
| 8,882,741 B2 | 11/2014 | Brauker |
| 8,909,314 B2 | 12/2014 | Petisce |
| 8,909,339 B2 | 12/2014 | Win |
| 8,911,367 B2 | 12/2014 | Brister |
| 8,911,369 B2 | 12/2014 | Brister |
| 8,920,401 B2 | 12/2014 | Brauker |
| 8,923,947 B2 | 12/2014 | Shults |
| 8,926,585 B2 | 1/2015 | Brauker |
| 8,929,968 B2 | 1/2015 | Brister |
| 8,934,975 B2 | 1/2015 | Yaniv |
| 8,948,836 B2 | 2/2015 | Reghabi |
| 8,954,128 B2 | 2/2015 | Boock |
| 9,037,210 B2 | 5/2015 | Simpson |
| 9,050,413 B2 | 6/2015 | Brauker |
| 9,149,219 B2 | 10/2015 | Goode, Jr. |
| 9,155,843 B2 | 10/2015 | Brauker |
| 9,179,869 B2 | 11/2015 | Tapsak |
| 9,220,449 B2 | 12/2015 | Pryor |
| 9,237,864 B2 | 1/2016 | Simpson |
| 9,328,371 B2 | 5/2016 | Rhodes |
| 9,339,222 B2 | 5/2016 | Simpson |
| 9,427,183 B2 | 8/2016 | Goode, Jr. |
| 9,439,589 B2 | 9/2016 | Shults |
| 9,451,908 B2 | 9/2016 | Kamath |
| 9,451,910 B2 | 9/2016 | Brister |
| 9,498,155 B2 | 11/2016 | Brauker |
| 9,532,741 B2 | 1/2017 | Brauker |
| 9,549,699 B2 | 1/2017 | Boock |
| 9,566,026 B2 | 2/2017 | Boock |
| 9,572,523 B2 | 2/2017 | Boock |
| 9,597,027 B2 | 3/2017 | Petisce |
| 9,668,682 B2 | 6/2017 | Brister |
| 9,693,688 B2 | 7/2017 | Sicurello |
| 9,713,446 B2 | 7/2017 | Gal |
| 9,724,045 B1 | 8/2017 | Goode, Jr. |
| 9,737,250 B2 | 8/2017 | Hughes |
| 9,750,441 B2 | 9/2017 | Brauker |
| 9,801,574 B2 | 10/2017 | Tapsak |

(56) References Cited

U.S. PATENT DOCUMENTS

| | | |
|---|---|---|
| 9,804,114 B2 | 10/2017 | Rhodes |
| 9,833,143 B2 | 12/2017 | Brister |
| 9,848,805 B2 | 12/2017 | Dang |
| 9,872,985 B2 | 1/2018 | Butera |
| 9,895,089 B2 | 2/2018 | Goode, Jr. |
| 9,918,668 B2 | 3/2018 | Pryor |
| 9,931,067 B2 | 4/2018 | Shults |
| 9,937,293 B2 | 4/2018 | Brauker |
| 9,949,639 B2 | 4/2018 | Sicurello |
| 9,993,186 B2 | 6/2018 | Petisce |
| 10,028,683 B2 | 7/2018 | Simpson |
| 10,028,684 B2 | 7/2018 | Simpson |
| 10,039,480 B2 | 8/2018 | Brauker |
| 10,154,807 B2 | 12/2018 | Tapsak |
| 10,188,333 B2 | 1/2019 | Kamath |
| 10,194,850 B2 | 2/2019 | Kovatchev |
| 10,238,339 B2 | 3/2019 | Dlugach |
| 10,327,638 B2 | 6/2019 | Brister |
| 10,349,873 B2 | 7/2019 | Kamath |
| 10,376,143 B2 | 8/2019 | Simpson |
| 10,383,575 B2 | 8/2019 | Najafi |
| 10,420,494 B2 | 9/2019 | Simpson |
| 10,561,352 B2 | 2/2020 | Simpson |
| 10,602,968 B2 | 3/2020 | Kamath |
| 10,610,102 B2 | 4/2020 | Brister |
| 10,610,103 B2 | 4/2020 | Brister |
| 10,610,135 B2 | 4/2020 | Kamath |
| 10,610,136 B2 | 4/2020 | Kamath |
| 10,610,137 B2 | 4/2020 | Kamath |
| 10,610,140 B2 | 4/2020 | Petisce |
| 10,617,336 B2 | 4/2020 | Kamath |
| 10,624,539 B2 | 4/2020 | Brister |
| 10,638,962 B2 | 5/2020 | Lucisano |
| 10,674,937 B2 | 6/2020 | Colvin, Jr. |
| 10,709,332 B2 | 7/2020 | Brister |
| 10,709,362 B2 | 7/2020 | Simpson |
| 10,709,364 B2 | 7/2020 | Kamath |
| 10,716,498 B2 | 7/2020 | Kamath |
| 10,743,801 B2 | 8/2020 | Kamath |
| 10,786,185 B2 | 9/2020 | Goode, Jr. |
| 10,827,956 B2 | 11/2020 | Brister |
| 10,835,130 B2 | 11/2020 | Cho |
| 10,856,787 B2 | 12/2020 | Pryor |
| 10,898,113 B2 | 1/2021 | Brauker |
| 10,898,114 B2 | 1/2021 | Kamath |
| 10,908,114 B2 | 2/2021 | Estes |
| 10,918,313 B2 | 2/2021 | Brister |
| 10,918,314 B2 | 2/2021 | Brister |
| 10,918,315 B2 | 2/2021 | Brister |
| 10,918,316 B2 | 2/2021 | Pryor |
| 10,918,317 B2 | 2/2021 | Pryor |
| 10,918,318 B2 | 2/2021 | Pryor |
| 10,925,524 B2 | 2/2021 | Pryor |
| 10,932,700 B2 | 3/2021 | Simpson |
| 10,980,452 B2 | 4/2021 | Simpson |
| 10,993,641 B2 | 5/2021 | Brister |
| 10,993,642 B2 | 5/2021 | Simpson |
| 11,000,213 B2 | 5/2021 | Kamath |
| 11,026,605 B1 | 6/2021 | Simpson |
| 11,045,120 B2 | 6/2021 | Simpson |
| 11,051,726 B2 | 7/2021 | Kamath |
| 11,064,917 B2 | 7/2021 | Simpson |
| 11,160,506 B2 | 11/2021 | Dlugach |
| 11,246,990 B2 | 2/2022 | Brauker |
| 11,247,057 B1 | 2/2022 | Gliner |
| 11,284,816 B2 | 3/2022 | Shah |
| 11,399,745 B2 | 8/2022 | Simpson |
| 11,534,611 B2 | 12/2022 | Baldoni |
| 11,633,133 B2 | 4/2023 | Brister |
| 11,638,541 B2 | 5/2023 | Brauker |
| 11,672,422 B2 | 6/2023 | Brister |
| 11,883,164 B2 | 1/2024 | Kamath |
| 11,892,426 B2 | 2/2024 | Estes |
| 11,896,374 B2 | 2/2024 | Kamath |
| 11,918,354 B2 | 3/2024 | Simpson |
| 11,923,063 B2 | 3/2024 | Georgiou |
| 12,016,648 B2 | 6/2024 | Brister |
| 12,115,357 B2 | 10/2024 | Brauker |
| 12,226,617 B2 | 2/2025 | Brauker |
| 2002/0042630 A1 | 4/2002 | Bardy |
| 2003/0032874 A1 | 2/2003 | Rhodes |
| 2005/0090607 A1 | 4/2005 | Tapsak |
| 2005/0245799 A1 | 11/2005 | Brauker |
| 2006/0015020 A1 | 1/2006 | Neale |
| 2006/0058854 A1 | 3/2006 | Abrams |
| 2006/0068208 A1 | 3/2006 | Tapsak |
| 2006/0258761 A1 | 11/2006 | Boock |
| 2007/0032718 A1 | 2/2007 | Shults |
| 2007/0213611 A1 | 9/2007 | Simpson |
| 2007/0299617 A1 | 12/2007 | Willis |
| 2008/0033260 A1 | 2/2008 | Sheppard |
| 2008/0045824 A1 | 2/2008 | Tapsak |
| 2008/0228054 A1 | 9/2008 | Shults |
| 2009/0062633 A1 | 3/2009 | Brauker |
| 2010/0036225 A1 | 2/2010 | Goode, Jr. |
| 2010/0041971 A1 | 2/2010 | Goode, Jr. |
| 2010/0168542 A1 | 7/2010 | Kamath |
| 2010/0168543 A1 | 7/2010 | Kamath |
| 2010/0168657 A1 | 7/2010 | Kamath |
| 2010/0185071 A1 | 7/2010 | Simpson |
| 2010/0198035 A1 | 8/2010 | Kamath |
| 2010/0198036 A1 | 8/2010 | Kamath |
| 2010/0286496 A1 | 11/2010 | Simpson |
| 2011/0077490 A1 | 3/2011 | Simpson |
| 2011/0124992 A1 | 5/2011 | Brauker |
| 2011/0231140 A1 | 9/2011 | Goode, Jr. |
| 2011/0313543 A1 | 12/2011 | Brauker |
| 2012/0040101 A1 | 2/2012 | Tapsak |
| 2012/0190953 A1 | 7/2012 | Brauker |
| 2012/0258162 A1 | 10/2012 | Tapsak |
| 2012/0271133 A1 | 10/2012 | Gal |
| 2012/0283537 A1 | 11/2012 | Petisce |
| 2013/0237786 A1 | 9/2013 | Goode, Jr. |
| 2014/0088389 A1* | 3/2014 | Simpson ............... C12Q 1/002 600/345 |
| 2015/0219129 A1 | 8/2015 | Gal |
| 2016/0235348 A1 | 8/2016 | Kamath |
| 2016/0354018 A1 | 12/2016 | Brauker |
| 2017/0188923 A1 | 7/2017 | Zou |
| 2017/0191955 A1 | 7/2017 | Zou |
| 2017/0215777 A1 | 8/2017 | Brauker |
| 2017/0231497 A1 | 8/2017 | Brister |
| 2018/0024086 A1 | 1/2018 | Rhodes |
| 2018/0055423 A1 | 3/2018 | Pryor |
| 2018/0160949 A1 | 6/2018 | Brister |
| 2018/0192926 A1 | 7/2018 | Shults |
| 2018/0199873 A1 | 7/2018 | Wang |
| 2018/0317827 A1 | 11/2018 | Brauker |
| 2019/0021596 A1 | 1/2019 | Brister |
| 2019/0069817 A1 | 3/2019 | Brister |
| 2019/0083018 A1 | 3/2019 | Tapsak |
| 2019/0110724 A1 | 4/2019 | Kamath |
| 2019/0239782 A1 | 8/2019 | Shults |
| 2019/0320955 A1 | 10/2019 | Pryor |
| 2019/0320956 A1 | 10/2019 | Pryor |
| 2019/0320957 A1 | 10/2019 | Pryor |
| 2019/0343436 A1 | 11/2019 | Pryor |
| 2020/0155049 A1 | 5/2020 | Pryor |
| 2020/0155050 A1 | 5/2020 | Pryor |
| 2020/0187834 A1 | 6/2020 | Petisce |
| 2020/0352482 A1 | 11/2020 | Gal |
| 2020/0359945 A1 | 11/2020 | Kamath |
| 2020/0359946 A1 | 11/2020 | Kamath |
| 2020/0359947 A1 | 11/2020 | Kamath |
| 2020/0405202 A1 | 12/2020 | Goode, Jr. |
| 2021/0038136 A1 | 2/2021 | Kamath |
| 2021/0045663 A1 | 2/2021 | Simpson |
| 2021/0045665 A1 | 2/2021 | Simpson |
| 2021/0045666 A1 | 2/2021 | Simpson |
| 2021/0045667 A1 | 2/2021 | Kamath |
| 2021/0045669 A1 | 2/2021 | Kamath |
| 2021/0045670 A1 | 2/2021 | Kamath |
| 2021/0100452 A1 | 4/2021 | Brister |
| 2021/0145333 A1 | 5/2021 | Kamath |

(56) References Cited

U.S. PATENT DOCUMENTS

| | | |
|---|---|---|
| 2021/0186381 A1 | 6/2021 | Brister |
| 2021/0251532 A1 | 8/2021 | Simpson |
| 2021/0251533 A1 | 8/2021 | Simpson |
| 2021/0267509 A1 | 9/2021 | Kamath |
| 2021/0290119 A1 | 9/2021 | Simpson |
| 2021/0321914 A1 | 10/2021 | Brister |
| 2021/0369114 A1 | 12/2021 | Brister |
| 2022/0054055 A1 | 2/2022 | Simpson |
| 2022/0054056 A1 | 2/2022 | Simpson |
| 2022/0125357 A1 | 4/2022 | Kamath |
| 2022/0202322 A1* | 6/2022 | Clary ............... A61B 17/3468 |
| 2022/0214300 A1 | 7/2022 | Wang |
| 2023/0079720 A1* | 3/2023 | Goode ............... A61B 5/14865 |
| | | 600/347 |
| 2023/0138407 A1 | 5/2023 | Zou |
| 2023/0139158 A1 | 5/2023 | Zou |
| 2023/0200691 A1 | 6/2023 | Brister |
| 2024/0049997 A1 | 2/2024 | Brister |
| 2024/0057865 A1 | 2/2024 | Brister |
| 2024/0324877 A1 | 10/2024 | Brister |
| 2024/0382093 A1 | 11/2024 | Brister |
| 2025/0032006 A1 | 1/2025 | Brister |

FOREIGN PATENT DOCUMENTS

| | | |
|---|---|---|
| CN | 104116512 B | 5/2017 |
| CN | 107252307 B | 3/2021 |
| EP | 1656065 B1 | 7/2011 |
| EP | 2425770 A | 3/2012 |
| EP | 2129285 B1 | 7/2014 |
| EP | 2563222 B1 | 12/2014 |
| EP | 2967345 B1 | 3/2017 |
| EP | 2767234 B1 | 1/2019 |
| EP | 3485812 B1 | 6/2021 |
| WO | 2005017642 A2 | 2/2005 |
| WO | 2011135562 A2 | 11/2011 |
| WO | 2014141236 A1 | 9/2014 |

OTHER PUBLICATIONS

Written Opinion of the International Searching Authority for PCT/US22/76435, Jan. 30, 2023.
Central Venous Catheterization and Central Venous Pressure Monitoring. Roberts and Hedges' Clinical Procedures in Emergency Medicine and Acute Care [online]. 7th edition. Philadelphia, PA: Elsevier, 2019 [retrieved on Dec. 28, 2022]. Retrieved from the Internet: <URL:https://www.sciencedirect.com/topics/medicine-and-dentitstry/seldinger-technique>.
International Search Report for PCT/US25/24342, Jun. 16, 2025.
Written Opinion of the International Searching Authority for PCT/US25/24342, Jun. 16, 2025.
T.-H. Chou, S. Yu, S. Bose, J. Cook, J. Park and M. L. Johnston, "Wireless, Multi-Sensor System-on-Chip for pH and Amperometry Powered by Body Heat," in IEEE Transactions on Biomedical Circuits and Systems, vol. 17, No. 4, pp. 782-794, Aug. 2023 (Year: 2023).

\* cited by examiner

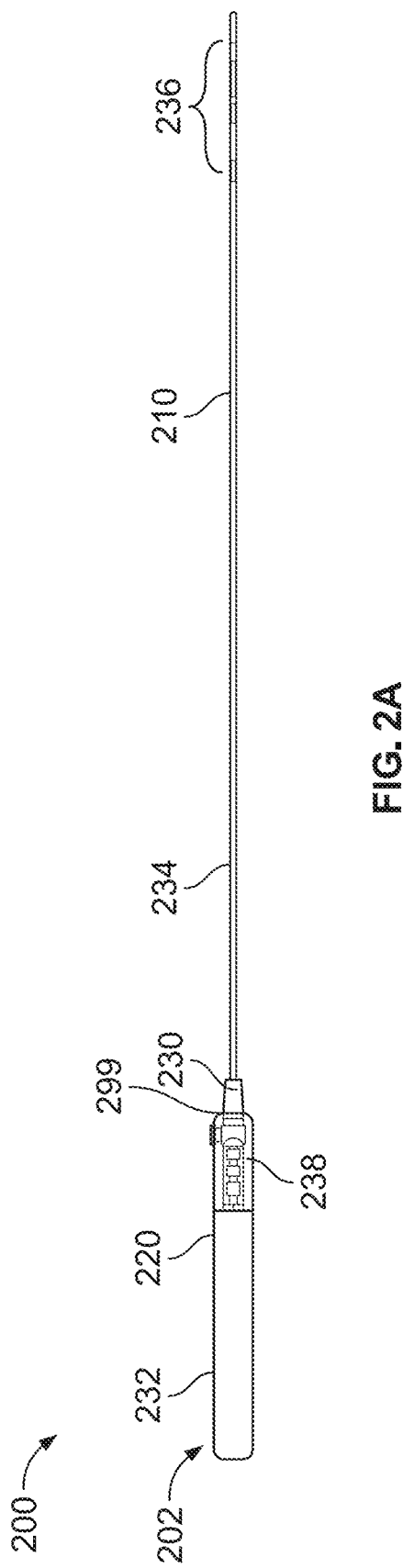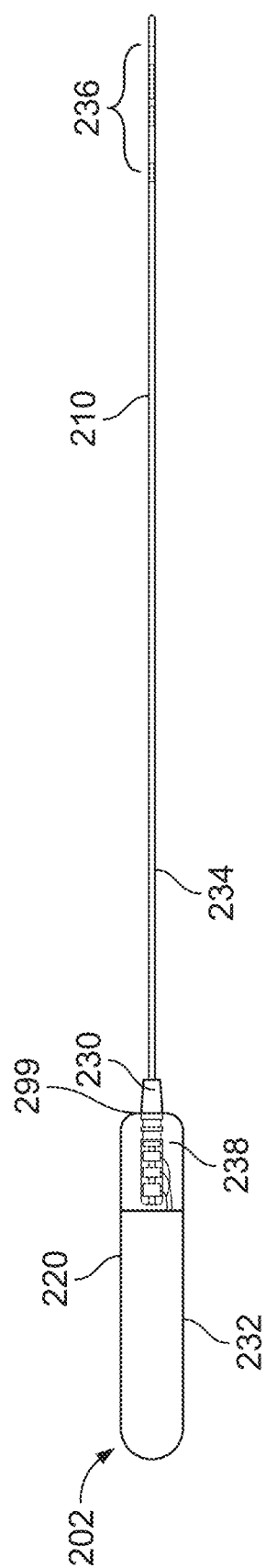
FIG. 2A
FIG. 2B

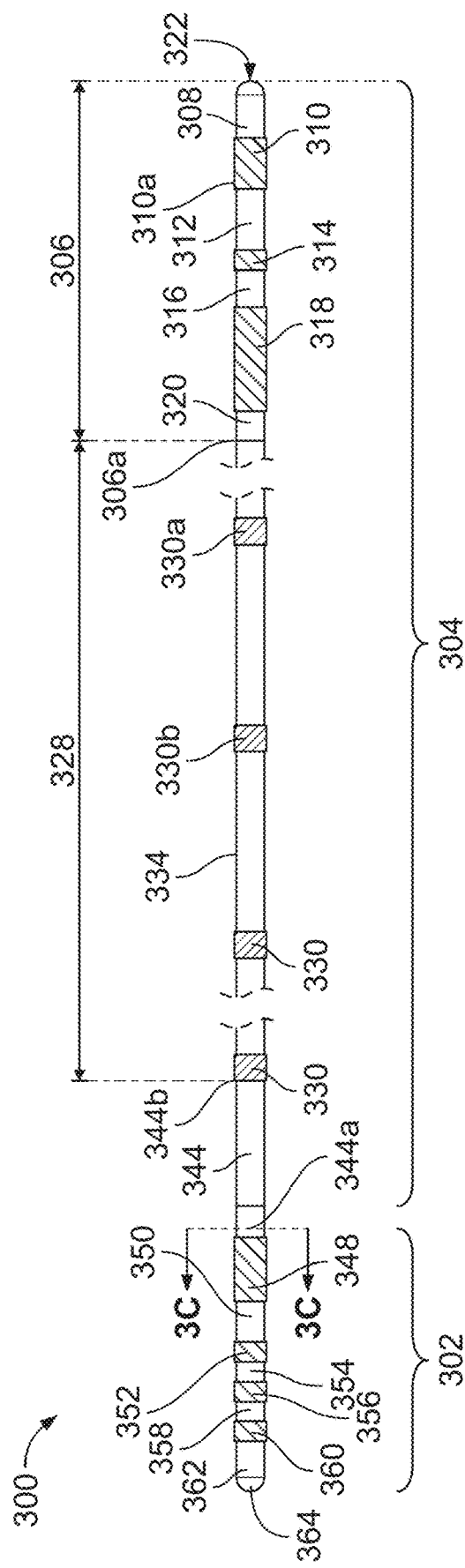
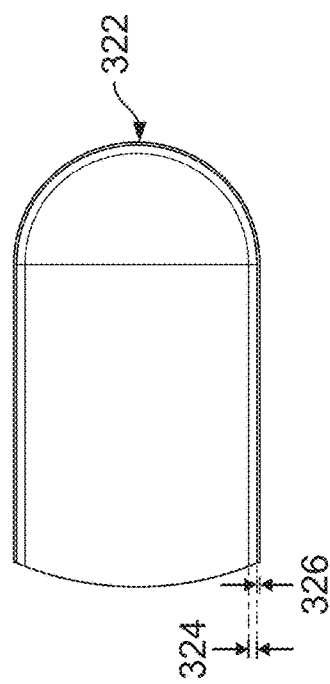
FIG. 3B
FIG. 3D
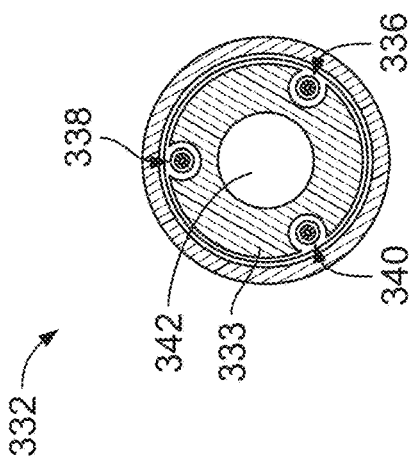
FIG. 3C

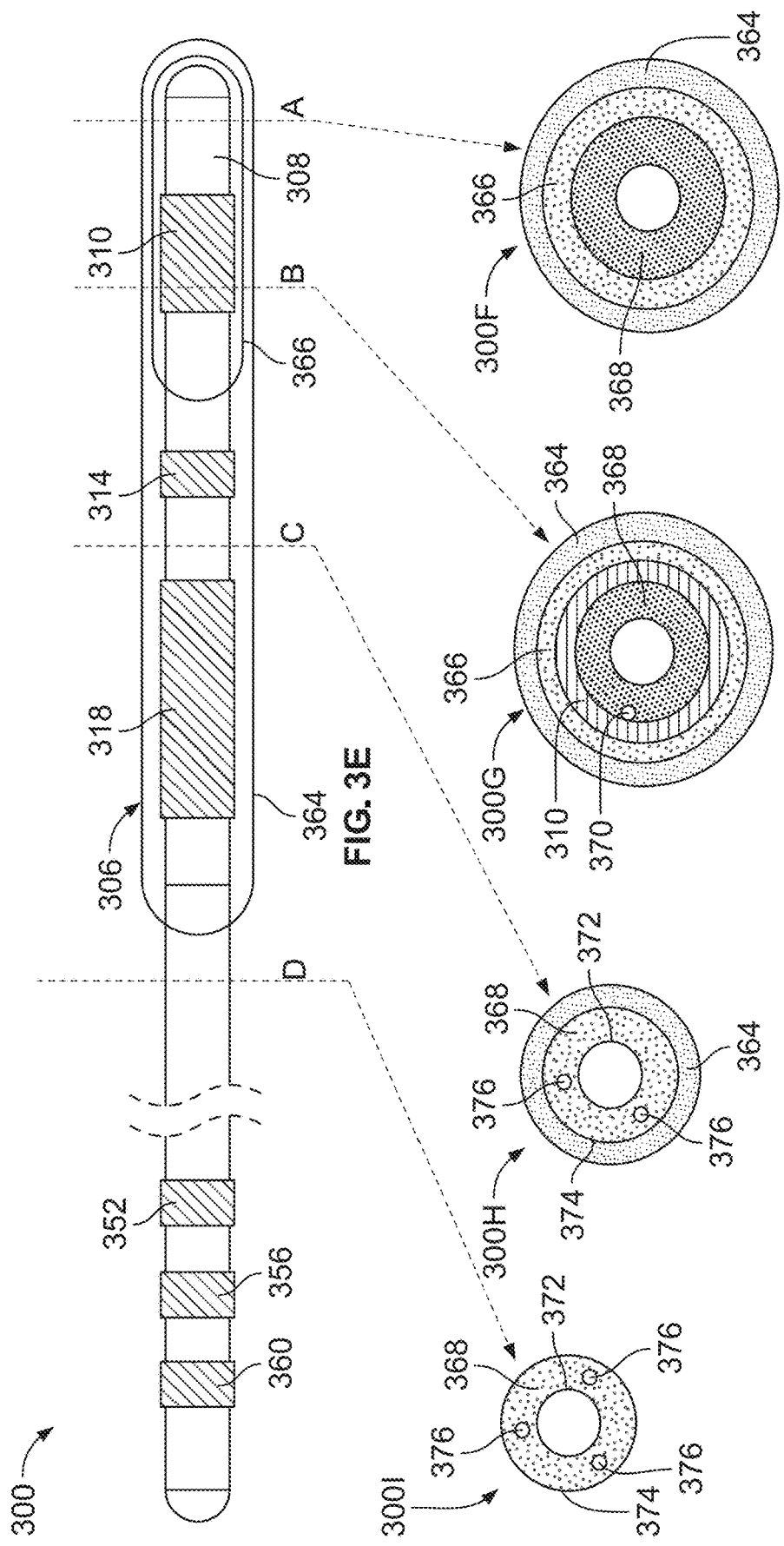

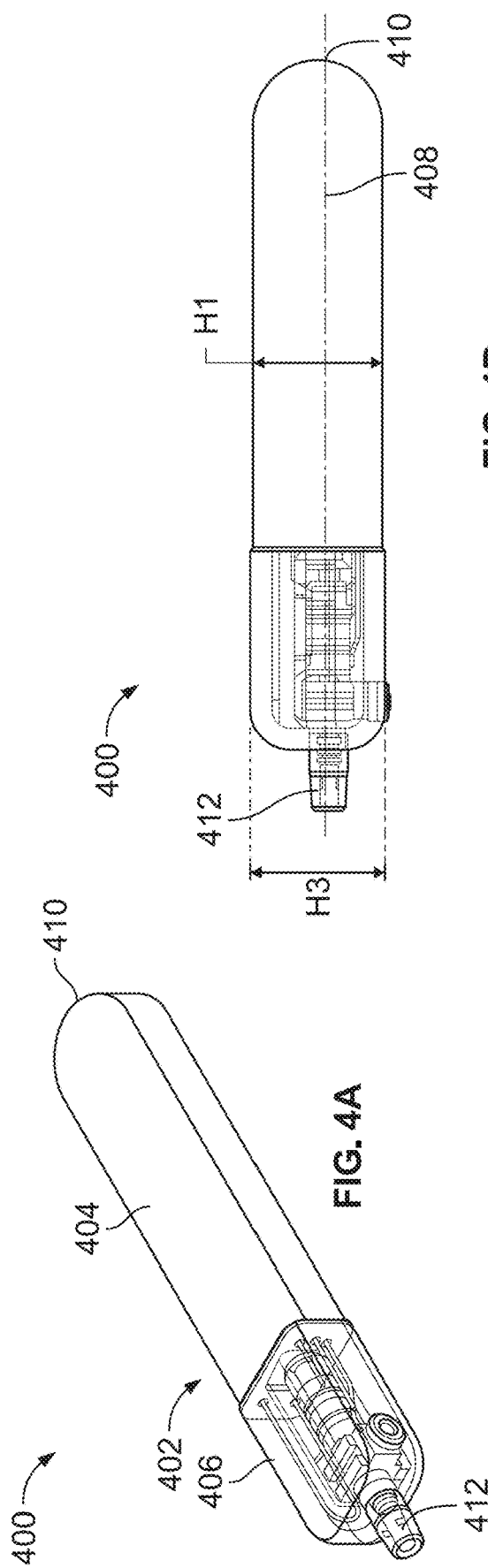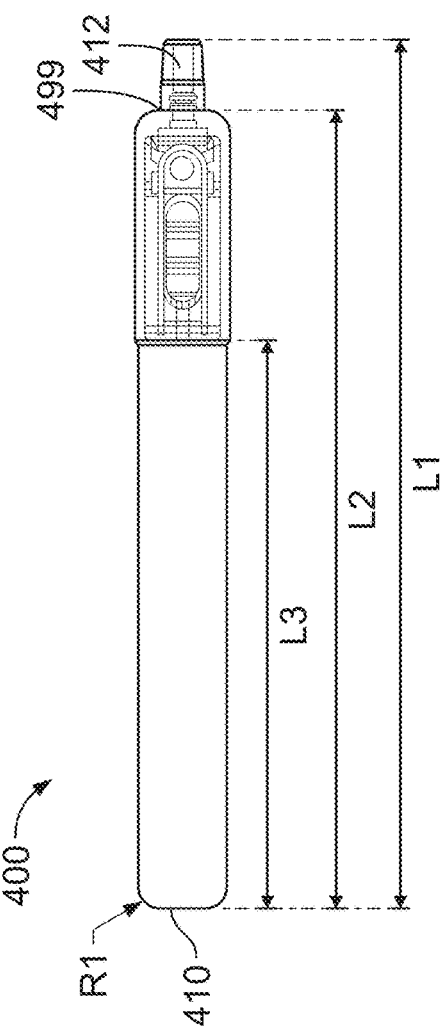
FIG. 4A
FIG. 4B
FIG. 4C

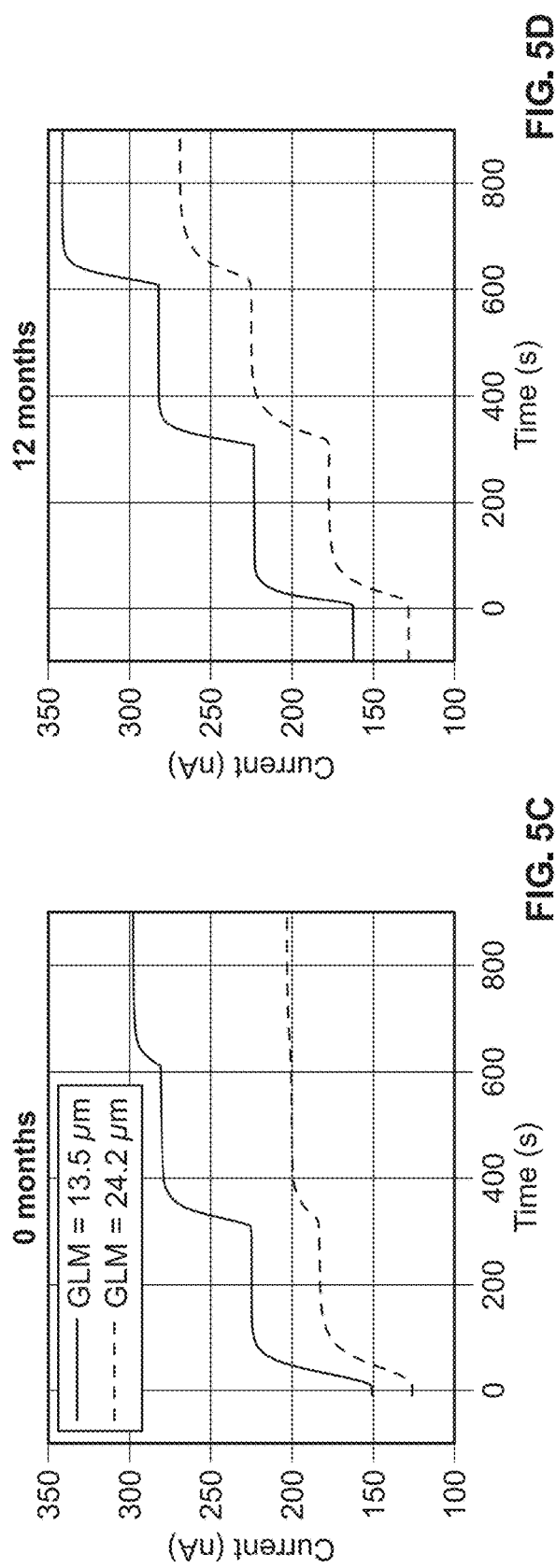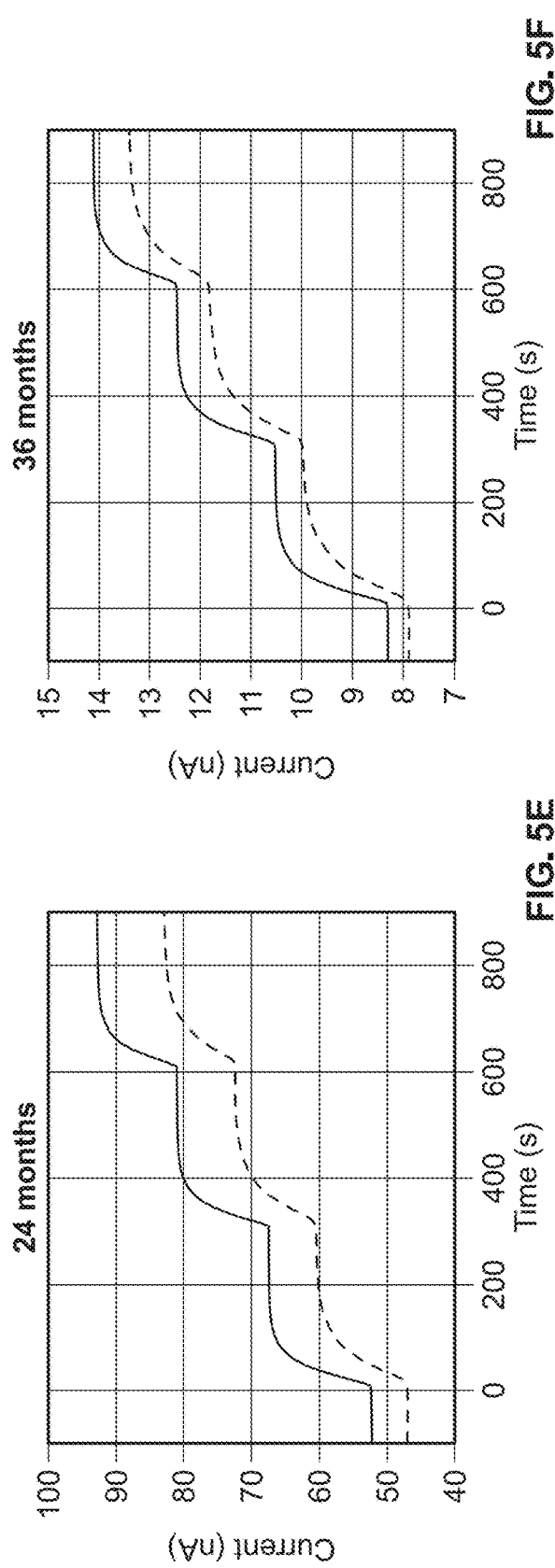

METHODS AND SYSTEMS FOR MEASURING GLUCOSE HAVING IMPROVED DECAY RATES AND LAG TIMES

CROSS-REFERENCE

The present application relies on, for priority, United States Patent Provisional Application No. 63/633,647, titled "Methods and Systems for Continuously Monitoring the Glucose Level of a Patient" and filed on Apr. 12, 2024, and United States Patent Provisional Application No. 63/661,648, titled "Methods and Systems for Continuously Monitoring the Glucose Level of a Patient" and filed on Jun. 19, 2024, both of which are herein incorporated by reference in their entirety.

The present application relates to United States Patent Publication No. 20230079720, titled "Methods and Systems for Continuously Monitoring the Glucose Level of a Patient", published on Mar. 16, 2023 and filed on Sep. 14, 2022, which relies on United States Patent Provisional Application Number 63/261,164, titled "Methods and Systems for Continuously Monitoring the Glucose Level of a Patient" and filed on Sep. 14, 2021, which is herein incorporated by reference in its entirety.

FIELD

The present specification relates to the field of monitoring glucose levels in a patient. Specifically, the embodiments described in the present specification relate to devices and methods for continuously monitoring the glucose level of a patient in a robust and reliable manner.

BACKGROUND

There are many different types of glucose sensors for continuous monitoring of glucose levels. Implantable glucose sensors may be subcutaneous or intravascular. Percutaneous glucose sensors may also be subcutaneous or intravascular. Glucose monitoring may be effectuated using a variety of different sensing modalities, including enzymatic, fluorescence sensing, and optical sensing.

The glucose oxidation reaction is a well-established metric that is used in glucose monitoring. Percutaneous and implantable continuous glucose sensors require sensing elements with a small surface area and volume to prevent insertion pain and wearer discomfort. Smaller size of implantable subcutaneous sensors is especially important because the larger sensor mass and volume not only creates discomfort for the user, but also exacerbates a subcutaneous foreign body response. An increased foreign body response decreases the chances of proper wound healing and of neovascularization, which are necessary to support proper and sufficient diffusion of glucose and oxygen into the sensing element. Conventional implantable intravascular sensors are also limited in size since their sensing elements and some of the supporting electronics are designed to fit within a diameter of a blood vessel without occluding blood flow.

Implementing an implantable continuous glucose monitor (CGM) is additionally challenging due to the deactivation of the enzyme layer over time and sensor drift. For these reasons, among others, CGMs may not be a practical solution for long term glucose monitoring. One of the limitations of reducing the surface area and volume of any glucose sensor is the consequent limit to an amount of a glucose sensing agent that can be incorporated over the sensing element. Examples of sensing agents include glucose oxidase and boronic acid, among other types of agents. The limited ability to incorporate sensing agents over reduced size and volume of a glucose sensing element is further worsened by the degradation of some types of agents over time. As a result of continually degrading presence of the limited amount of a glucose sensing agent, determined by the limited surface area and volume of the sensing element, a sensor output (in the form of a measured current from one or more sensing electrodes) continuously diminishes for a specific amount of glucose concentration. For subcutaneously implanted glucose sensors, the glucose sensing agent degradation problem is further exacerbated by the inflammatory response of macrophages, foreign body giant cells, and fibroblasts, among other bodily elements, which occurs post device implant, as well as a result of any minor physical trauma or injury to the site. The mentioned problems change and/or diminish sensor-tissue interface integrity over time.

Conventional glucose sensors have attempted to overcome these problems by increasing the presence of glucose sensing agents on the sensing elements, resulting in extended life of the sensing agent and the corresponding sensor function. Moreover, sensors using glucose oxidase as the sensing agent, limited further the amount of glucose diffusion to reduce the number of oxidation/reduction cycles while also relatively increasing the enzyme concentration. As such, percutaneous sensors which initially lasted for 2-3 days are now lasting 10-14 days before sensor output becomes inaccurate. However, the diffusion rate can only be decreased to a certain level before sensor measurements (current levels) approach a minimum acceptable signal-to-noise ratio, and clinically relevant diffusion delays occur. This problem may be overcome by increasing the surface area of the sensing element to increase the sensor current level. However, the need to limit the sensor size and volume is important and may otherwise introduce pain and/or discomfort to the user. Additionally, the conventional sensors could not substantially increase membrane thickness to accommodate more glucose oxidase because the resulting increase would lead to diffusion delays resulting in a clinically unacceptable lag time in measured glucose.

Therefore, there is a need for systems and methods for continuously monitoring glucose that overcome the surface area and volume constraints of sensor elements, the problem of glucose sensing agent depletion, and poor signal to noise ratios, as discussed above.

Additionally, there is a need for long term monitoring systems and methods for continuous glucose monitoring that remain powered for operation for a long duration, without the need to charge or recharge the monitoring device. Further there is a need for systems and devices for long term continuous monitoring without excessive loss of sensor response (current), or that with a consistently high signal to noise ratio.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses an enzymatic electrochemical glucose sensor adapted to be at least partially positioned within a fluid-filled lumen of a biological host and configured to generate data indicative of a glucose level of the biological host, comprising: a lead assembly configured to extend into said fluid-filled lumen, wherein the lead assembly comprises at least one electrode and a membrane positioned over the electrode and wherein the at least one electrode is configured to generate a current; and, an electronics assembly, wherein the electronics assembly is configured to connect to a proximal end of the lead assembly and be in electrical communication with the at least one electrode, wherein the current is indicative of the glucose level of the biological host, wherein the current has an amperage decay rate of no greater than 40% over a first year of operation, and wherein the generation of the current has a time delay between when a change in the glucose level of the biological host occurs and when the at least one electrode generates the current in response to the change, said increase being no more than 2 minutes at the end of the first year of operation.

Optionally, the at least one electrode has a surface area in a range of 5 mm$^2$ to 30 mm$^2$ and the membrane positioned over the electrode further comprises an enzyme layer deposited on the electrode surface. Optionally, the surface area of the at least one electrode is between 6 mm$^2$ to 14 mm$^2$. Optionally, the amperage of the current is in a range of 0.5 nA to 5 nA per milligrams per deciliter (mg/dL). Optionally, the amperage of the current is in a range of 42 pA to 420 pA per milligrams per deciliter (mg/dL) in a one mm$^2$ area of the surface of the at least one electrode. Optionally, the enzyme layer comprises glucose oxidase. Optionally, a ratio of a thickness of the membrane to a diameter of the at least one electrode is in a range of 1:10 to 1:50. Optionally, the ratio is in a range of 1:25 to 1:50.

Optionally, the membrane has a thickness of at least 30 microns.

Optionally, the membrane further comprises a glucose limiting membrane (GLM) layer, wherein the GLM layer is positioned over the enzyme layer. Optionally, the membrane has a thickness in a range of 3 microns to 60 microns, wherein the enzyme layer has a thickness of at least 30 microns and the GLM layer has a thickness of at least 10 microns.

Optionally, the amperage decay rate is no greater than 20% over the first year of operation.

Optionally, the time delay between when the change in the glucose level of the biological host occurs and when the at least one electrode generates the current in response to the change is no more than 1 minute during the first year of operation.

Optionally, the increase in the time delay between when the change in the glucose level of the biological host occurs and when the at least one electrode generates the current in response to said change is equal to a first time period at a beginning of the first year of operation, wherein the time between the change in the glucose level of the host and the at least one electrode's generation of the current in response to said change is equal to a second time period after an end of the first year of operation, and wherein the second time period is no more than 10% greater than the first time period.

Optionally, upon initial operation within the biological host, the current has an amperage of at least 120 nA at 200 mg/dL of glucose.

Optionally, the electronics assembly comprises: a potentiostat in electrical communication with the lead assembly, wherein the potentiostat is configured to apply a bias potential to generate the current at the lead assembly, to receive the current from the lead assembly, and to convert the current into an analog voltage signal; and, a digital subassembly configured to receive the analog voltage signal from the potentiostat and to apply a gain to said analog voltage signal to generate an adaptive gain signal. Optionally, the digital subassembly is configured to set the gain to a first level at a start of operating the glucose sensor and to increase the gain to a second level, wherein the second level is higher than the first level, based on the amperage decay rate.

The present specification also discloses a method of determining a glucose level of a biological host using an enzymatic electrochemical glucose sensor adapted to be at least partially positioned within a fluid-filled lumen of the biological host, wherein the enzymatic electrochemical glucose sensor comprises 1) a lead assembly configured to extend into said fluid-filled lumen and having at least one electrode and a membrane positioned over the electrode and 2) an electronics assembly configured to connect to the lead assembly, the method comprising: generating a current using the electrode and the membrane positioned over the electrode, wherein the current is indicative of the glucose level of the biological host, wherein the current has an amperage decay rate of no greater than 40% over a first year of operation, and wherein the generation of the current has an increase in time delay between when a change in the glucose level of the biological host occurs and when the at least one electrode generates the current in response to the change, said increase being no more than 2 minutes over the first year of operation; and receiving the current at the electronics assembly via the lead assembly.

Optionally, the at least one electrode has a surface area in a range of 5 mm$^2$ to 30 mm$^2$ and the membrane comprises an enzyme layer. Optionally, the surface area of the at least one electrode is between 6 mm$^2$ to 14 mm$^2$. Optionally, the amperage of the current is in a range of 0.5 nA to 5 nA per milligrams per deciliter (mg/dL). Optionally, the amperage of the current is in a range of 42 pA to 420 pA per milligrams per deciliter (mg/dL) in a one mm$^2$ area of the surface of the at least one electrode. Optionally, a ratio of a thickness of the membrane to a diameter of the at least one electrode is in a range of 1:10 to 1:50. Optionally, the enzyme layer comprises glucose oxidase and has a thickness ranging from 30 microns to 40 microns. Optionally, the membrane further comprises a glucose limiting membrane (GLM) layer, wherein the GLM layer is positioned over the enzyme layer, and wherein the GLM layer has a thickness in a range of 10 microns to 13 microns.

Optionally, the time delay between when the change in the glucose level of the biological host occurs and when the at least one electrode generates the current in response to the change is no more than 1 minute during the first year of operation.

Optionally, the increase in the time delay between when the change in the glucose level of the biological host occurs and when the at least one electrode generates the current in response to the change is equal to a first time period at a beginning of the first year of operation, wherein the time between the change in the glucose level of the host and when the at least one electrode generates the current in response to the change is equal to a second time period after an end of the first year of operation, and wherein the second time period is no more than 10% greater than the first time period.

Optionally, upon initial operation within the biological host, the current has an amperage of at least 120 nA at 200 mg/dL of glucose.

Optionally, the method further comprises: using a potentiostat in the electronics assembly, applying a continuous bias potential to generate the current at the lead assembly, receiving the current from the lead assembly, and converting the current into an analog voltage signal; and, using a digital subassembly in the electronics assembly, receiving the analog voltage signal and applying a gain to said analog voltage signal to generate an adaptive gain signal. Optionally, the method further comprises: using the digital subassembly to set the gain to a first level at a start of operating the glucose sensor; and, using the digital subassembly to increase the gain to a second level, upon an increase in amperage decay, wherein the second level is higher than the first level.

The present specification also discloses a sensor system adapted to be at least partially positioned in a fluid-filled lumen within a biological host, wherein the fluid-filled lumen is defined by a wall of tissue, comprising: a lead assembly comprising: a lead having a degree of flexibility, wherein the degree of flexibility is at least one of a) a flex modulus in a range of 10 MPa to 2000 MPa and b) a shore hardness in a range of Shore A20 to Shore D75; and, at least one electrode coupled to the lead and a membrane layer positioned on a surface area of the at least one electrode, wherein the at least one electrode is configured to generate a current, wherein the membrane layer comprises an enzyme layer and a glucose limiting layer, and wherein, once implanted, at least a portion of the lead assembly is configured to be submerged within the fluid in the lumen without being physically attached to the wall of tissue such that, during use within the fluid-filled lumen, no more than 20% of the surface area of the at least one electrode is obstructed by the lumen and a loss of flow of fluid around the at least one electrode that is circumscribed by the lumen is not more than 20%; and, an electronics assembly, coupled to a proximal end of the lead.

Optionally, the lead assembly is further configured to be submerged within the fluid in the lumen once implanted such that, during use within the fluid-filled lumen, a loss of amperage of said current due to a reduction in the unobstructed surface area of the at least one electrode does not exceed 10%.

Optionally, the at least one electrode is cylindrical. Optionally, a cross-sectional area of the sensor system is in a range of 0.4% to 10% of a cross-sectional area of the fluid-filled lumen.

Optionally, the lead has a length defined by a distance extending from a distal tip of the lead to a proximal end of the lead where the lead is coupled with the electronics assembly, wherein said length is up to 25 cm.

Optionally, the lead has a diameter in a range from 0.5 mm to 1.5 mm along the length of the lead. Optionally, the length of the lead ranges from 2 cm to 15 cm. Optionally, the length of the lead is less than 20 cm. Optionally, the length of the lead is greater than 2 cm.

Optionally, a weight of the lead is less than 10% of the weight of the electronics assembly.

Optionally, the lead further comprises a pressure sensor positioned on an outer surface of the lead.

Optionally, the at least one electrode is separated from the electronics assembly along the length of the lead by a distance of at least 5 cm.

Optionally, the proximal end of the lead is configured to be detachably coupled to the electronics assembly.

Optionally, the sensor system of claim 1 further comprises a wire adapted to pass through a lumen of the lead and couple to the at least one electrode, wherein the wire is configured to cause the at least one electrode to reside in the fluid-filled lumen such that less than 5% of a surface area of the membrane layer physically contacts the wall of tissue at any moment in time.

Optionally, the flexural modulus ranges from 250 MPa to 1000 MPa, with a shore hardness ranging from D50 to D75.

Optionally, the flexural modulus ranges from 50 MPa to 1000 MPa, with a shore hardness ranging from A70 to D50.

Optionally, the flexural modulus ranges from 10 MPa to 250 MPa, with a shore hardness ranging from A20 to A70.

Optionally, the at least one electrode comprises three electrodes, wherein a first electrode of the three electrodes is a working electrode and is positioned at a first length from a distal end of the lead, wherein a second electrode of the three electrodes is a reference electrode and is positioned at a second length from a proximal side of the first electrode; and, wherein a third electrode of the three electrodes is a counter electrode and is positioned at a third length from a proximal side of the second electrode. Optionally, a surface area of the first electrode ranges from 5 mm$^2$ to 30 mm$^2$.

The present specification also discloses a method of generating a signal indicative of a glucose level of a biological host using a sensor system comprising a lead assembly and an electronics assembly, wherein the lead assembly comprises a lead and at least one electrode coupled to the lead and a membrane layer positioned on a surface area of the at least one electrode, and wherein the membrane layer comprises an enzyme layer and a glucose limiting layer, the method comprising: providing the lead, wherein the lead has a degree of flexibility, wherein the degree of flexibility is at least one of a) a flex modulus in a range of 10 MPa to 2000 Mpa and b) a shore hardness in a range of Shore A20 to Shore D75; causing the lead assembly to be at least partially positioned in a fluid-filled lumen within the biological host, wherein the fluid-filled lumen is defined by a wall of tissue, such that, once implanted, the lead assembly is configured to generate a current and be submerged within the fluid in the lumen without being physically attached to the wall of tissue; limiting an extent of physical contact between the lead assembly and the wall of tissue such that, during use within the fluid-filled lumen, no more than 20% of the surface area of the at least one electrode is obstructed by the lumen and a loss of flow of fluid around the at least one electrode that is circumscribed by the lumen is not more than 20%; and, using the electronics assembly, generating the signal based on the current.

Optionally, a loss of amperage of said current due to a reduction in the unobstructed surface area of the at least one electrode does not exceed 10%.

Optionally, the at least one electrode is cylindrical.

Optionally, a cross-sectional area of the sensor system is in a range of 0.4% to 10% of a cross-sectional area of the fluid-filled lumen.

Optionally, the lead has a length defined by a distance extending from a distal tip of the lead to a proximal end of the lead where the lead detachably connects with the electronics assembly, wherein said length is up to 25 cm. Optionally, the length of the lead ranges from 2 cm to 15 cm. Optionally, the lead has a diameter in a range from 0.5 mm to 1.5 mm along the length of the lead.

Optionally, a weight of the lead is less than 10% of a weight of the electronics assembly.

Optionally, the degree of flexibility of the lead is at least one of: the flexural modulus ranging from 250 MPa to 2000 MPa, with a shore hardness ranging from D50 to D75; the flexural modulus ranging from 50 MPa to 1000 MPa, with a shore hardness ranging from A70 to D50; or, the flexural modulus ranging from 10 MPa to 250 MPa, with a shore hardness ranging from A20 to A70.

Optionally, the at least one electrode comprises two electrodes, wherein a first electrode is a working electrode and is positioned at a first length from a distal end of the lead and wherein a second electrode is a combined reference electrode and counter electrode and is positioned at a second length from a proximal side of the first electrode.

Optionally, the at least one electrode comprises three electrodes, wherein a first electrode of the three electrodes is a working electrode and is positioned at a first length from a distal end of the lead, wherein a second electrode of the three electrodes is a reference electrode and is positioned at a second length from a proximal side of the first electrode; and, wherein a third electrode of the three electrodes is a counter electrode and is positioned at a third length from a proximal side of the second electrode.

The present specification also discloses a glucose sensor adapted to be at least partially positioned within a vessel in a biological host, comprising: a lead assembly comprising a lead that includes at least one electrode having a surface area of at least 5 mm$^2$, wherein a portion of the lead is configured to be positioned within the vessel, wherein said portion has a length that is less than 15 cm, and wherein the lead assembly is configured to generate a current; and, an electronics assembly connected to an end of the lead assembly, positioned at a distance of at least 5 cm from the at least one electrode, wherein the electronics assembly is in electrical communication with the at least one electrode and adapted to receive the current, wherein the electronics assembly comprises a potentiostat in electrical communication with the lead, and wherein the potentiostat is configured to apply a bias potential to the at least one electrode, to receive the current via the lead, and to convert the current into an analog voltage signal.

Optionally, the glucose sensor further comprises a digital subassembly configured to receive the analog voltage signal from the potentiostat and process the analog voltage signal by adaptively applying a gain to the analog voltage signal based on the current or changes to the current and generate a gain adjusted signal that is indicative of a glucose level of the biological host.

Optionally, a diameter of the lead is in a range from 0.5 mm to 3.0 mm.

Optionally, the at least one electrode comprises three electrodes, wherein the first electrode is a working electrode, wherein the second electrode is a reference electrode, and wherein the third electrode is a counter electrode.

Optionally, the at least one electrode comprises two electrodes, wherein the first electrode is a working electrode and wherein the second electrode is a combined reference electrode and counter electrode.

Optionally, a portion of the lead is coated with an enzyme, wherein said portion ranges from 5 mm to 15 mm in length.

Optionally, the glucose sensor further comprises an enzyme layer positioned over the surface area of the at least one electrode and a glucose limiting membrane positioned over the enzyme layer, wherein the enzyme layer has a thickness in a range of 3 microns to 60 microns and comprises glucose oxidase, and wherein the glucose limiting membrane has a thickness ranging from 3 microns to 60 microns.

Optionally, a cross-sectional area of the sensor is in a range of 0.4% to 10% of a cross-sectional area of the vessel.

Optionally, a cross-sectional area of the sensor is in a range of 1% to 3% of a cross-sectional area of the vessel.

Optionally, a cross-sectional area of the sensor does not occupy more than 10% of a cross-sectional area of the vessel.

Optionally, the electronics assembly is adapted to apply a voltage to the at least one electrode.

Optionally, the electronics assembly comprises a digital processing portion separate and distinct from the potentiostat, wherein the digital processing portion further comprises a processor configured to draw power, and wherein a portion of the electronics assembly comprising the potentiostat draws less than 3 microwatts of power above the processing power of the digital processing portion.

Optionally, the electronics assembly comprises an analog subassembly, wherein the potentiostat is part of the analog subassembly, and wherein the analog subassembly is adapted to maintain a specified reference voltage constant to within 300 mV of a set point over a time period greater than 30 seconds without requiring any additional power to maintain said specified reference voltage, and wherein the analog subassembly is configured to adjust a reference voltage using signals of varying duration at voltages higher and lower than the specified reference voltage. Optionally, the analog front end circuitry is adapted using a microcontroller to adjust voltage values on a capacitor to converge to the specified reference voltage over more than one iteration of signal adjustments, wherein a digital-to-analog converter is used to create an analog voltage for the capacitor.

Optionally, the electronics assembly comprises a processor adapted to program the potentiostat to maintain a constant voltage potential at a pre-programmed value. Optionally, said processor is further adapted to modify said programmed value based on at least one predefined criterion.

The present specification also discloses a method of sensing a glucose level of a biological host using a glucose sensor adapted to be at least partially positioned within a vessel in the biological host, comprising: generating a current using a lead assembly comprising a lead that includes at least one electrode having a surface area of at least 5 mm$^2$, wherein a portion of the lead is configured to be positioned within the vessel, and wherein said portion has a length that is less than 15 centimeters; and, processing the current using an electronics assembly connected to an end of the lead assembly, positioned at a distance of at least 5 cm from the at least one electrode, wherein the electronics assembly is in electrical communication with the at least one electrode and adapted to receive the current, wherein the electronics assembly comprises a potentiostat in electrical communication with the lead, and wherein the potentiostat is configured to apply a bias potential to the at least one electrode, to receive the current via the lead, and to convert the current into an analog voltage signal.

Optionally, the method further comprises receiving, at a digital subassembly, the analog voltage signal from the potentiostat and processing the analog voltage signal by adaptively applying a gain to the analog voltage signal based on the current or changes to the current and generating a gain adjusted signal that is indicative of a glucose level of the biological host.

Optionally, a diameter of the lead is in a range from 0.5 mm to 3.0 mm.

Optionally, the at least one electrode comprises three electrodes, wherein the first electrode is a working electrode, wherein the second electrode is a reference electrode, and wherein the third electrode is a counter electrode.

Optionally, the at least one electrode comprises two electrodes, wherein the first electrode is a working electrode and wherein the second electrode is a combined reference electrode and counter electrode.

Optionally, a portion of the lead is coated with an enzyme, wherein said portion ranges from 5 mm to 15 mm in length.

Optionally, the at least one electrode comprises an enzyme layer positioned over the surface area of the at least one electrode and a glucose limiting membrane positioned over the enzyme layer, wherein the enzyme layer has a thickness in a range of 3 microns to 60 microns and comprises glucose oxidase, and wherein the glucose limiting membrane has a thickness ranging from 3 microns to 60 microns.

Optionally, a cross-sectional area of the sensor is in a range of 0.4% to 10% of a cross-sectional area of the vessel.

Optionally, a cross-sectional area of the sensor does not occupy more than 10% of a cross-sectional area of the vessel.

Optionally, the electronics assembly comprises an analog subassembly, wherein the potentiostat is part of the analog subassembly, and wherein the analog subassembly is adapted to maintain a specified reference voltage constant to within 300 mV of a set point over a time period greater than 30 seconds without requiring any additional power to maintain said specified reference voltage. Optionally, the method of further comprises adjusting a reference voltage using signals of varying duration at voltages higher and lower than the specified reference voltage using the analog subassembly. Optionally, the method further comprises adjusting voltage values to converge to the specified reference voltage over more than one iteration of signal adjustments.

Optionally, the method further comprises programming the potentiostat to maintain a constant voltage potential at a pre-programmed value using a processor included in the glucose sensor. Optionally, the method further comprises modifying said pre-programmed value based on at least one predefined criterion using said processor.

The present specification also discloses a sensor adapted to be at least partially positioned within a vein or epidural space of a host and configured to sense a glucose level of the host, comprising: at least one electrode configured to be fully positioned within the vein or the epidural space; a lead in electrical communication with the at least one electrode; an electronics assembly in electrical communication with the lead, wherein the electronics assembly comprises: a potentiostat in electrical communication with the lead, wherein the potentiostat is configured to apply a bias potential to signals received via the lead; and a digital subassembly configured to receive the signals from the potentiostat and to adaptively apply a gain to said signals; wherein the glucose sensor is configured to operate continuously at least partially within the vein or the epidural space for at least one year without recharging.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skill in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2A is a first side plan view of a sensor, in accordance with some embodiments of the present specification;

FIG. 2B is a second side plan view of the sensor of FIG. 2A, where the view is generated by rotating the first side plan view of FIG. 2A by an angle of 90° in a counterclockwise direction along the longitudinal axis, in accordance with some embodiments of the present specification;

FIG. 3B is a side longitudinal view of the sensor, as shown in FIG. 3A;

FIG. 3C is a cross-sectional view of the sensor shown in FIG. 3B taken along an axis A-A that is perpendicular to the longitudinal axis of the sensor;

FIG. 3D is an enlarged view of the distal tip of the lead assembly of the sensor shown in FIG. 3B;

FIG. 3E is an enlarged view of the distal section and middle section of the lead assembly of the sensor shown in FIG. 3B;

FIG. 3F is a cross-sectional view, along section A, of the sensor of FIG. 3B, in accordance with embodiments of the present specification;

FIG. 3G is a cross-sectional view, along section B and through a working electrode (WE) of the sensor of FIG. 3B, in accordance with embodiments of the present specification;

FIG. 3H is a cross-sectional view, along section C and through a lead substrate between a reference electrode (RE) and a counter electrode (CE) of the sensor of FIG. 3B, in accordance with embodiments of the present specification;

FIG. 3I is a cross-sectional view, along section D and through a lead substrate of the sensor of FIG. 3B, in accordance with embodiments of the present specification;

FIG. 4A is a perspective view of an electronics assembly, in accordance with some embodiments of the present specification;

FIG. 4B is a first side plan view of the electronics assembly, shown in FIG. 4A;

FIG. 4C is a second side plan view of the electronics assembly, which corresponds to the rotation of first side plan view shown in FIG. 4B by an angle of 180° along a longitudinal axis and an angle of 90° along an axis perpendicular to the longitudinal axis;

FIG. 5C is a graph illustrating time (in seconds) versus current (in nA) received from the WE, observed at 0 months of activation of the glucose sensor in accordance with some embodiments of the present specification;

FIG. 5D is a graph illustrating time (in seconds) versus current (in nA) received from the WE, observed at 12 months of activation of the glucose sensor in accordance with some embodiments of the present specification;

FIG. 5E is a graph illustrating time (in seconds) versus current (in nA) received from the WE, observed at 24 months of activation of the glucose sensor in accordance with some embodiments of the present specification;

FIG. 5F is a graph illustrating time (in seconds) versus current (in nA) received from the WE, observed at 36 months of activation of the glucose sensor in accordance with some embodiments of the present specification

DETAILED DESCRIPTION

Figure 1:
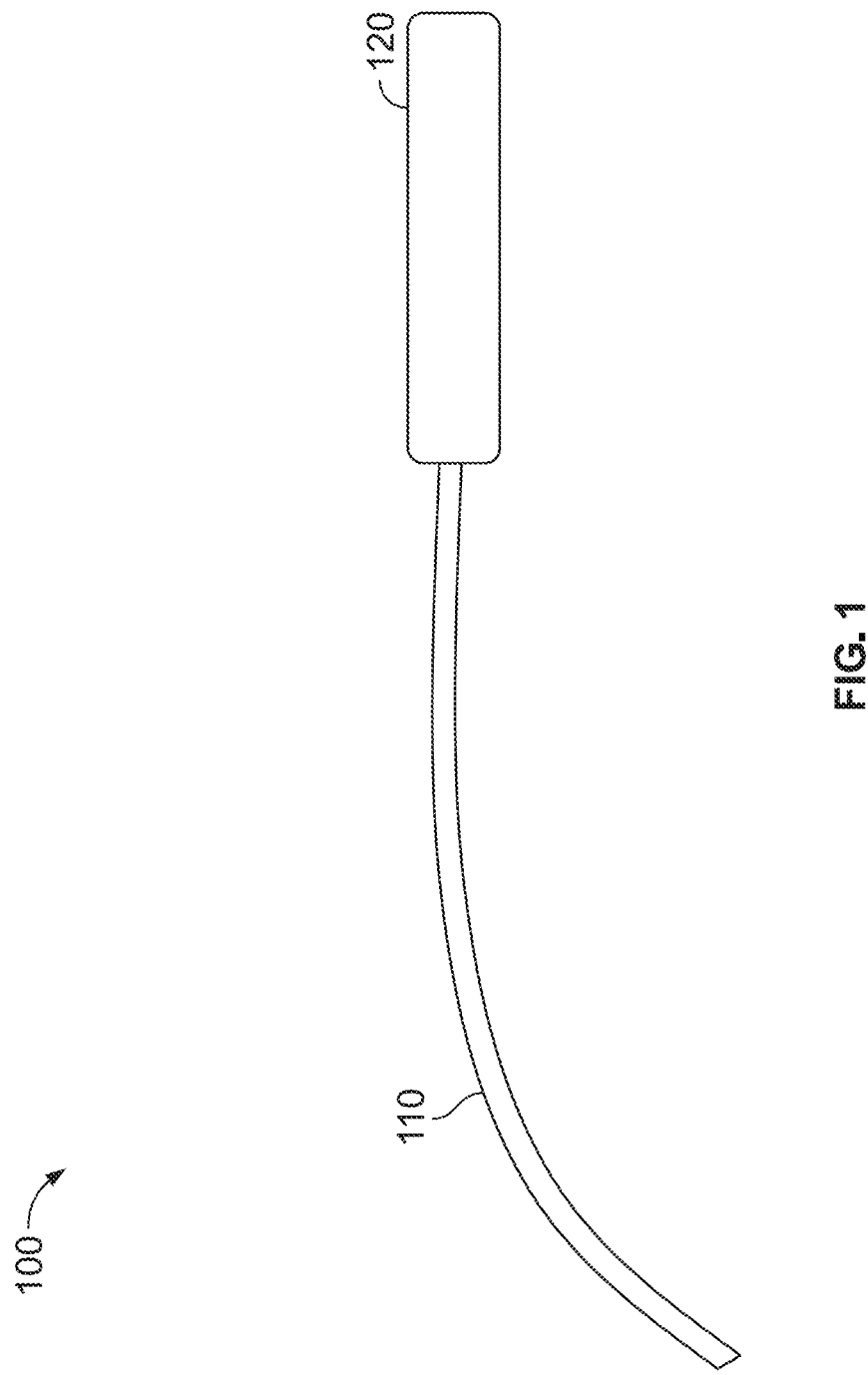
FIG. 1 shows an exemplary layout of a continuous glucose sensor comprising a lead assembly and an electronics assembly, in accordance with some embodiments of the present specification.

The present specification is directed towards systems and methods for continuous analyte monitoring. In embodiments, an analyte monitoring device comprises a sensor that is configured and positioned in a high-fluid environment, such as a blood vessel or an epidural space. In embodiments, some configurations of the sensor avoid turbulent flow within a vein or a blood vessel, which can otherwise cause clotting or blockage. In embodiments, the sensors described in the present specification are configured such that they provide a high signal-to-noise ratio (SNR) over a longer period of time. Additionally, the sensors of the present specification can operate consistently without the need to recharge or recalibrate for a longer period of time, and for example, up to two years in some embodiments. Each feature or component listed in the present specification, by itself or in combination with other features or components, helps achieve the aforementioned benefits of a continuous analyte monitoring device. While the embodiments below are described with reference to continuous glucose monitoring, it should be understood by those of ordinary skill in the art that the same principles apply to the monitoring and measurement of other analytes and/or metabolites, such as but not limited to pyruvate, lactate, succinate, fumarate, creatine, dehydroascorbate, glutamine, glutamate, glycerol, hypoxanthine, syndecan-1, iodide, citrulline, citrullinated histone H3, superoxide (reactive oxygen species), hydrogen peroxide (reactive oxygen species), dopamine, calcium, norepinephrine, epinephrine, and/or vasopressin and therefore the present invention is not limited to glucose monitoring.

In an embodiment, the present specification is directed towards systems and methods for continuous glucose monitoring, which include a glucose sensor that is configured and positioned in a high-fluid environment, such as a blood vessel or an epidural space. Configurations of the glucose sensor embodiments avoid turbulent flow within a vein or a blood vessel, which can otherwise cause clotting or blockage. In embodiments, the glucose sensors described in the present specification are configured such that they provide a high signal-to-noise ratio (SNR) over a longer period of time. Additionally, the glucose sensors of the present specification can operate consistently without the need to recharge or recalibrate for a longer period of time, and for example, up to two years in some embodiments. Each feature or component listed in the present specification, by itself or in combination with other features or components, helps achieve the aforementioned benefits of a continuous glucose monitoring device.

In embodiments, the glucose monitoring device comprises an implantable sensor element that is positioned in a location where the available surface area and the usable volume of the sensor element is maximized. Conventional percutaneous sensors cannot appreciably include an increased surface area and an increased volume without causing pain and discomfort and without compromising sensor performance due to biological responses. Further, conventional implantable intravascular enzymatic sensors have limited sensing surface areas and thicknesses. In embodiments, the sensors of the present specification overcome these limitations by making use of sensing surface areas that are orders of magnitude larger than that of conventional sensors while concurrently not requiring excessively thick enzyme layers, thereby not adding unnecessary diffusion delays. The increased surface area, coupled with an enzyme layer having a marginally increased thickness, of the presently disclosed embodiments, facilitates glucose concentration measurement without significant noise levels while also increasing the amount of glucose oxidase. Furthermore, any decrease in glucose diffusion effectively increases relative enzyme concentration while also reducing the oxidation/reduction cycles, thereby potentially increasing glucose oxidase longevity and sensor life while measuring current in sufficient amounts, thereby providing a good signal to noise ratio.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

In some embodiments, the system includes at least one processor to control the operation of at least some components of the device. It should be appreciated that the at least one processor is capable of processing programmatic instructions, has a memory capable of storing programmatic instructions, and employs software comprised of a plurality of programmatic instructions for performing the processes described herein. In one embodiment, the at least one processor includes a printed circuit board and associated hardware capable of receiving, executing, and transmitting a plurality of programmatic instructions stored on a volatile or non-volatile computer readable medium. Thus, in various embodiments, a computing device may be employed to receive and process data signals and may include an input/output controller, at least one communication interface and a system memory. The system memory may include at least one random access memory (RAM) and at least one read-only memory (ROM). These elements are in communication with the processor to enable the operation of the device.

In various embodiments, the computing device may be a conventional standalone computer or alternatively, the functions of the computing device may be distributed across a network of multiple computer systems and architectures. In some embodiments, execution of a plurality of sequences of programmatic instructions or code, which are stored in one or more non-volatile memories, enable or cause the CPU of the computing device to perform or enable various functions, processes and algorithms. In alternate embodiments, hard-wired circuitry may be used in place of, or in combination with, software instructions for implementation of the processes of systems and methods described in this application. Thus, the systems and methods described are not limited to any specific combination of hardware and software.

In embodiments, the system is coupled to at least one display, which displays information about at least one patient parameter and the operation of the system, by means of a GUI. The GUI also presents various menus that allow users to configure settings according to their requirements.

It should be noted that each component, processor, patient monitor, sensor, and/or device described herein is configured to perform the functions and communications described herein. In embodiments, each patient monitor, sensor, server, and/or processing system is capable of executing programmatic instructions. It should further be appreciated that each device and monitoring system have wireless and wired receivers and transmitters capable of sending and transmitting data, at least one processor capable of processing programmatic instructions, memory capable of storing programmatic instructions, and software comprised of a plurality of programmatic instructions for performing the processes described herein.

Where an element is described as being "on," "connected to," or "coupled to" another element, it may be directly on, connected or coupled to the other element, or, alternatively, one or more intervening elements may be present, unless otherwise specified. In addition, it may be in fluid or electrical communication with the other element. It should also be noted that the various components described herein may be used with any other component as described herein, in any combination or order, even if not described with respect to certain embodiments. Further, it should be noted that the various parameters described herein may apply without restriction to the embodiments in which they are described. Therefore, the components and parameters described herein are interchangeable and may be combined to achieve the objectives of the present invention and not limited to the specific embodiments that are described throughout the specification.

In embodiments, the glucose monitoring device of the present specification comprises enzyme-based sensors, and preferably glucose oxidase (GOx), that can be positioned into a fluid-filled lumen of a biological host, such as a vessel or subclavian vessel, where the lumen has a high flow rate. Therefore, glucose measurements are based on interactions with GOx. The GOx reaction is well-established for blood glucose sensing, however, its implementation in implantable continuous glucose monitors (CGMs) is challenging due to deactivation of the enzyme over time leading to a loss in signal. Embodiments of the present specification use a long sensor body, where "long" is characterized relative to the length of sensor wires used in known conventional devices, and as a result larger electrodes are configured into the sensor. Larger electrode surface areas require an increase in GOx loading or incorporating an increased amount of GOx over the increased surface area. Specifically, a surface area of a working electrode is increased relative to those typically used, which allows for an increased signal amplitude and a more consistent Signal-to-Noise Ratio (SNR), further resulting in an increased duration of uninterrupted continuous glucose measurement, owing to the increased GOx loading. Additionally, the duration of accuracy of the measurement increases since the typical noise, such as from motion, does not significantly impact the sensor signal. In some embodiments, noise, such as cardiac cycle artifacts, is removed by using filters to process the measured signals. In embodiments, the devices described throughout the present specification may be implanted at any location of a patient's body where the intravascular size of the vessel is sufficient to accommodate the size(s) of the sensors of the present specification and enable ease of access.

In embodiments of the present specification, the term "sensor" or "sensor assembly" refers to the implantable portion of the device, which includes an electronics assembly, and a lead assembly. In embodiments, the sensor includes a reference electrode section.

In embodiments, the electronics assembly is the portion of the sensor that is implanted into the subcutaneous space. In embodiments, the electronics assembly includes a housing for supporting electronics, which comprises an analog front-end signal acquisition circuitry (also referred to as an "analog subassembly") and digital processing circuitry (also referred to as a "digital subassembly"). In embodiments, the digital subassembly is positioned on a first end or first, proximate portion of the electronics assembly. In embodiments, the analog subassembly is positioned on a second end or second, distal portion of the electronics assembly. Further, the electronics assembly includes, in embodiments, a "header" or a "header interconnect" for facilitating mechanical and electrical connection with a lead assembly. The header interconnect is preferably position at a distal portion of the analog subassembly. also supports an antenna. In optional embodiments, the analog front-end circuitry may be positioned separately on the lead substrate of the lead assembly. By moving the analog front end to the tip of the sensor, the noise levels are considerably reduced.

In embodiments, the lead assembly is the portion of the sensor that comprises a lead or lead substrate or lead body upon which electrodes and contacts are positioned (either by being formed thereupon or coupled therewith). The lead substrate is used to support one or more electrodes and/or electrode connections. In embodiments, the lead assembly includes a distal end which includes the electrodes and which is positioned within the fluid-filled lumen and a proximal end that includes the contacts that are in electrical communication with the electrodes and is connected to the electronics assembly via the header.

In embodiments, the lead assembly further includes a sensing portion, at the distal end of the lead assembly, wherein the sensing portion includes at least a working electrode and optionally, a counter electrode and/or reference electrode and a membrane formed on or coupled to the lead substrate, which is inserted or positioned within a fluid-filled vessel of a biological host. It should be noted that the counter electrodes and/or reference electrodes may be positioned at other locations of the lead assembly in addition to the distal end. For example, the counter electrodes and/or reference electrodes may be positioned on a back end of the sensor, separate from and/or on the housing or header of the electronics assembly. Exemplary embodiments of alternative positioning and/or placement of the counter and/or reference electrodes are described in co-pending U.S. patent application Ser. No. 19/076,714, assigned to the Applicant of the present application and titled "Systems and Methods for Integrated Spinal Cord Stimulation and Glucose Monitoring, which is herein incorporated by reference in its entirety.

In embodiments, the term "raw sensor signal" refers to an unprocessed analog signal that is generated at a working electrode and is directly related to the current measured by the sensor.

In embodiments, the term "transmitted signal" refers to the digitized signal that is sent from the sensor (and thus, biological host), via the antenna, to a receiver, which is typically a handheld computing device, such as a phone.

In embodiments, the term "cross-sectional area" is used to refer to the area that is defined by the sensor or vessel as seen in a plane that is perpendicular (at a 90-degree angle) to the longitudinal axis of the vessel. In embodiments, the cross-sectional area may also refer to the area defined by an exterior periphery of a cross-sectional slice of the sensor or vessel taken at the thickest point of the sensor or vessel, which may also be the point of the sensor or vessel having the largest diameter. In the case of a vessel, the cross-sectional area is defined by an exterior periphery of a cross-sectional slice of the internal area of the vessel through which blood flows and is typically circular in arteries and veins.

In embodiments, the sensors of the present specification can be positioned in any blood vessel where a cross-sectional area of the sensor does not occupy more than 0.4% to 10% of the cross-sectional area of the vessel, and preferably 1% to 3% of the cross-sectional area of the vessel. In still other embodiments, the sensors of the present specification can be positioned in any blood vessel where a cross-sectional area of the sensor does not occupy more than 10% of a cross-sectional area of a vessel in which it is positioned, and preferably no more than 3% of the cross-sectional area of the vessel. In embodiments, a diameter of the sensor is in a range from 0.5 mm to 3.0 mm and is approximately 1.3 mm in a preferred embodiment.

FIG. 1 illustrates an exemplary layout of a continuous glucose sensor 100 comprising a lead assembly 110 and an electronics assembly 120, in accordance with some embodiments of the present specification. In embodiments, the electronics assembly is a glucose sensor electronics assembly and is hermetically sealed. The lead assembly 110 is, in embodiments, a glucose sensor lead assembly that is connected to a distal end of the electronics assembly 120, using implantable device connection methods, as described in greater detail below ("header"). Examples of connectors used may include, and are not limited to, connector assemblies specified by the standard ISO 5841-3:2013, which are typically used for connecting a cardiac lead to a cardiac pacemaker, and connector assemblies used in spinal cord stimulators. It should be understood that while the embodiments of the present specification are described with respect to glucose, any analyte may be measured using the systems and methods of the present specification. Additionally, the electronics assembly 120 is shaped to minimize skin incision size and therefore the number of sutures. In some cases, glue is used instead of sutures. In one embodiment, the electronics assembly 120 has a form factor in a range of 1 cc to 25 cc of volume and/or a dimensional range of 20 mm×5 mm×1 mm to 50 mm×10 mm×5 mm, more preferably, around 45.1 mm×8.0 mm×4.2 mm.

The glucose sensor 100 uses electrochemical analysis methods to quantify glucose levels through an implanted device. Lead assembly 110 includes one or more enzyme-based electrochemical sensors positioned on a substrate. In embodiments, the sensors herein, also known as amperometric glucose sensors, contain one or more electrodes that measure the current generated by an enzymatic reaction between glucose, an enzyme, and a mediator. The enzyme layer is provided over the surface area of the electrode(s) and may include glucose oxidase. As a result of the electrochemical enzymatic reaction, the glucose is converted into a byproduct that can be measured as a current. In some embodiments, the enzymatic sensing modality is based on use of one of the following: $H_2O_2$; $O_2$ differential; wired; or direct electron transfer.

Further, electronics assembly 120 is positioned within a separate housing and is configured to be in electrical communication with lead assembly 110. In some embodiments, some or all of electronics assembly 120 is integrated with the lead assembly 110. During implantation of sensor 100, sensor electronics assembly 120 is positioned within a subcutaneous pocket. The housing encompassing the electronics of sensor electronics assembly 120, when integrated with lead assembly 110, is configured to overcome mechanical noise or any other noise sources, such as those observed during low currents. In alternate embodiments, the housing may comprise potting in a polymer such as silicone or epoxy in place of hermetic encapsulation.

FIG. 2A shows a side plan view of a glucose sensor, in accordance with some embodiments of the present specification. FIG. 2B is another side plan view of a glucose sensor that is generated by rotating the first side plan view of FIG. 2A by an angle of 90° in a counterclockwise direction along a longitudinal axis, in accordance with some embodiments of the present specification.

Referring simultaneously to FIGS. 2A and 2B, sensor 200 comprises a lead assembly 210 and an electronics assembly 220. In embodiments, the lead assembly is positioned at the distal portion of the sensor and the electronics assembly is positioned at the proximal portion of the sensor. In embodiments, in turn, the lead assembly has a distal end and a proximal end, wherein the distal end includes electrodes and an electronics assembly which also has a distal end and a proximal end, wherein the proximal end of the lead assembly is connected to the distal end of the electronics assembly. In embodiments, housing 232 is used to at least partially enclose the electronics assembly 220. Tip portion 202 at the proximal end of sensor 200, as shown in FIG. 2A has a height in a range of 0.4 cm to 0.8 cm, and in one embodiment the height is approximately. 0.625 cm. The tip 202 of sensor 200 as shown in FIG. 2B has a height, as rotated, in a range of 0.75 cm to 1.2 cm, which is greater than the height as viewed in FIG. 2A, and in one embodiment the height is approximately 1.0 cm. The differing height at different angles, when viewed from the proximal end of sensor 200 is indicative of a substantially flat configuration of the housing 232.

In embodiments, the length of the lead assembly 210 is in a range of 2 cm to 30 cm, and in one embodiment the length is approximately 17 cm. In embodiments, the length of the electronics assembly 220 is in a range of 3.5 cm to 7.6 cm, and in one embodiment the length is approximately 6 cm. Therefore, in one embodiment, a total length of the glucose sensor 200 (both lead assembly and electronics assembly) is in a range of 5 cm to approximately 38 cm, and in an embodiment, is approximately 23 cm. Housing 232 also includes a portion 238, which is referred to as the "header" or "header interconnect" and comprises electrical connection points enabling electrical communication and an operable connection between electrodes positioned on a distal portion of lead 234 and the electronics assembly via electrical contacts on the lead 234. A connector 230, which, in embodiments, is a silicon strain relief, protrudes and extends outwards from header 238 of electronics assembly portion 220, and is configured to connect with the lead 234 at a proximal end, by use of a retention ring and set screw (not shown). In some embodiments, at least a portion of housing 232 is made from a metallic material such as titanium or a titanium alloy while the header portion 238 of housing 232 may be made from epoxy. Referring to view of FIG. 2A, a height of header portion 238 ranges from 5 mm to 10.5 mm, and, in one embodiment, the height is approximately 7.36 mm; while the height of header portion 238, when viewed in FIG. 2B, ranges from 7 mm to 15.5 mm, and is approximately 10.79 mm in one embodiment. A distal end of sensor 200, and therefore a distal end of lead assembly 234 comprises sensor electrodes 236, where each electrode is spaced from each other by a distance. In embodiments, electrodes 236 include one or more of each of a working electrode (WE), a reference electrode (RE), and a counter electrode (CE).

In embodiments, a weight of the lead assembly is less than 10%, and in some cases less than 5%, of the weight of the electronics assembly. At least one electrode is separated by at least a distance of 5 cm from a distal end of the electronics assembly. In an embodiment, and as seen in FIGS. 2A and 2B, the point of measurement 299 is the point of the distal end of the electronics assembly from which the 5 cm to the at least one electrode is measured. In an embodiment, and as shown in FIG. 4C, the point of measurement at the distal end from which the 5 cm to the at least one electrode is the distal point 499 of length L2, excluding 412. In an embodiment, the weight of the electronics assembly is greater than 90% of the overall weight of the sensor assembly, and the length of the longest dimension of the electronics assembly is less than 25% of the length of the lead assembly. In other words, the weight of the electronics assembly does not significantly impact the sensor motion as with more closely integrated conventional devices. Similarly, the transient nature of the sensor in the location in which it is placed (i.e. within the tissue) is not impacted by the electronics assembly by design.

Figure 3A:
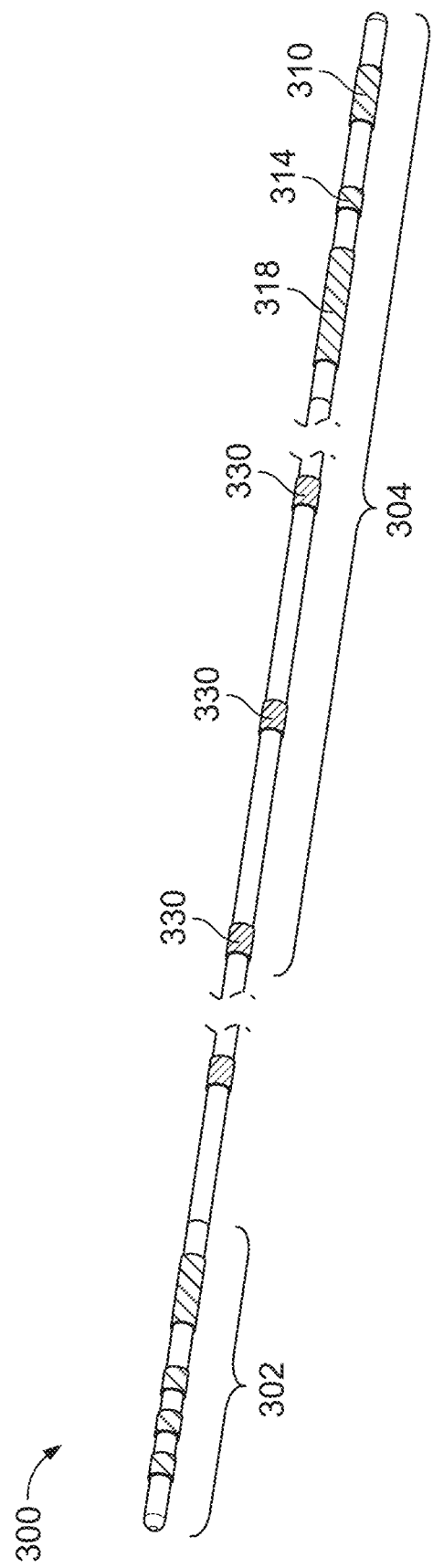
FIG. 3A is a side longitudinal perspective view of a sensor showing the lead assembly with a lead, a middle portion of the lead with markers, and the electronics assembly without the housing, in accordance with some embodiments of the present specification.

FIG. 3A is a side longitudinal perspective view of a sensor 300 showing the electronics assembly without the housing (housing 232 of FIG. 2), in accordance with some embodiments of the present specification. FIG. 3A shows sensor 300 comprising an electronics assembly 302 and a lead assembly 304. FIG. 3B illustrates a side longitudinal view of sensor assembly 300. FIG. 3C is a cross-sectional view of the sensor assembly shown in FIG. 3B taken along an axis A-A that is perpendicular to the longitudinal axis of sensor assembly 300. In embodiments, sensor assembly 300 has an overall configuration of an elongated cylinder with a hemispherical first section that includes the electronics assembly 302 and second section that includes the lead assembly 304. In embodiments, each of the components of the sensor assembly 300 is free of sharp edges and embedded bubbles do not exceed 0.20 mm$^2$ TAPPI, when viewed with a magnification of at least 10 times (thus, all parts of sensor 300 are free of partially embedded bubbles).

The following paragraphs refer to FIGS. 3A, 3B, 3C, and 3D simultaneously. Referring to lead assembly 304, a distal end section 306 of lead assembly 304 comprises the following components listed serially in their position from a distal end or tip 322 in and towards a proximal direction on sensor 300, and in particular on lead substrate or lead 334: a spacer 308, a working electrode (WE) 310, a spacer 312 (which, in an embodiment, is longer than spacer 308), a reference electrode (RE) 314, a spacer 316 (which, in embodiments, is shorter than either of spacers 308 or 312), a counter electrode (CE) 318, and a spacer 320. It should be noted herein that each of the spacers is positioned between electrodes 310, 314, and 318. Each electrode 310, 314 and 318 is flush attached with the spacers 308, 316 and 320 to which they are adjacent. In some embodiments, distal end section 306 is grit blast or glucose-limiting membrane (GLM)-coated, and has a uniform surface finish. In some embodiments, a length of the distal end comprising tip spacer 308 and WE 310 is in a range of 8±0.4 mm. In some embodiments, a length of the spacer 312 is in a range of 4 mm to 8 mm and is preferably within 6±0.4 mm. In some embodiments, a length extending between a distal end of spacer 312 and proximal end of CE 318 is approximately 16±0.4 mm. In some embodiments, distal end 306 extends an additional 2 to 3 mm from the proximal edge of CE 318, taking the length of distal end 306 to approximately 26 mm. In some embodiments, a diameter of distal end 306 is in a range of 0.60 to 3.00 mm and is approximately 1.32 mm in one embodiment. Lead assembly 304 extends for a length that ranges from 80 to 260 mm and is approximately 171 mm in one embodiment. In embodiments, lead assembly 304 has a length of at least 171 mm.

Further, a portion of distal end 306 extends from the distal tip 322 in a proximal direction to at least at a distance up to 3±0.25 mm from a proximal edge 310a of WE 310, for a total length ranging from 9 mm to 13 mm, and approximately 11 mm±0.65 mm in one embodiment, and is coated with an enzyme. FIG. 3D is an enlarged view of the enzyme-coated portion of distal end 306 including distal tip 322, tip spacer 308 and WE 310. In embodiments, at least 50% and preferably 100% of WE 310 is coated with an enzyme layer. The enzyme coating, in contact with at least a portion of the surface of the distal end 306, has a thickness ranging from 30 micron to 40 micron and is within 0.04±0.04 mm in one embodiment; and an outer GLM coating applied on the outer surface of the enzyme coating is of a thickness ranging from 10 micron to 13 micron and is within 0.01±0.003 mm in one embodiment. In some embodiments, while the linear cylindrical surface of the distal portion is coated with the stated range of thicknesses of enzyme and GLM, the distal tip 322 portion may have coatings of varying thickness of each.

Lead assembly 304 further comprises a middle section 328 that extends from a proximal edge 306a of distal end 306 for a length in a range of 72 mm to 220 mm, and in one embodiment, the length is approximately 145 mm. Multiple marker bands 330 are positioned along the length of middle section 328. In one embodiment, a first edge of a first marker band 330a is positioned at a distance of approximately 35.5±0.5 mm as measured from the distal tip 322 of lead assembly portion 304. A distance between a second edge of the first marker band 330a and a first edge of a second marker band 330b is approximately 10±0.4 mm. In embodiments, marker bands 330 are employed to provide a visual aid to a physician during insertion of lead assembly 304 inside the patient or during extraction from the patient.

Lead assembly 304 is configured to contain at least three parallel and radially equidistant cables that extend along an inner circumference of, and parallel to the longitudinal axis of, lead assembly 304. Referring to FIG. 3C, a cross-sectional view 332 along a section A-A shown in FIG. 3B illustrates three circles representing the three cables arranged inside an inner circumference 333 of lead assembly portion 304. A first cable 336 represents an electrical cable that connects CE 318 to its corresponding contact within electronics assembly 302; a second cable 338 represents an electrical cable that connects RE 314 to its corresponding contact in electronics assembly 302; and a third cable 340 represents an electrical cable that connects WE 310 to its corresponding contact in electronics assembly 302. A central circular portion 342 comprises a lumen with a diameter of approximately 0.02 mm.

FIG. 3E is another view of the sensor of FIG. 3B, in accordance with embodiments of the present specification. A glucose-limiting membrane (GLM) layer 364 is the outermost layer encompassing the distal end 306 of lead assembly 304 comprising the distal tip, spacer 308, and WE 310, spacer 312, RE 314, spacer 316, and CE 318.

FIG. 3F is another view of the sensor of FIG. 3B, in accordance with embodiments of the present specification, showing a cross-sectional view 300F along section A, through spacer 308 of lead assembly 304. At cross-section A, the same outermost GLM layer 364 is seen in view 300E.

Under GLM layer 364 is an enzyme layer 366, covering the surface of the lead substrate 368 and encompassing the distal tip, spacer 308, and WE 310, and a portion of spacer 312. In embodiments, the enzyme employed in enzyme layer 366 is GOx.

FIG. 3G is another view of the sensor 300 of FIG. 3B in accordance with embodiments of the present specification, showing a cross-sectional view 300G along a section B, through a working electrode (WE) 310. Referring to view 300G, along section B, lead substrate 368 is encircled by, encased by, or concentric within WE 310. A welding spot 370 is shown to illustrate that the WE 310 conductor is welded to the interior of the electrode ring formed by the WE 310 on an outer circumferential surface of lead substrate 368. WE 310 is further encompassed by enzyme layer 366, which, in turn, is covered by GLM layer 364.

FIG. 3H is another view of the sensor 300 of FIG. 3B in accordance with embodiments of the present specification, showing a cross-sectional view 300H along a section C, through the lead substrate 368 between a reference electrode 314 and a counter electrode 318. Referring to view 300H, along section C, electrode conductors 376 are embedded between an inner diameter 372 and an outer diameter 374 of lead substrate 368. GLM layer 364 encompasses outer diameter 374 of lead substrate 368.

FIG. 3I is another view of the sensor 300 of FIG. 3B in accordance with embodiments of the present specification, showing a cross-sectional view 300I along a section D, through the lead substrate 368. Referring to view 300H, along section D, electrode conductors 376 are embedded in lead substrate 368 between inner diameter 372 and outer diameter 374 of lead substrate 368. This portion of the lead 304 does not comprise a GLM layer 364 or an enzyme layer 366.

Figure 3J:
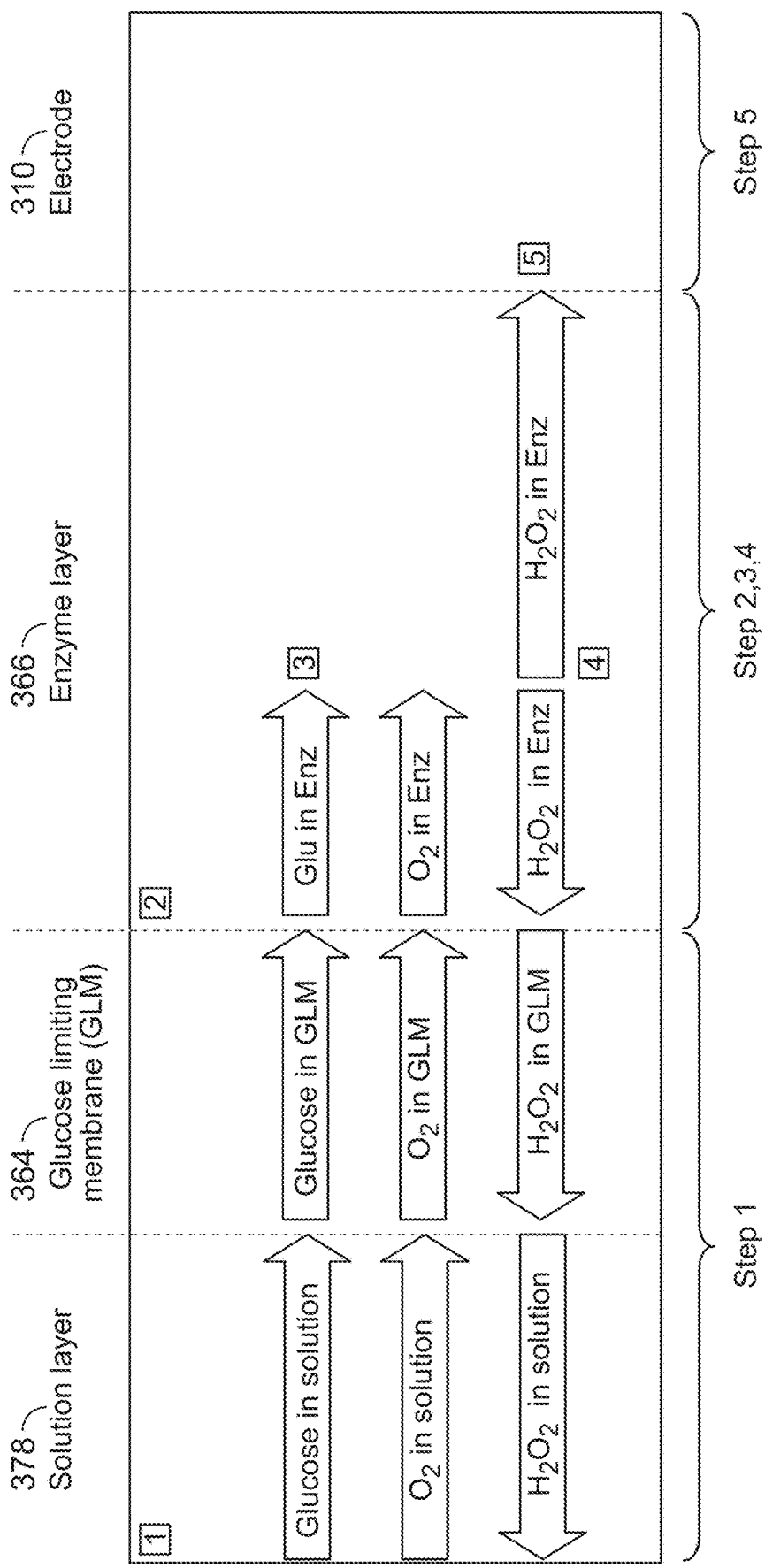
FIG. 3J is a flow diagram illustrating an exemplary sequence of an interaction between a fluid (such as blood) and a WE coated with a glucose-limiting membrane (GLM) and an enzyme layer.

While the glucose oxidase reaction is well-established for glucose sensing, implementing the reaction in an implantable CGM is challenging due to deactivation of the enzyme over time. In embodiments, the glucose monitoring devices of the present specification provide sensors with WEs that are coated with a GOx enzyme layer and a GLM layer on top of the GOx enzyme layer. FIG. 3J is a diagram illustrating an exemplary sequence of an interaction between a solution layer (such as blood) 378 and a WE 310 coated with an enzyme layer 366 and GLM 364, in accordance with embodiments of the present specification. The multiple interactions shown in the figure reflect both sensor performance and sensor lifetime. At step 1, any glucose present in solution layer 378 interacts with the GLM 364. Additionally, glucose and oxygen diffuse through solution layer 378 and GLM 364 to reach enzyme layer 366. At step 2, the glucose diffuses within enzyme layer 366 until available GOx is found. At step 3, GOx is reduced (redox reaction) by glucose at enzyme layer 366. If sufficient oxygen is present, GOx is oxidized to produce hydrogen peroxide. Otherwise, if sufficient oxygen is unavailable, the GOx is trapped at enzyme layer 366 in a reduced state. At step 4, the hydrogen peroxide in enzyme layer 366 diffuses either towards or away from WE 310. Hydrogen peroxide that diffuses away from WE 310 is lost. At step 5, hydrogen peroxide that reaches WE 310 is reduced and produces a current, which is sensed by WE 310 and converted to a raw signal that is representative of a flow of electrons or current (raw electrochemical signal) that is subsequently processed by the electronics assembly, which results in a processed signal, which, in turn, is communicated to the intended device. In embodiments, the WE 310 is held at a continuous bias potential by the analog front end of the electronics assembly, which results in the generation of electrons by reduction reactions at the surface of the WE 310 (and the production of hydrogen peroxide). At the counter electrode, these electrons are delivered back to the host by way of oxidizing another compound (which, in embodiments, is usually oxygen). The flow of electrons into the working electrode and out of the counter electrode is measured in amperage (nA) and results in the raw electrochemical signal.

Sensor response and linearity are affected by the balance of glucose and oxygen within WE 310, and the fraction of hydrogen peroxide that is detected at the surface of WE 310. Sensor risetime is affected by the rate of diffusion of each analyte through the GLM layer and enzyme layer as it reaches WE 310. Sensor longevity is affected by the concentration of enzyme in various states (resting state, reduced state, peroxide-complexed state) and the respective decay rate for each state. Therefore, changes to processes including analyte and co-factor diffusion, reaction rates, and multiple enzyme states and deactivation rates, are understood to have complex and unexpected implications to sensor response.

In embodiments, optional biocompatible layers (in addition to the GLM layer and the enzyme layer) are provided, and can provide or support features including and not limited to: anti-clotting, anti-calcification, anti-microbial, anti-thrombogenic, non-fouling, protein resistant, substantially non-cytotoxic, substantially hemo-compatible, substantially non-hemolytic surface, non-leaching, and membrane-targeting antimicrobial agent.

Referring again to FIG. 3B, electronics assembly 302 comprises a retention ring 348 that is configured to connect to a proximal end 344a of a proximal portion 344 of lead substrate 334. Referring simultaneously to FIG. 2A and FIG. 3B, retention ring 348 is inserted into header interconnect 238 and is locked into place with a set screw that is housed within header portion 238. Electronics assembly 302 terminates at a tip 346 (tip 202 of FIG. 2) of the sensor and has a diameter ranging within 1.32±0.03 mm. It should be noted herein that lead substrate 334 extends continuously from tip 322 to proximal end 344a up to connection with electronics assembly 302. In some embodiments, the length of electronics assembly 302, including a length of proximal portion 344 is within 19.8±0.5 mm. A first edge of retention ring 348 is connected to a spacer 350, followed by a contact 352 that corresponds to and is in electrical communication with WE 310. In some embodiments, a distance from the proximal tip 346 to a distal edge of spacer 350 is within 9.22±0.25 mm. The proximal edge of contact 352 is further attached to a spacer 354 followed by a contact 356 corresponding to and in electrical communication with RE 314. In some embodiments, a distance from the proximal tip 346 to a distal edge of spacer 354 is within 6.43±0.25 mm. The proximal edge of contact 356 is further attached to a spacer 358 followed by a contact 360 corresponding to and in electrical communication with CE 318. In some embodiments, a distance from the proximal tip 346 to a distal edge of spacer 358 is within 3.89±0.25 mm. The proximal edge of contact 360 extends to the proximal tip 346 over a length 362 of 1.35±0.25 mm. In some embodiments DC resistance between each contact 352, 356, and 360, and respectively corresponding electrodes 310, 314 and 318, is less than 100 Ohm.

Electronics Assembly

Figure 4D:
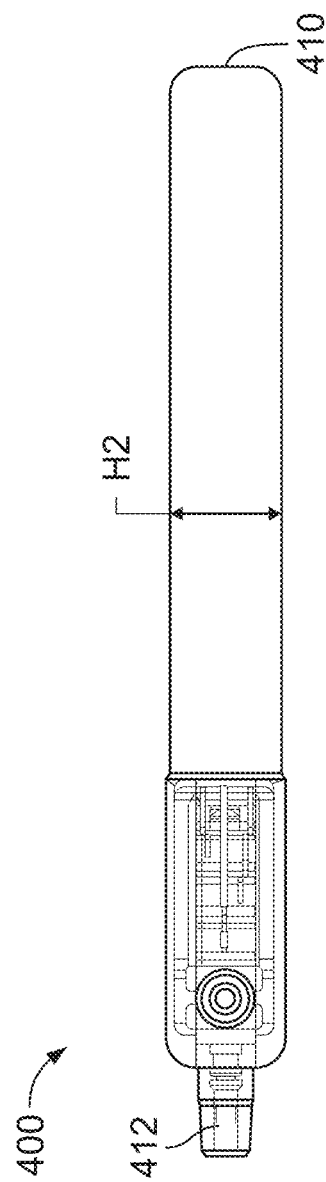
FIG. 4D illustrates a third side plan view of the electronics assembly, corresponding to a rotation of the second side plan view of FIG. 4C by an angle of 180° along a longitudinal axis.
Figure 4D:
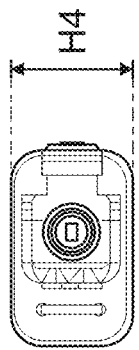

FIG. 4A is a perspective view of an encased electronics assembly 400, in accordance with some embodiments of the present specification. FIG. 4B is a first side plan view of the electronics assembly 400. FIG. 4C is a second side plan view of the encased electronics assembly, which corresponds to the rotation of first side plan view by an angle of 180° along a longitudinal axis 408 and an angle of 90° along an axis perpendicular to longitudinal axis 408, of encased electronics assembly 400. FIG. 4D illustrates a third side plan view of the encased electronics assembly 400, corresponding to a rotation of the second side plan view of FIG. 4C by an angle of 180° along a longitudinal axis 408.

In some embodiments, the electronics assembly portion and associated components are configured to support the control or operation of at least some components of the device by providing at least one processor. It should be appreciated that the at least one processor is capable of processing programmatic instructions, has a memory capable of storing programmatic instructions, and employs software comprised of a plurality of programmatic instructions for performing the processes described herein. In one embodiment, the at least one processor includes a printed circuit board and associated hardware capable of receiving, executing, and transmitting a plurality of programmatic instructions stored on a volatile or non-volatile computer readable medium. Thus, in various embodiments, the processor may be employed to receive and process data signals and may include an input/output controller, at least one communication interface and a system memory. The system memory may include at least one random access memory (RAM) and at least one read-only memory (ROM). These elements are in communication with the processor to enable operation of the device.

In embodiments, the system is coupled to at least one display, which displays information about at least one patient parameter and the operation of the system, by means of a GUI. The GUI also presents various menus that allow users to configure settings according to their requirements.

Referring simultaneously to FIGS. 4A, 4B, 4C and 4D, electronics assembly 400 is shown with a housing 402 comprising a first end or portion 404 (proximal) and a second end or portion 406 (distal, wherein 406 is also referred to as the "header" or "header interconnect" and is shown as 238 is FIG. 2A and FIG. 2B). In embodiments, housing 402 provides a hermetically sealed environment for the electronics assembly. Housing 402 has a flat, tapered configuration, with a first height H1 ranging from 8 mm to 14 mm when viewed from the first side, which is shown in FIG. 4B. In one embodiment, the first height H1 is approximately 10.5 mm. Housing 402 has a second height H2 when viewed from the second and third sides obtained by rotating housing 402 from its first side view by an angle of 90° along an axis perpendicular to longitudinal axis 408, and shown in FIGS. 4C and 4D, respectively. The second height H2 ranges from 4 mm to 8 mm, which is less than the first height H1, and is approximately 6.25 mm in one embodiment. In some embodiments, a first portion 404 of housing 402 is made from a metallic material such as titanium or a titanium alloy. In embodiments, the header or second portion 406 of housing 402 is made from epoxy. When viewed as shown in FIG. 4B, a third height H3 of the header portion 406 is in a range of 8 mm to 14 mm, and is 10.5 mm in one embodiment. When viewed as shown in FIGS. 4C and 4D, a fourth height H4 of header or second portion 406 is in a range of 5 mm to 9 mm and is 6.75 mm in one embodiment. Tip 410 has rounded corners and appears hemispherical in shape in the view of FIG. 4B. As seen in FIG. 4C, tip 410 has rounded corners that have a radius R1 ranging from 0.5 to 3.0 mm and is approximately 1.5 mm in an embodiment. The header or second portion 406 of housing 402 encloses a portion of the electronics assembly and a portion of a retention ring 412

(ring or connector 348 of FIG. 3B). Ring 412 extends distally outwards from second portion 406 of housing 402 to provide the medium to attach the lead assembly portion.

In embodiments, an overall length L1 of the electronics assembly 400 from distal tip of ring 412 to tip 410 is in a range of 3 cm to 8 cm is approximately 6.1 cm in one embodiment. A length L2 from tip 410 to a distal edge of first portion 406 of housing 402 is in a range of 4.2 cm to 7 cm and is 5.6 cm in one embodiment. A length L3 from proximal tip 410 to a distal edge of first portion 404 of housing 402 is in a range of 30 mm to 50 mm and is 40.25 mm in one embodiment.

Figure 4E:
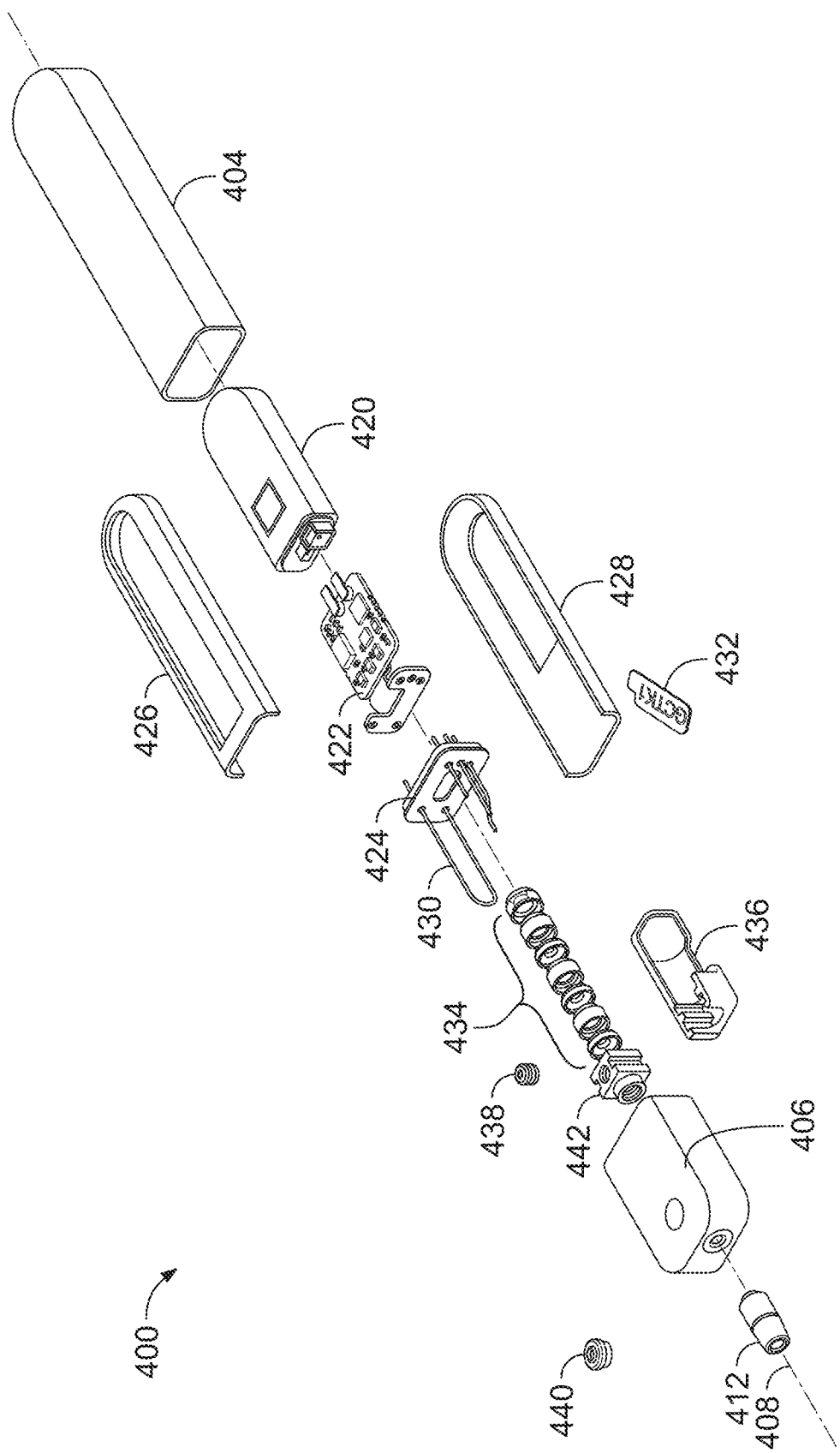
FIG. 4E is an exploded view of components included in the electronics assembly of FIGS. 4A-4D, in accordance with some embodiments of the present specification.

FIG. 4E is an exploded perspective view of exemplary implantable electronics included in an electronics assembly 400, in accordance with some embodiments of the present specification. First portion 404 of the housing is configured to house a battery 420. In embodiments, at least a portion of battery 420 is configured to match the shape of a first end of first portion 404 of the housing. A second portion of battery 420 is configured to electrically connect to a first end of PCBA 422. In turn, a second end of PCBA 422 is configured to attach to a feed-through lid 424. A combination of battery 420, PCBA 422 and feed through lid 424 are further housed inside a casing with a top nest 426 which covers the combination of assembly components from the top side and a bottom nest 428 which covers the combination of assembly components from the bottom side. Top nest 426 and bottom nest 428 are configured to snap-fit with each other along their sides. Once snap-fitted, the casing can be positioned within first portion or hermetic case 406.

In embodiments, a Bluetooth antenna 430 is attached to a first surface of feed-through lid 424. Additionally, a radiopaque tag 432 is fitted within or on the outside of encased electronic assembly 400, in some optional embodiments. Further, a chain of electrical connectors 434 are positioned on the first surface of feed-through lid 424. The header or section portion 406, which, in embodiments is made from epoxy, 406 houses the portion of connectors 434. A holder 436, for holding the electrical connectors 434 and set screw block 442, is used to attach connectors 434 to housing portion 406 with the aid of a set screw 438. Set screw 438 is covered using a cover 440. The set screw block 442, positioned within holder 436, is attached to a distal end of connectors 434, which provides a medium to fit screw 438. The distal end of second portion 406 of housing 402 has an exit port to allow for the fitting of ring 412 through the exit port. A proximal end of ring 412 is configured to attach to set screw block 442 inside second portion 406 of housing 402, and the distal end is configured to be attached to a lead assembly. In embodiments, the material of ring 412 is such that it allows flexibility to enable straining relief when attached to the lead assembly.

In embodiments, the sensor of the present specification uses an exemplary PCB for incorporation into the electronics assembly. In some embodiments, portions of the PCB are made from a rigid and/or flexible material. In embodiments, the material is a rigid-flex material, such as woven fiberglass, where the rigid portion is impregnated with epoxy resin. In embodiments, a portion of the PCB substrate is flexible allowing the board itself to be bent at an angle, such as a 90-degree angle, so that the two portions of the PCB substrate do not need to be connected, such as by soldered wires. In addition, the use of a bent PCB may reduce the overall width of the PCB.

In one embodiment, the battery (battery 420 of FIG. 4E) is a Lithium Silicon (LiS) based battery. In embodiments, the battery can be a Lithium-CFx battery with a stacked electrode design, or any other type of battery suited for implantable monitors or IPGs. In embodiments, the battery is shaped such that it fits within the housing of the electronics assembly in accordance with some of the embodiments of the present specification. In embodiments, the battery is housed in the top nest 426 and the bottom nest 428 (as shown in FIG. 4E) and the hermetic second portion 404 of housing 402 is used to isolate the negative battery case from the implanted body. A circular electrical connector with both positive and negative pins are employed for enabling connection to the PCBA. The circular electrical connector has a first connector pin 450 that has a first diameter in a range of 0.3±0.05 mm that extends for a first length of up to 2.5 mm perpendicularly from the platform on the first end front surface, and a second connector pin 451 that extends a second length of up to 1.5 mm and has a second diameter in a range of 1.6±0.1 mm, and are positioned to extend outwards from the platform on first end front surface of battery 420. In alternate embodiments, a small platform on the first end front surface of battery 420 raises the length of battery 420 by approximately 0.6 mm. In this implementation, the hermetic battery exterior is exposed to the implanted body and the other parts of the device are welded to the battery casing around the terminals.

In an embodiment, but not limited to such embodiment, battery 420 has the following electrical parameters/characteristics: capacity (at 100 KOhm) of 213 mAh; energy density of 882 mWh/cm$^3$; nominal voltage (BOL) of (3.25±0.15) V; cut-off voltage of 2V; pulse capacity of 202 mAh; rated pulse current of 10 mA/10 s; impedance (1 kHz BOL) of <30 Ohm; self-discharge of <1% per year; negative case polarity; and a safety feature of a shutdown separator.

In an embodiment, the battery 402 may correspond to the following parameters: mass within 1.45±0.2 gm; volume within 0.7±0.1 cm$^3$; laser markings showing battery type, serial number, pin polarity; swelling at discharge of less than 5% at EOL; housing/case material using titanium grade 1; sealing by laser welding; positive pin of Molybdenum (optional with nickelpad); negative pin of titanium grade 1.

In embodiments, the sensor of the present specification includes analog front-end circuitry that may be positioned either in the sensor electronics assembly or separately at a distal tip of the lead body of the lead assembly. By moving the analog front end to the tip of the sensor, the noise levels are considerably reduced.

In embodiments, the electronics assembly comprises an analog subassembly, wherein the potentiostat is part of the analog subassembly, and wherein the analog subassembly is adapted to maintain a specified reference voltage constant to within 10 mV of a set point over a time period greater than 30 seconds without requiring any additional power to maintain said specified reference voltage, and wherein the analog subassembly is configured to adjust a reference voltage using signals of varying duration at voltages higher and lower than the specified reference voltage.

Thus, the analog front-signal acquisition circuitry that is positioned within the electronics assembly includes components for providing a reference voltage that remains constant to a target reference voltage within a specific tolerance, such as but not limited to within ±300 mV. In embodiments, the reference voltage that remains constant to a target reference voltage within a specific tolerance is within ±10 mV. In embodiments, the reference voltage that remains constant to a target reference voltage within a specific tolerance is within ±1 to ±2 mV. In embodiments, to reduce the amount of power that is consumed by delivering a specific digital to analog voltage, the present specification advantageously uses a charged capacitor to provide this voltage. A resistor is employed to maintain the target or specified reference voltage by either providing ("topping off") or removing ("draining") the charge or power at a pre-determined rate.

In embodiments, the portion of the analog front end circuitry that is configured to support the constant reference voltage may have "no power" intervals of time during which no power is consumed to maintain a constant reference voltage. In embodiment, this "no power consumption" configuration is afforded by the use of capacitive storage. During the no power intervals of time, the analog circuitry does not deliver current to the capacitor to increase or maintain voltage, and any voltage changes are due to leakage of connected high-impedance circuit and circuit board elements. The analog front end circuitry includes one or more op-amps designed to perform different functions including maintaining a consistent voltage potential based on the associated reference voltage, and enabling measurement of the current in a particular electrode. The voltage bias potential may be programmable to change over time. A microcontroller is configured to and used to change this reference voltage value based upon a pre-determined criterion.

During time periods other than the "no power" intervals, the voltage on a capacitor can be adjusted to approach the target or specified reference voltage using the microcontroller. In one embodiment, the microcontroller can adjust the reference voltage on the capacitor using a digital to analog converter to maintain a voltage target value that delivers current to or from the capacitor to aim to converge to the target reference voltage. In another embodiment, the microcontroller is configured to adjust the reference voltage on the capacitor by applying high and low voltages that are not equivalent to the target reference voltage but are already available on the digital microcontroller. These high and low voltages would connect to the capacitor through a series resistor for a predetermined period of time to result in the flowing in or flowing out of electrons that adjust the voltage on the capacitor. Sourcing energy to the capacitor from voltages available on the digital microcontroller enables use of a voltage source that is more efficient than a digital to analog converter. In either embodiment, the connection of voltage to the capacitor during the no power interval would be blocked by a high-impedance circuit element that is either internal or external to the microcontroller. The voltage on the capacitor can be measured at any point in the process by an analog to digital circuit attached to the capacitor. This combination of both analog storage and digital components is unique to embodiments of the present specification, with a low power front-end designed to apply a continuous bias potential. Additionally, the analog front-end settings may be adaptive based on a predicted decay profile.

In embodiments, the device draws less than 3 microwatts ($\mu W$) of power above the processor power draw in order to support a single potentiostat.

A voltage bias potential is flexible in design embodiments, ranging from 0.6 V+/−1 V in an embodiment, and in embodiments, may range 0.1 V to 0.7 V and any increment thereof. For example, when the reference electrode is fabricated from Ag/AgCl, PtIr (Platinum-90, Iridium-10 ratio), or Iridium Oxide (IrOx), the potential bias voltage may be set to 600 mV, 400 mV, or 380 mV, respectively.

In embodiments, the electronics assembly includes a potentiostat that is in electrical communication with the lead assembly via electrical contacts. In some embodiments, each electrode of the lead assembly is in electrical communication with a corresponding potentiostat interface element. The potentiostat is configured to apply a bias potential so as to generate a flow of electrons, or current, which may also be referred to as a raw electrochemical signal and can be measured as current (whereby a glucose level of a biological host has been converted into a byproduct that can be measured as current) and received via the lead assembly. The electronics assembly converts, at the analog front end, the current into a voltage (referred to as voltage conversion or voltage follower) generating an analog voltage signal. Thus, the flow of electrons or current is converted to voltage at baseline by the analog front end. Digital circuitry (also referred to as a digital subassembly) is also included within the electronics assembly and is configured to receive the analog voltage signal from the potentiostat and to adaptively apply a gain to said analog voltage signal (especially in cases where the voltage conversion or follower is generating small changes), in order to increase the voltage, generating a processed signal or adaptive gain signal which is indicative of a glucose level of the biological host.

In embodiments, the electrodes described in the present specification have a larger surface area relative to conventional glucose sensor electrodes. An increase in the surface area increases the magnitude of the current that can be generated by the sensor. An increased surface area increases the noise tolerance of the electronics assembly. A larger surface area of the sensor electrode supports a longer duration of the presence of glucose oxidase on the sensor electrodes, and also allows the electronics to operate at a lower power than would be required of a smaller surface area, resulting in a longer battery life.

In embodiments, the gain setting is configured to multiply both signal and noise values. It is desirable to set the gain as low as practical at the beginning of operation of the glucose sensor and then turn the gain at a higher value towards the end of life of the glucose sensor. In embodiments, the present specification provides an adaptive gain setting which can be changed based on the range of raw sensor values obtained from the device. In an embodiment, a low gain level may be employed during a period when raw sensor signals lie in a range between 100 nA to 1000 nA, however, the gain is increased when the raw sensor values fall between a range of 15 nA to 150 nA for a corresponding range of patient blood glucose values. Thus, in embodiments, when the highest signal amplitude drops from 160 nA to 80 nA, the gain level is switched to a second gain level. For example, in the embodiment, described above, the sensor device may have a threshold T1. When the sensor current falls below T1 for a fixed duration of time, D1, then the sensor is considered to have a weakened output. Under this condition, a resistor, R1, which is used to convert current to voltage (for measurement and generation of the second signal) can be switched to a resistor R2 that is higher in resistance (ohms) and provides more amplification of the current-to-voltage conversion. The same can happen for the next threshold T2, where T2<T1. Also, there can be a hysteresis that prevents unnecessary switching back and forth between gain stages when the sensor strength is just on the edge of a threshold level. Such hysteresis techniques are commonly known in the art (for example, as used in cardiac pacemaker sensing and pacing circuits), but essentially require increasing above the threshold by a certain amount such as T1+delta, before switching back to the previous gain stage. Similar to the above, a D1+delta could also be applied for hysteresis.

Additionally, the bias potential is configured to adapt over time, which may be based on pre-determined criteria. For example, the device may be configured to measure oxygen concentration—either periodically or when the sensor output falls outside of a range of suspected values. In that case, the bias voltage (WE voltage–RE voltage) needs to be changed to properly measure oxygen concentration. The bias potential may be set both digitally and adaptively. In embodiments, the high-impedance states of the microcontroller digital I/O pins may be exploited to effectively simulate aspects of an Op Amp to make a digital Op Amp. This can be achieved at a low power because the actual WE to RE voltages do not need to be held to exact values of 0.6 V to accomplish the electrochemical reaction described in the present specification. In addition, capacitors can be selected to extend the WE-RE decay curve to remain in tolerance about twice as long as a decaying exponential, requiring the processor to wake up and service it about half of the time compared to a decaying exponential. This is because the capacitors are charged and then disconnected so that the capacitor self-discharge is the primary source of voltage drop. In embodiments, the capacitors of the present specification have optimal storage characteristics. In embodiments, the capacitor storage may be charged with binary on/off (i.e. pulses) for a fixed amount of time to achieve a desired voltage instead of using a digital to analog converter to set a specific voltage. In embodiments, the high impedance of the microprocessor may be used to prevent capacitor leakage so that it remains within a 5% charge for at least 30 seconds.

In embodiments, the sensors of the present specification are configured to operate by sensing glucose in an intravascular region or within a fluid-filled lumen which present relatively high blood flow rates. Oscillatory blood flow may result in small movement of the sensor. Therefore, the electronic components and processing devices and methods are configured to take the blood flow rates into consideration while determining glucose levels. The electronics assembly is configured to sample at different times in the blood flow cycle to mitigate noise associated with blood flow. In some embodiments, sampling is synchronized to flow rate. For example, in the case where flow in the subclavian artery changes from baseline (355.4+/−95.2 ml/min) to constriction (171.2+/−61.3 ml/min) and hyperemia (679.3+/−195.1 ml/min), the sampling rate is adjusted accordingly.

In embodiments, the blood flow rate is detected by sensing the heart rate (heartbeat) and by subtracting the noise from the heart rate. In an embodiment, a MEMS-based pressure sensor is used on the outside of the lead to assess pressure. The modulation between systolic and diastolic pressure is used to determine heart rate, which is used as a surrogate for flow rate when combined with pressure values (assuming a known variations in vessel diameter). In another embodiment, a low-power QRS wave peak-detector wave supplies a low-noise interrupt input into a processor. In the second embodiment, two electrodes are required—where one electrode is positioned within the electronics assembly housing, and the other is positioned in the lead or the header of the device. In some embodiments, the metallic housing of the electronics assembly serves as an electrode.

Lead Assembly

In embodiments, the lead assembly is the portion of the sensor that comprises a lead or lead substrate or lead body upon which electrodes and contacts are positioned (either by being formed thereupon or coupled therewith). The lead substrate is used to support one or more electrodes and/or electrode connections. In embodiments, the lead assembly includes a distal end which is positioned within the fluid-filled lumen and a proximal end that includes the contacts that are in electrical communication with the electrodes and is connected to the electronics assembly via the header, which is positioned within a second, distal portion of the electronics assembly, in embodiments.

Electrodes

Referring back to FIG. 3B, in embodiments, the lead assembly comprises three electrodes: a working electrode (WE) 310, a reference electrode (RE) 314, and a counter electrode (CE) 318. Each electrode is configured to have a large surface area relative to conventional electrodes positioned subcutaneously. Traditional subcutaneous sensors have small electrodes packed closely together. In embodiments of the present specification, a surface area of the working electrode(s) is sometimes more than 10 times, and sometimes more than 20 times the surface area of electrodes commonly used within the subcutaneous space.

In some embodiments, each or at least one of the electrodes have a surface area in a range of 2 $mm^2$ to 30 $mm^2$, and preferably 6 $mm^2$ to 14 $mm^2$. In an embodiment, a distal electrode (working electrode 310) with a surface area ranging from 2 $mm^2$ to 30 $mm^2$, and preferably 6 $mm^2$ to 14 $mm^2$, is employed along with a reference electrode 314 and a proximal electrode (counter electrode 318) with a surface area that is at least 1.5 times greater than the surface area of the distal electrode (working electrode 310). In another embodiment, a distal electrode (working electrode 310) with a surface area ranging from 8 $mm^2$ to 20 $mm^2$, and preferably 6 $mm^2$ to 14 $mm^2$, is employed along with a combined reference and counter electrode (not shown) with a surface area that is at least 1.5 times smaller than that of working electrode 310.

Larger surface areas are made possible in the present embodiments due to the placement of the electrodes in the intravascular regions. Additionally, surfaces of the electrodes can be roughened by laser etching or sand blasting. Roughening of the surfaces further increases the effective surface area of the electrodes. Roughening also enables better adherence of the polymeric coatings that may be applied to the electrode, reducing the risk of delamination of these from the electrode.

The WE 310 is the electrode where the reaction with glucose takes place and is the location of interest to control or to investigate the reaction. In some embodiments, the WE 310 is configured to measure hydrogen peroxide ($H_2O_2$) (reduced hydrogen peroxide that produces a current) to monitor glucose levels. In some embodiments, WE 310 is fabricated from platinum. In some embodiments, WE 310 is positioned at the distal end of the lead assembly and is configured to cover the distal end of assembly in the form of a boot or an endcap. In some embodiments, WE 310 comprises one electrode, or two or more electrodes, where in the latter case each WE is covered with separate bioresorbable membranes. The membranes can include mechanical adhesion-promoting features, such as for example those that enable covalent bonding with substrate. The electrodes may include multiple WEs to sense for glucose and/or other analytes, such as pO2 or pH, and/or is used to assess oxygen fluctuation impact on glucose measurements.

The RE 314 is configured to deliver a potential with no current flowing through it to enable its monitor and control. In some embodiments, the RE is made using silver/silver-chloride (Ag/AgCl). In some other embodiments, the RE is made using PtIr (90:10) or Iridium Oxide.

In embodiments, the CE 318 is an inert metal or carbon species with a larger surface area than the WE to complete the ionic/electronic current pathway. In some embodiments, the CE is fabricated from platinum. In some optional embodiments, the CE is positioned at the distal end of lead assembly and is configured to cover the distal end of the lead assembly in the form of a boot or an endcap. In some embodiments, the CE includes a hermetic metallic housing of electronics to simplify the connection scheme, lead design, and reduce costs.

WE 310 and RE 314 are preferably spaced at a distance from each other ranging between approximately 4 mm to 8 mm and in an embodiment, at a distance of approximately 6 mm. In some embodiments, RE 314 is positioned within the subcutaneous space and not the fluid-filled lumen, where the spacing between the WE 310 and RE 314 is much longer, and may range from 1 mm to 50 mm. In some embodiments, WE 310 is at a distance of 1 to 20 mm, preferably at a distance of 3 to 7 mm, and more preferably at 5 mm, from the distal tip of the lead.

In some embodiments, an additional sensing electrode (not shown) is incorporated into the glucose sensor. The additional electrode may be used for sensing heart rate, such as the QRS HR wave. Knowing the QRS complex, such as the duration, amplitude, VAT, Q wave, R wave and/or S wave, noise related to changes in blood flow may be measured and removed from the glucose signal. In some further embodiments, another electrode is positioned either intravascularly or extravascularly along the lead.

In one embodiment, a metal housing of the electronics assembly is configured as an electrode, such as for example the CE. In some embodiments the CE is positioned on the lead substrate, while in some other embodiments, the CE is positioned within the electronics assembly. In some embodiments, the CE is positioned on a proximal end of the lead so that it is closest to the connector connecting the lead assembly to the electronics assembly. In its position closest to the connector, the CE may also be partially or wholly placed within the epoxy header of the electronics assembly housing. In embodiments, the CE may move freely within the subcutaneous region adjacent to the electronics assembly, while positioned either on the lead portion that resides within the vessel or outside of the vessel in the proximity of the electronics assembly. The CE, in embodiments, is designed to optimize the flow of blood around the electrode.

The application of a constant voltage for continuous glucose monitoring, compared to pulsing which is used in leads placed in a spinal or cardiac locations for monitoring, may result in dendritic growth or buildup over time. Therefore, a process of galvanization is preferably used over the electrodes to prevent rusting. Additionally, materials that reduce the risk of corrosion, such as noble metals or materials with a low corrosion rate, may be used to fabricate the electrodes. In some embodiments, MP35N, a cladded alloy, or stainless steel may be used for cost and flexibility of making the electrodes. In some embodiments, dissimilar materials are used along a conductive path. The use of dissimilar materials do not exhibit significant half-cell potential and thereby limit corrosion. Additionally, boundaries between dissimilar materials along the conductive path, such as that provided by welding, are limited to reduce corrosive processes.

In some embodiments, the WE includes at least one membrane. In a two-layer membrane system of the present specification, the outermost (tissue-facing) membrane is the glucose limiting membrane (GLM). The innermost (electrode-facing) membrane is the immobilized GOx membrane, which is also referred to as an enzyme layer. Some embodiments include other membranes, for example interferent membranes, for acetaminophen and ascorbic acid. The other membranes can be located anywhere in the chain of membranes, depending on their role or function. In some embodiments, the additional membranes enable anti-clotting functions, such as, for example, biocompatible membranes or an analyte-specific limiting membrane. The optional membranes may also provide an additional biocompatible layer to increase biocompatibility and reduce clotting, among other advantages. Further, the additional membrane promotes anti-calcification and renders an anti-microbial coating. Some embodiments include membrane coatings comprising biologically active compounds, such as dexamethasone, that diffuse out into the host tissues. Some embodiments include additional sensing membranes that are analyte-specific, for example, to ketones and lactate. In embodiments, the WE is covered entirely by the membrane(s). In some cases, the membrane coating(s) extends beyond the WE but does not cover the RE.

In embodiments, the membrane has a total thickness of at least 30 microns. In embodiments, the thickness of the membrane ranges from 3 microns to 60 microns. In embodiments, the enzyme layer has a thickness of at least 30 microns, and preferably ranging from 30 microns to 40 microns. In embodiments, the GLM layer has a thickness of at least 10 microns and is preferably in a range of 10 microns to 13 microns.

The GLM is a specialized coating that is used on glucose sensors to regulate the amount of glucose that reaches the sensing layer while also controlling the influx of interfering substances allowing for maximum oxygen diffusion. As described above, any glucose present in the fluid (solution layer) interacts with the GLM. Additionally, glucose and oxygen diffuse through the fluid and the GLM to reach the enzyme layer. The glucose oxidase that is present at/near the fluid-contacting (blood) surface of the enzyme layer is the first to become inactivated. When this occurs, glucose needs to travel past this layer portion(s) of inactivated enzymes to reach the active enzymes. The increased diffusion time can result in additional 1, 2, and upwards of 4-minute delays in the measurement of blood glucose by the sensor. Any form of delay can be a disadvantage to a patient since the high and low glucose level alarms need to be properly timed in order to adjust insulin dosing and/or carbohydrate intake accordingly. By having a larger surface area, the electrodes positioned on the lead substrate, as described herein, support the use of more glucose oxidase enzyme while maintaining the enzyme layer thin enough to not significantly increase diffusion times beyond clinically acceptable levels for proper insulin control and carbohydrate intake.

In particular, the increased surface area of the electrodes allows for an increase in the strength of the electrochemical raw signal that is generated (up to 2000 nA with regular glucose levels ranging from 100-200 mg/dL). In general, the larger the surface area of the WE, the greater the amount of electrochemical raw signal that may be generated at any given concentration of analyte. In embodiments, the surface area of the electrode is within a range of 2 $mm^2$ to 30 $mm^2$. In some embodiments, the surface area preferably is in a range of 6 $mm^2$ to 14 $mm^2$. In one example, an electrode has a diameter of 1.3 mm and a length of 3 mm. Optionally, the length is increased to a number greater than 3 mm, such as 4 mm, 5 mm, 6 mm, and so forth in increments of 1 mm without increasing the diameter, to increase the resulting surface area. In some embodiments, the diameter may also be increased or decreased. A relatively thin membrane allows for little to no diffusional time lag. In embodiments, the sensor delay does not change more than 40% per year from when compared to the end of the break-in period. The break-in period ends at the point where clinical data is considered accurate to the specifications or able to be shown. This period may be as long as 1 to 2 weeks in duration. Upon initial operation within the host and referring to the current (in amperage) that is measured by the WE, the glucose sensor of the present specification has a raw signal of at least 120 nA (glucose level of 200 mg/dL) and an amperage decay rate is no greater than 50% over a one-year period, preferably no greater than 40% over a one-year period, and still preferably no greater than 10% to 20% over a one-year period. It should be noted that signal loss can be measured as a current, amperage, or a raw signal.

Figure 5A:
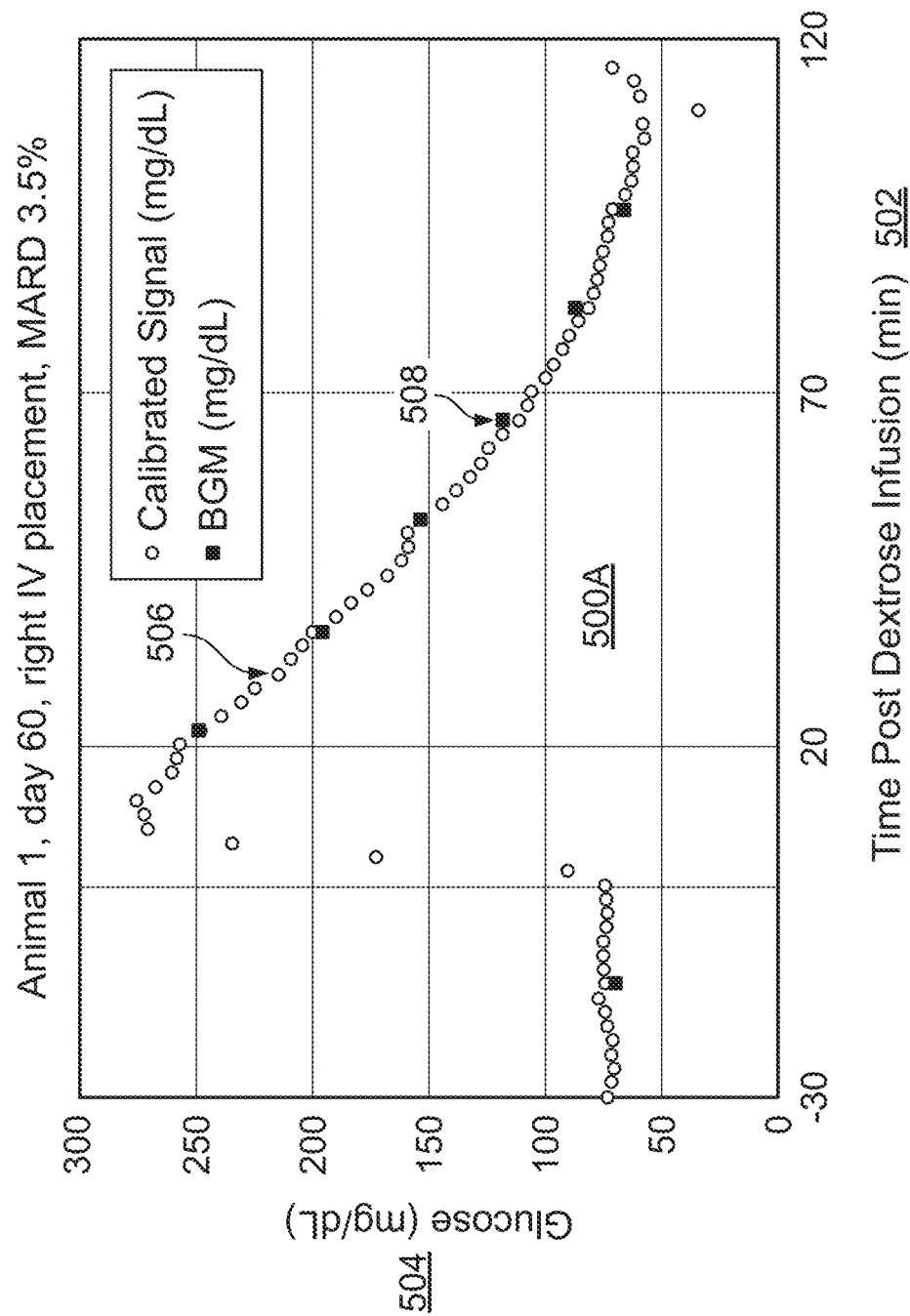
FIG. 5A is a graph illustrating time post dextrose infusion versus glucose levels.
Figure 5B:
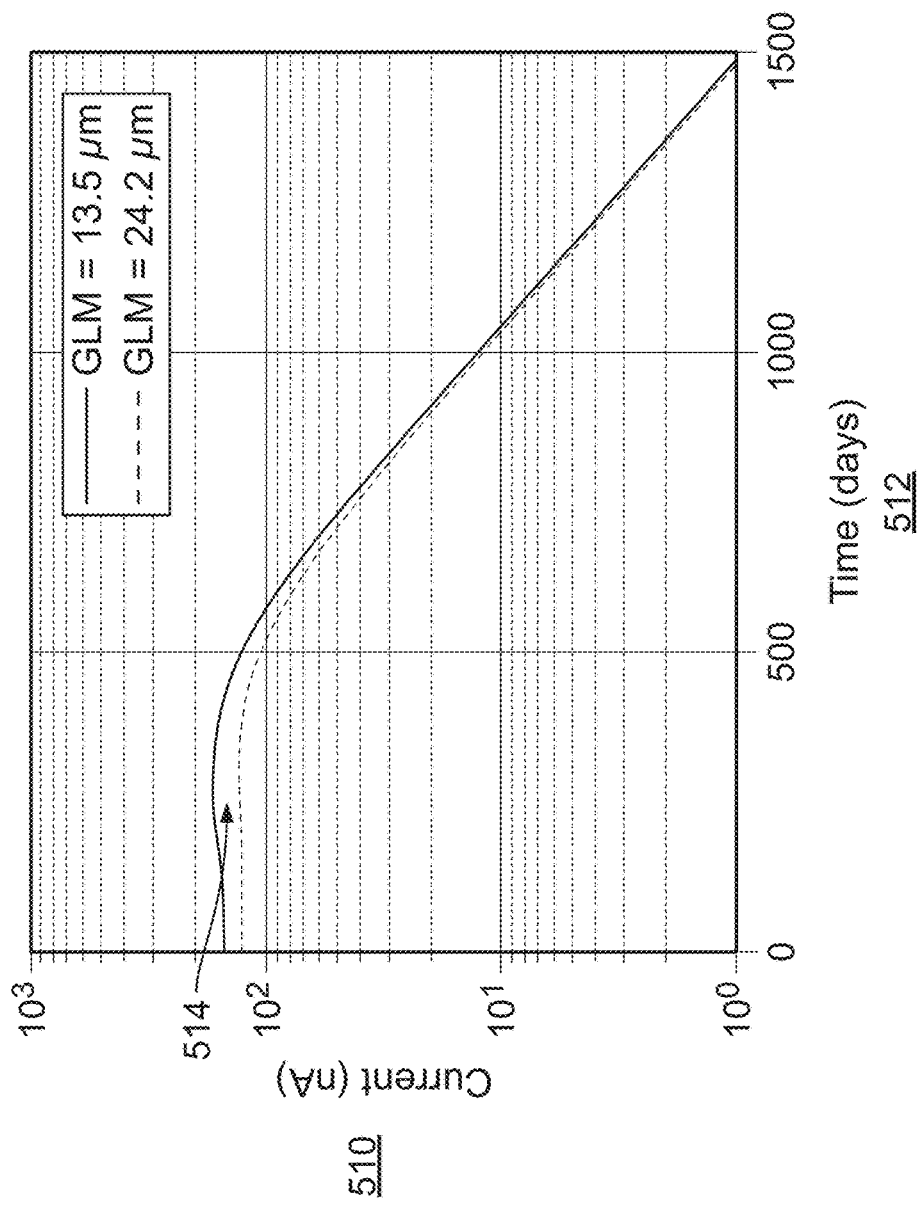
FIG. 5B is a graph illustrating signal output received from a glucose-limiting membrane (GLM) coated electrode with an increase in time (number of days)

FIG. 5A is a graph 500A illustrating time post dextrose infusion 502 for different glucose levels 504. The graph illustrates that the calibrated signal levels 506 matches BGM values 508. In embodiments, a membrane thickness ranges from 3 to 60 microns, and is preferably within a range of 30 to 60 microns, and still preferably at least 30 microns. Also, the GLM thickness may be at least 10 microns and preferably ranges from 10 to 13 microns. The oxygen to glucose diffusion ratio is not more than 50:1. The GLM thickness and/or composition is fabricated such that the following parameters are met optimally: stable sensor output, an acceptable signal to noise ratio, diffusion time, sensor longevity, and sensor accuracy. Therefore, the GLM plays a significant role in balancing out these important parameters. FIG. 5B is a graph 500B illustrating signal output 510 received from a GLM-based electrode over an increase in time (number of days) 512. The graph shows the plots for glucose-limiting membranes of different thicknesses. In one embodiment, the graph illustrated by a plot 514, corresponding to GLM thicknesses of approximately 13.5 microns and 24.2 microns.

Conventional subcutaneous sensors have thickness of the membrane to diameter of the electrode ratio of approximately 1:10. In embodiments of the present specification, the sensors have a thickness of the membrane to diameter of the electrode ratio of 0.033:1.3 (a GOx membrane having a thickness of 33 micron is used to coat or cover a 1300 micron or 1.3 mm diameter electrode wire/lead body). This ratio can also be stated as 33:1300 or approximately 1:40. In different embodiments, this ratio can be configured to be slightly higher or lower. In embodiments, the ratio of the membrane layer thickness to electrode diameter ranges from 1:10 to 1:50, and still further 1:30 to 1:40. A high aspect ratio enables longevity because the enzyme can be refreshed with oxygen molecules almost instantaneously. This is because when embodiments of the present specification are used in intravascular spaces, there is not the same oxygen limitation issues as with conventional glucose sensors placed into subcutaneous tissues, thus allowing for the incorporation of a thinner/"weak" GLM (as quantified above in FIG. 5B) since the dominant decay factor is thermal decay, not oxygen availability. Different combinations of surface area and membrane thickness provides for an advantageous GOx loading.

The raw electrochemical signal received from the working electrode, in embodiments of the present specification, has the highest absolute current in nanoAmps (nA) that enables quick response time. In one example, a signal amplitude of 160 nA was recorded at the time if its manufacture. In one embodiment, the device operates in a range of 0.5 to 5 nA/mg/dL. In another embodiment, the device operates in a range of 0.5 to 2 nA/mg/dL. By way of example, in dividing the operational range by a surface area of the working electrode (12 mm$^2$), the device operates in a range of 8 picoA/mg/dL*mm$^2$ to 800 picoA/mg/dL*mm$^2$, at glucose levels ranging from 40 to 400 mg/dL; preferably in a range of 20 picoA/mg/dL*mm$^2$ to 600 picoA/mg/dL*mm$^2$, at glucose levels ranging from 40 to 400 mg/dL; and still preferably in a range of 40 picoA/mg/dL*mm$^2$ to 400 picoA/mg/dL*mm$^2$, at glucose levels ranging from 40 to 400 mg/dL.

FIG. 5C is a graph illustrating time (in seconds) along an x-axis against a current response (in nA) along a y-axis received from the WE, calculated at 0 months of activation of the glucose sensor in accordance with some embodiments of the present specification. FIG. 5D is a graph illustrating time (in seconds) along an x-axis against a current response (in nA) along a y-axis received from the WE, calculated at 12 months of activation of the glucose sensor in accordance with some embodiments of the present specification. The time delay between when the change in the glucose level of the biological host occurs and when the WE generates a different current in response to the change is no more than 1 minute during the first year of operation, and preferably no more than 2 minutes after the first year of operation. FIG. 5E is a graph illustrating time (in seconds) along an x-axis against a current response (in nA) along a y-axis received from the WE, calculated at 24 months of activation of the glucose sensor in accordance with some embodiments of the present specification. FIG. 5F is a graph illustrating time (in seconds) along an x-axis against a current response (in nA) along a y-axis received from the WE, calculated at 36 months of activation of the glucose sensor in accordance with some embodiments of the present specification. The graphs of FIGS. 5C to 5F illustrate simulated current in response to sequential glucose steps at 0, 12, 24, and 36 months of activation of the glucose sensor, where activation indicates a simulated implanted life. All sensor designs used for the simulations comprised a 33 microns thick enzyme layer, 4.9% GOx concentration, for each GLM thickness as indicated. Each graph illustrates the current response received from the WE for different GLM thicknesses, including thicknesses of approximately 13.5 microns, and 24.2 microns. In some embodiments, GLM thickness of approximately 13.5 micron is preferred.

Sensor delay, also referred to as T90, refers to the time the sensor takes to adjust its measured raw signal versus the actual change in signal. For example, when a sensor is tested in vitro, glucose is added to the solution within which the sensor is places, and the concentration of glucose is changed from 80 mg/dL to 160 mg/dL. The sensor's raw signal in nA at 80 mg/dL does not instantaneously change but instead rises exponentially to a new steady state nA value. The time that the sensor raw nA increases to 90% of its steady state value is called T90, or time delay. References to time delay made throughout this specification are performed at a glucose step change from 80 mg/dL to 160 mg/dL in PBS maintained at 37C+/−1C. FIG. 7D illustrates an example output of a glucose sensor of the present specification, tested within phosphate buffered saline (PBS), with a pH of 7.4, at a temperature of 37° C. In the graph, x-axis 724 illustrates the time spent within the experiment (in seconds), and a y-axis 726 represents the generated current (in nA). The graph shows glucose steps (y-axis) at 0, 10, 20, 40, 80, 160, and 320 mg/dL glucose.

Figure 6:
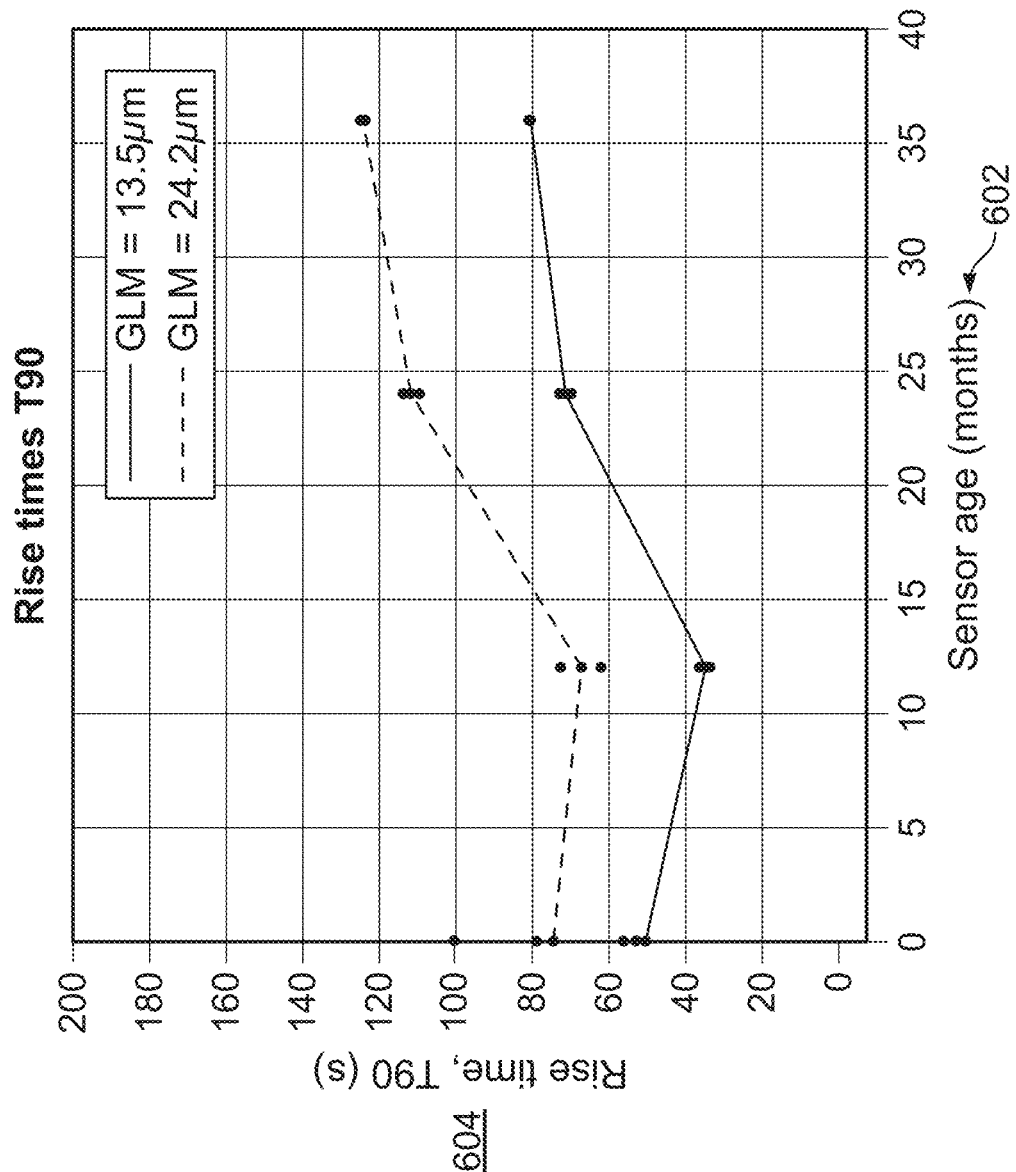
FIG. 6 is a graph illustrating sensor age (months) versus rise time (in seconds) for different GLM thicknesses.

FIG. 6 is a graph illustrating sensor rise times (in seconds) for different GLM thicknesses, plotted for sensor age (in months) 602 along an x-axis against rise times (in seconds) 604 along a y-axis. Sensor rise times were determined from the time taken for the current to increase from 10% of the initial current baseline to 90% of the new steady state current. The graph of FIG. 6 indicates that for all GLM thicknesses, the sensor rise time is below the acceptable threshold of 180 seconds and further shows that the rise time is not likely to be a limiting factor in selecting a preferred sensor design, such as including a preferred GLM thickness. Therefore, the time delay between when the change in the glucose level of the biological host occurs and when the WE generates the different current in response to the change is equal to a first time period at a beginning of the first year of operation. Further, the time between the change in the glucose level of the host and the WE's generation of the different current in response to the change is equal to a second time period after an end of the first year of operation. The second time period is no more than 10% greater than the first time period.

Figures 7A, 7B:
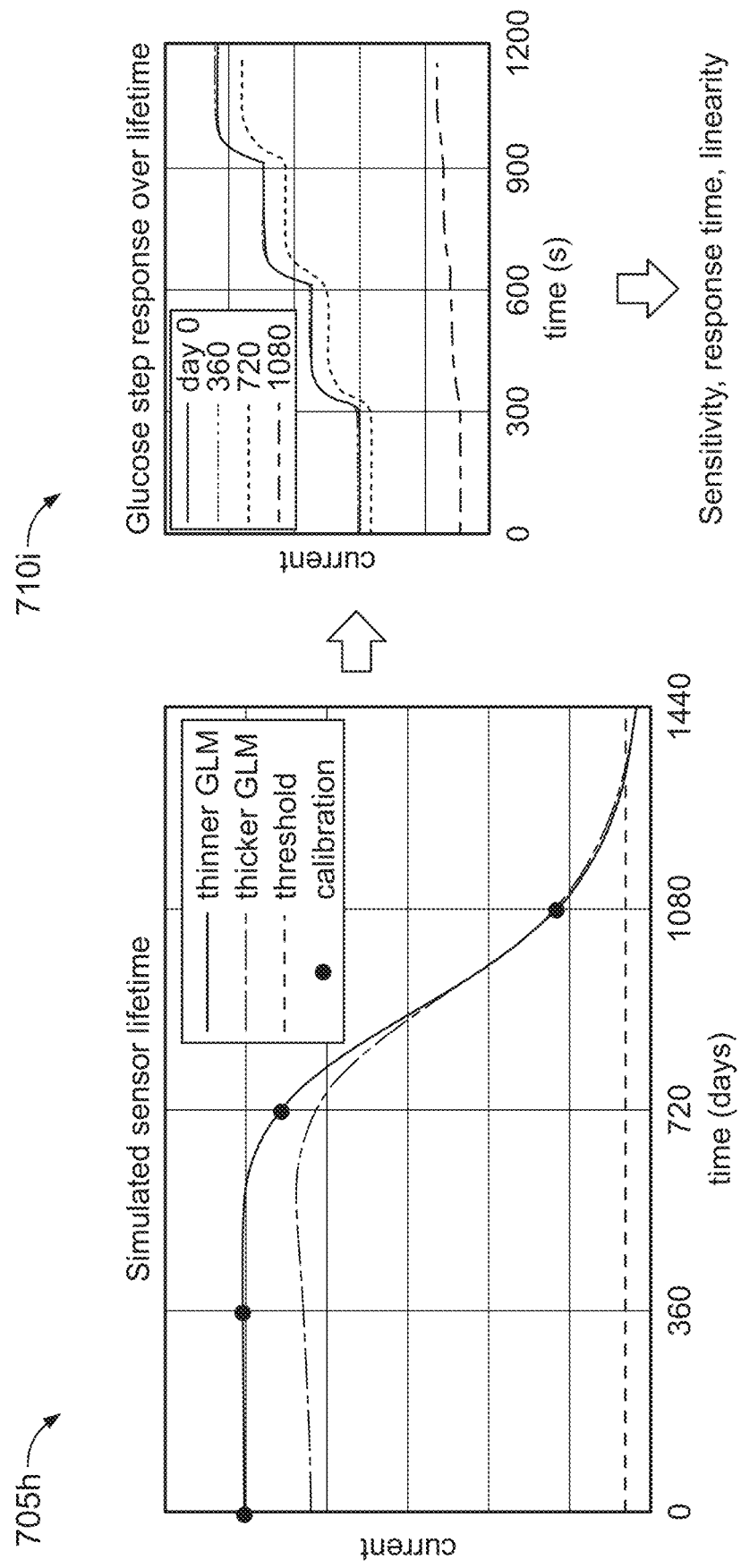
FIG. 7A is a graph showing a simulated lifetime of the glucose sensor of the present specification for different thicknesses of GLM layer.
FIG. 7B is a graph showing sensitivity, response time and linearity exhibited by the glucose sensor of the present specification.

FIG. 7A is a graph 705h illustrating a simulated lifetime of the glucose sensor of the present specification, for different thicknesses of GLM layer. In embodiments, the device of the present specification can achieve sensitivity levels ranging from 8 picoA/mg/dL*mm$^2$ to 800 picoA/mg/dL*mm$^2$, at glucose levels ranging from 40 to 400 mg/dL; preferably, ranging from 20 picoA/mg/dL*mm$^2$ to 600 picoA/mg/dL*mm$^2$, at glucose levels ranging from 40 to 400 mg/dL; and still preferably ranging from 40 picoA/mg/dL*mm$^2$ to 400 picoA/mg/dL*mm$^2$, at glucose levels ranging from 40 to 400 mg/dL. FIG. 7B is a graph 710i illustrating improved sensitivity, response time and linearity exhibited by embodiments of the glucose monitor of the present specification.

Sensor Calibration

Embodiments of the glucose sensor are calibrated in order to accurately determine a glucose concentration from a measured current. The current, therefore, is converted to a glucose concentration via a calibration factor or set of calibration factors. The glucose sensor is preferably factory-calibrated at the time of manufacturing, so that the user does not need to provide any venous blood samples for glucose measurement for the purpose of calibrating the measured glucose sensor current to the actual blood glucose concentration. In some embodiments the monitoring device is configured for one-time user calibration that would occur post-implantation of the monitoring device. In the embodiment for one-time user calibration, the user (wearer/carrier) can provide calibrating blood glucose data from a standard single point measurement, such as for example using a traditional finger stick device and method, or from other percutaneous continuous glucose sensors. Either technique requires the user to record the data into a supporting application executed on a computing device such as a smartphone, which is used to process the recorded data and communicate the processed calibration factors to the implanted electronics assembly of the monitoring device. In some cases, a physician performs the one-time calibration in a clinic environment using an intravenous measurement technique. The physician may also manipulate the user's blood glucose levels by requiring a standard oral glucose tolerance test or a similar method. In some embodiments, an algorithm is employed to predict any glucose sensor output degradation or variability over time and adjust the estimated glucose values accordingly.

The enzymatic decay rates for the sensor are well known as an exponential decay rate. Referring to FIG. 5B, for approximately the first two years, there is no significant change in current output corresponding to 200 mg/dL. Up to the stated time-period of approximately two years, the enzyme is still present in excess but tends to decay exponentially after that. The results described herein are also observed by comparing the signal output at the WE shown in the graphs of FIGS. 5C to 5F. The decay rate changes the calibration over time. Further, the formulation of the GLM layer can be made to keep the sensor output relatively flat (no loss in sensitivity of membrane) until the excess enzyme is used. Given the duration of the implant of the glucose sensor, a moving average of glucose values (daily, weekly, or any other period) may be monitored. Upon a change in sensor response output, the user may be prompted to check the glucose sensor output (mg/dL or mM) against a conventional BGM. Thus, if a change is detected in characteristics, such as the moving average, the slope, and relative maximum or minimum values that may be due to a meal or an insulin injection, and the change that is detected deviates outside of confidence (such as 90% confidence) that this is a typical occurrence, then the user is prompted to check the glucose sensor output. An algorithm is configured to receive that information from the user and determine whether a change in calibration factor is required. If required, the user is prompted in accordance with an appropriate calibration procedure. This process serves to detect any premature aging of the enzyme as well as any unexpected biofouling of the sensor (fouling of the sensor surface due to biological growth, vessel wall adherence). Likewise, any significant increase (greater than 15% of typical values or outside a 90% to 95% confidence) in sensor output (measured current) could be indicative of a potential fault in the sensor membrane (such as a tear, a pinhole, or any other fault). The user is alerted accordingly. Actions for all alerts eventually lead to a physician visit for further investigation.

Lead Substrate

In embodiments, the length of lead substrate used herein is much shorter than a pacing lead and much longer than that used in a conventional subcutaneous sensor. In some embodiments, a length of lead extending from its distal tip to its proximal end where the lead connects with a distal end of the electronics assembly may be up to 25 cm. In embodiments, the lead length is less than 25 centimeters (cm), less than 20 cm, less than 17 cm, less than 15 cm, or less than 10 cm. Further, the lead length is preferably less than or equal to 15 cm. Additionally, the length is at least one of: 2 cm, 3 cm, 4 cm, 5 cm, 6 cm, 7 cm, 8 cm, 9 cm, 10 cm, 15 cm, 20 cm, or 25 cm. A diameter of the lead can be in a range of 0.1 millimeters (mm) to 5 mm. In one example, a lead of at least 5cm is inserted into a blood vessel to position the sensor at a distance of 3 to 5 cm within the vessel. In different use case scenarios, the sensor is inserted up to a distance ranging from 2 cm to 15 cm within a vessel or fluid-filled lumen, and preferably 5 cm.

Colored bands, radiopaque markers, or any other form of indicia, are optionally provided on the body of the lead, which aid in placement and confirmation of placement distance of the sensor within the blood vessel. In an example, where a working electrode (WE), a reference electrode (RE) and a counter electrode (CE) are sequentially placed along the lead in a direction from a distal end to a proximal end, respectively, the optional markers on the lead can be configured at a distance of 1 to 12 cm from the proximal end of the CE. In another scenario, where the electrodes have a different configuration, such as where either the RE or the WE is moved from the sensor lead and placed in the electronics assembly, a marker can be configured at a distance of 1 to 3 cm from the proximal end of any one electrode (WE or RE) closest to the proximal connection end of the lead to the electronics assembly. The WE can function in a broad range of distances to the other electrodes (RE and CE) and the distances between the WE, CE, and RE can vary. The WE is typically placed the farthest from the electronics. The WE, RE, and CE, may be placed in a similar environment. In embodiments, the markers are formed of titanium dioxide, barium sulfate, or any other material that provide both visual indication and optionally also radiopacity. In some embodiments, multiple markers are provided. In an example, three markers are provided which provide resolution, counting, and/or measurement for device insertion.

Further, in an embodiment, the lead assembly is configured to be detachable from the electronics assembly at the proximal end of the lead assembly. The ability to detach the lead assembly allows for other devices to be attached to the electronics assembly, which is beneficial for other applications requiring placement of shorter/smaller sensors or sensors that need to be placed for a shorter duration. In different use-case scenarios, alternative embodiments of the lead assembly can be used. In some embodiments, a lead assembly of a different size may be used based on the application, such as for example a short-term ICU application or an in-hospital application (not ICU). Different electrode assembly-lead assembly kits for different applications will include leads/lead assemblies of different sizes. In some kits, different lead assembly configurations can be provided to allow interchangeability of the lead assembly, thus taking advantage of the detachability of the lead from the electronics assembly. Interchangeable lead assemblies can be of varying capabilities, including those with different analytes, such as for example a glucose sensor or a lactate sensor.

In embodiments, the lead substrate material is configured such that it can be submerged within the fluid in the lumen or within the fluid-filled lumen, such as a blood vessel or intravascular space in which it is to be placed without being physically attached to the wall of tissue. Specifically, when blood is flowing (pulsatile flow), as long as the force of the movement of blood is present, the device moves such that contact with the wall of the fluid-filled lumen is tangential and/or transient and minimized such that the contact-does not result in adhesion of the device, scarring, and/or tissue overgrowth onto the device. It should be noted that the transient and/or tangential contact with the lumen wall prevents device stagnation and embedding of the device within the fluid-filled lumen wall. In embodiments, "transient" contact may refer to contact that lasts only for a brief period of time, is temporary, and that does not last or endure and "tangential" contact may refer to a very small or minimal area of contact. Stated differently, the at least one electrode may "brush up" against the lumen during movement, but does not remain in place. Thus, the at least one electrode is positioned within the fluid-filled lumen such that the at least one electrode is able to move within the fluid-filled lumen while the surface area of the at least one electrode only makes minimal contact with the wall of the fluid-filled lumen. Any loss of amperage of the generated current at the electrode, resulting from physical contact with the wall of tissue does not exceed 20%. In other words, the extent of physical contact between the sensor and the wall of tissue is limited such that, during use within the fluid-filled lumen, no more than 20% of the surface area of the at least one electrode is obstructed by the lumen and a loss of flow of fluid around the at least one electrode that is circumscribed by the lumen is not more than 20%. Further, the loss of amperage of the current due to reduction in the unobstructed surface area of the at least electrode does not exceed 10%, 5%, 3%, 2%, or 1%. In embodiments, the density of the sensor lead material is such that it allows for movement within the fluid. Due to the high density of the conductive electrodes on the lead, additional measures may be taken in some embodiments to achieve this effect. Some examples of the additional measures may include use of glass beads or repositioning the CE away from the distal tip of the lead.

The flexibility of the lead substrate enables bending of the lead and otherwise reduces the influence of the electronics and battery body movement from the sensing location. Flexibility can be defined by flexural modulus. This is measured according to ASTM D790 and is in the range of 10 MPa to 2000 MPa for the lead substrate. Shore hardness is another material property that may be used to characterize the lead substrate. In embodiments, the lead substrate material according to Shore scale is in a range from as low as Shore A20 (soft silicones) to Shore D75 (harder polyurethane), and in theory, the length of the lead substrate impacts its flexural characteristics. In embodiments, in a lower flexibility range, the flexural modulus ranges from 250 MPa to about 2000 MPa, with a shore hardness ranging from D50 to D75. In embodiments, in a moderate flexibility range, the flexural modulus ranges from 50 MPa to about 1000 MPa, with a shore hardness ranging from A70 to D50. In embodiments, in a higher flexibility range, the flexural modulus ranges from 10 MPa to about 250 MPa, with a shore hardness ranging from A20 to A70. In some embodiments, the length of the lead is also dependent on the position of one or more electrodes, such as for example, if RE and/or CE are external to the vasculature, such as in the subcutaneous space, then the lead length within the vasculature may be shortened.

Centering Wire

In embodiments, a centering wire, which comprises a shape-memory material such as Nitinol, may be used to center the sensor tip inside the blood vessel. The centering wire threads down the central lumen of the lead and protrudes out of the distal end of the lead. The centering wire, similar to a guide wire for cardiac pacemakers or neurostimulation devices, changes its shape when warmed to body temperatures and provides a spiral, a hook, or a loop-like structure. The Nitinol structure is configured to keep the WE substantially centered within the blood vessel to enable unobstructed flow of blood around it and limit adherence of any portion of the lead assembly to the vessel wall due to user's movement, change in posture, or blood circulatory dynamics within the vessel. Further contact with blood vessel wall is such that, at any time, a length of the centering wire positioned in the fluid-filled lumen of the vessel is no more than 12 cm, preferably less than 6 cm, and more preferably less than 3 cm. Moreover, the diameter that is at least 10% less than the diameter of the vessel lumen ensures that no more than 35% of the overall Nitinol wire element is in contact with the vessel wall at any point in time. In some embodiments, the centering wire has a diameter that fits inside a central lumen (see central lumen 342 in FIG. 3C) of the lead having a diameter of approximately 0.457 mm. In some embodiments, the centering wire is placed within the vessel after placing the lead assembly.

Sensor Health & Longevity

Figure 7C:
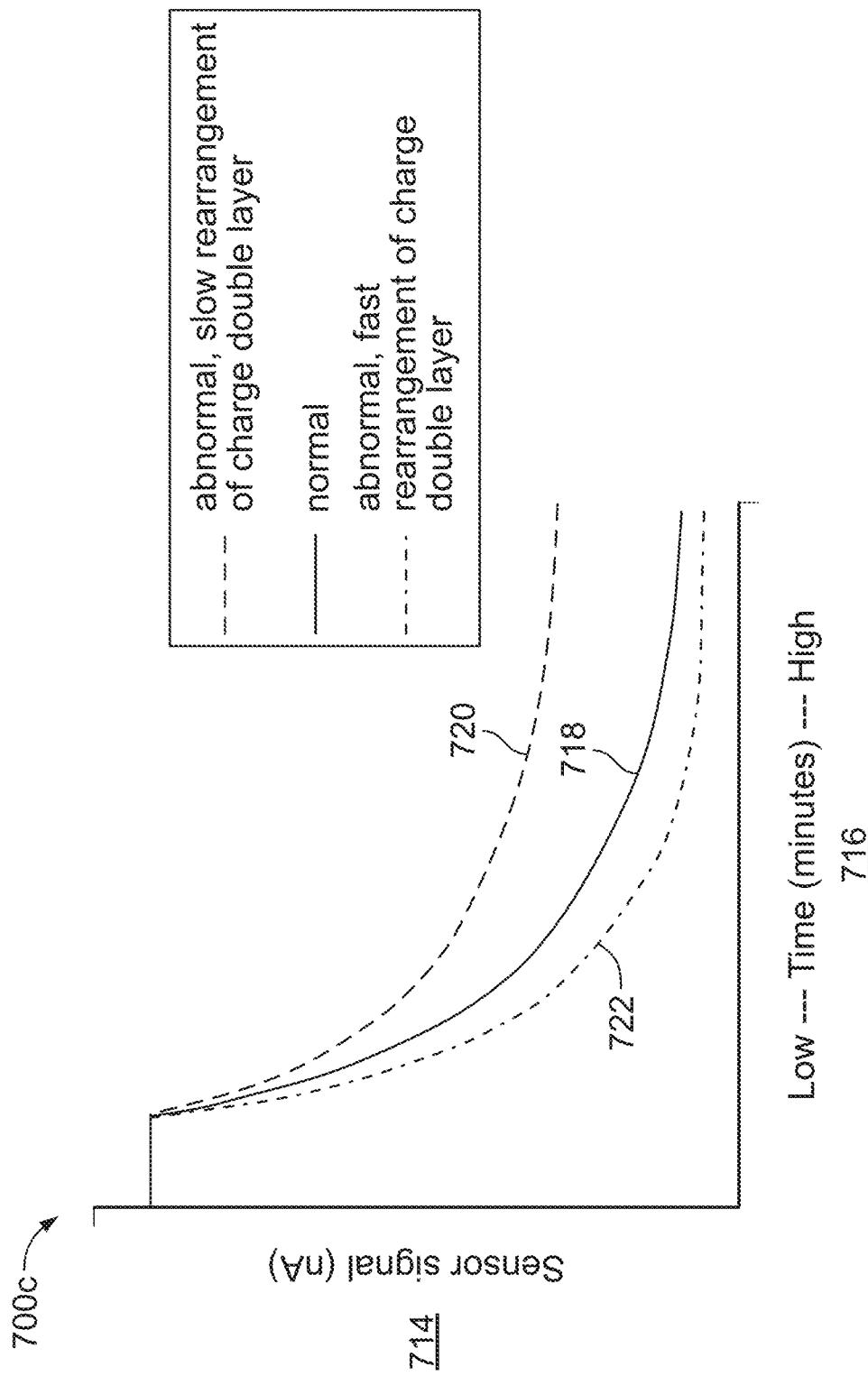
FIG. 7C is a graph illustrating the depletion in sensor current (measured in nA) over time, as measured in minutes.
Figure 7D:
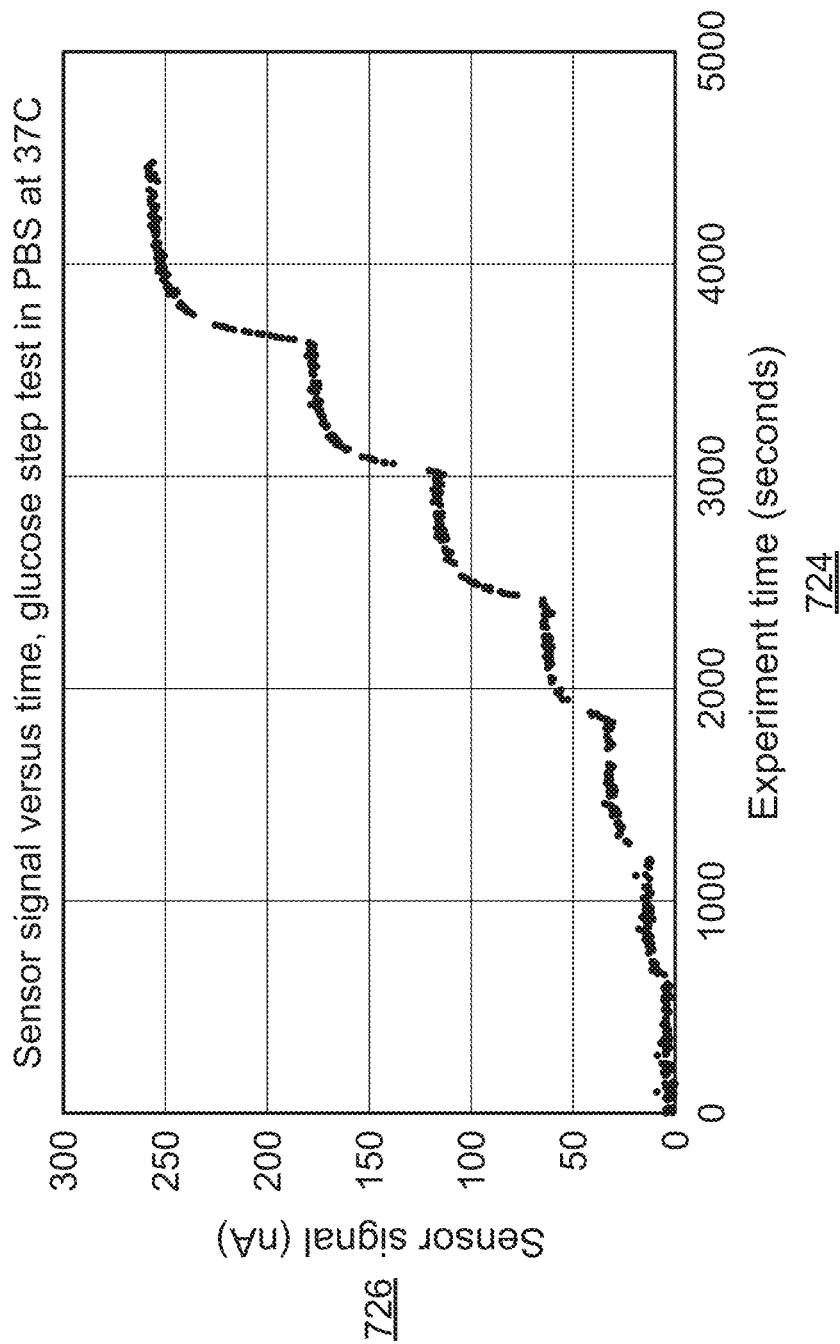
FIG. 7D is a graph illustrating a signal output of a glucose sensor of the present specification, in an embodiment, tested within phosphate buffered saline (PBS), with a pH of 7.4, at a temperature of 37° C.

When an electrode is first polarized (with a bias potential), a double layer of charges forms at its surface. This is impeded or slowed by the ionic diffusion through the glucose-limiting polymer membrane residing atop the electrode and directly deposited onto it. Throughout normal function, this polymer layer is the most significant contributor to the speed at which the double layer may form. FIG. 7C is a graph 700c illustrating the depletion in the raw sensor signal output (current, measured in nA) 714 over time (measured in minutes) 716. According to graph 700c, and shown by curve 718, the speed at which the double layer may form manifests itself in a current that settles over time and, once equilibrated, the sensor functions as intended.

Normally, the analog front-end circuitry of the electronics assembly is powered continuously, and the sensor is configured to read and/or measure its corresponding analyte for the life of the device. In the case where a fibrotic sheath forms over the sensor membrane, the movement of charges is slowed down. If, therefore, the analog front-end circuitry is powered off, then back on again, the decay constant of the double layer formation can be measured. The decay is slower if ions are impeded from entering into the membrane system, as shown by a curve 720. Alternatively, if the membrane is dislodged or bubbles up from the electrode surface, the decay might manifest itself in a faster rearrangement of ions and thus look similar to what is shown by a curve 722. The occasional power-off-then-on cycle is used by the device to occasionally assess the integrity of the local environment of the sensor within the blood vessel. This is achieved with a switch to completely turn off the analog front end of the electronics assembly. The switching off and on can be scheduled periodically to occur at any time or at a known 'quiet' time of the patient (such as during the patient's sleep). The restart process as described herein can also be triggered by sudden changes in sensor response or output that exceed some physiological threshold indicating some form of blockage of the glucose diffusion to the sensor.

Glucose Sensor Kit

In embodiments, a glucose sensor kit includes a combination of an introducer, a catheter, a lead assembly, an electronics assembly, a needle and a guide wire. Optionally, one or more known tunneling tools are added to the kit.

In one embodiment, the glucose sensor kit of the present specification includes at least: a lead assembly as described in this specification including a sleeve; a controller in an electronics assembly in accordance with the present specification; a micropuncture kit; a 035 J wire (generic-comes with sheath usually); 5 French sheaths; a scalpel such as, for example, a #14 blade-generic disposable scalpel; a blunt tunnelling instrument; and steri-strips.

Method of Implant

Various embodiments of the implantation methods or processes of the sensor in accordance with the present specification are now described. It should be noted that the implantation methods and embodiments described herein are by way of example only and not meant to be construed as limiting. Stated differently, the sensor embodiments of the present specification may be implanted by any means and in any location of the patient's body so long as it achieves the objectives of the present invention. In embodiments, the glucose monitor of the present specification, with at least a portion of the components provided in the kit can be implanted with the use of the following optional, additional equipment: an ultrasound machine with sterile cover for a probe; gown and gloves for the operator; a cleaning solution, for example solution by Duraprep; patient drape and towels; lidocaine 30 ml; syringes and needles; a small scalpel (#14 blade); weitlander, clamps, needle holder and pickups (165.1 mm blunt, 152.4 mm); 0 Ethibond suture; 0 and 4.0 Vicryl sutures; ⅛×3 inches steristrips, for example those by 3M; and an electrocautery or a plasmablade. It should be noted that the aforementioned list is not exhaustive and provided by way of example only. Any of the aforementioned equipment may be replaced with other equipment by the physician or clinician as necessary to achieve the objectives of the present specification.

Figure 8A:
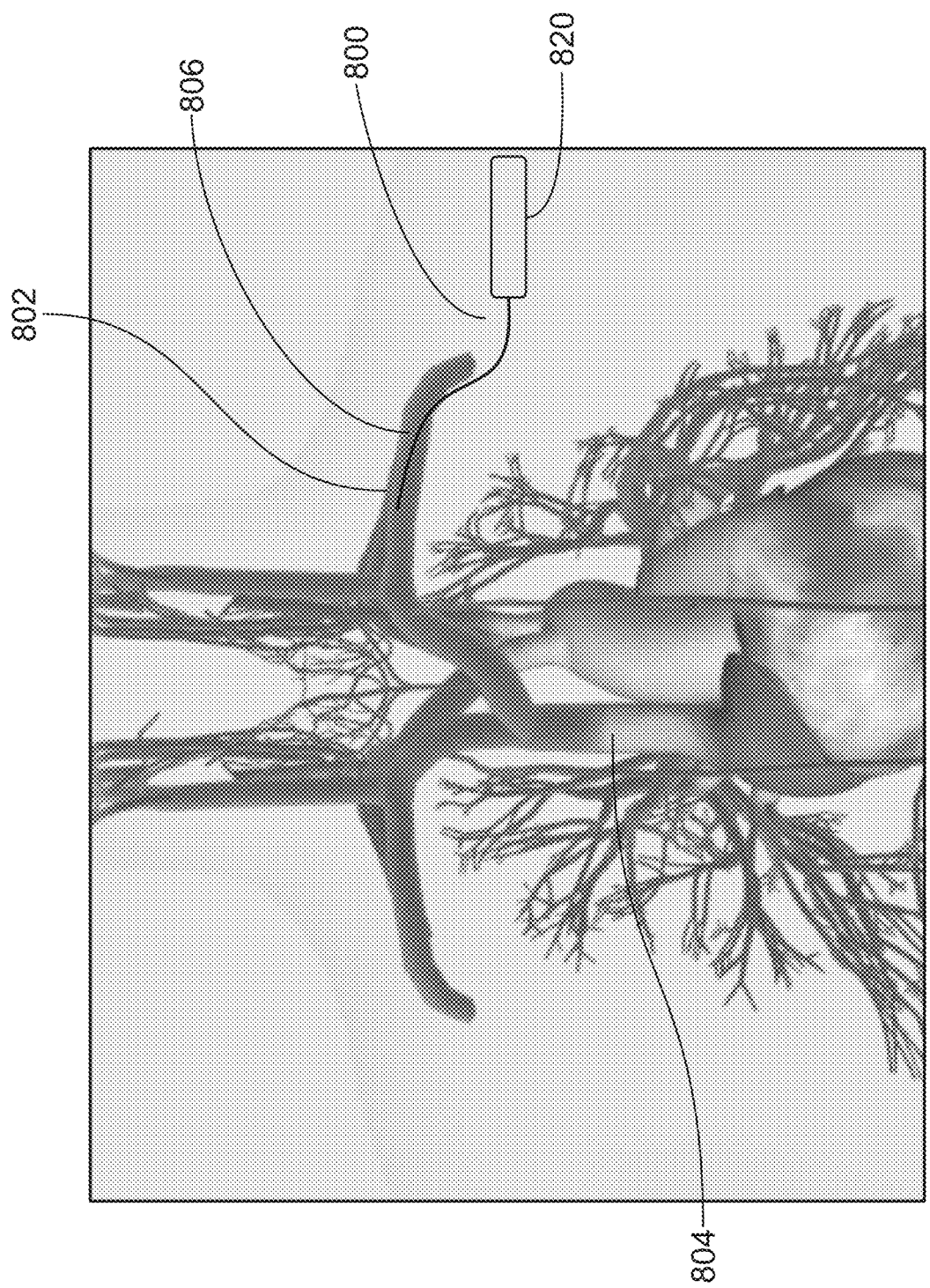
FIG. 8A is a pictorial, schematic representation of a placement of a glucose sensor lead assembly within a human anatomical structure, and in an embodiment, through a subclavian vein and extending prior to the subclavian/jugular vein juncture.

FIG. 8A illustrates a schematic of an exemplary placement of a lead assembly 800 (lead assembly 110 of FIG. 1) within a human anatomical structure, through a subclavian vein 802 all the way to the distal end of the superior vena cava 804. The glucose sensor lead assembly 800 is preferably designed so that it can be inserted at a vessel insertion point 806 through the subclavian vein 802 and subsequently resides in the subclavian vein 802. In some cases, it is preferred that the lead assembly 800 enters the subclavian vein 802 where it passes over a first rib near the rib's lateral border, so as to avoid the subclavian muscle and nearby ligament structures, or any other undue anatomical forces on the lead body that could lead to a fracture within the human anatomy. In some cases, lead assembly 800 is placed in the central venous system so that any potential clots resulting from the positioning and placement of assembly 800 travel to the lungs instead of the heart or brain. In embodiments, lead assembly 800 is placed in high blood-flow portions of the venous vasculature (not the peripheral vasculature) to prevent blood clotting. In embodiments, a length of lead assembly 800 is configured such that a distal end of lead assembly 800 does not go past the superior vena cava 804. Preferably, the glucose sensor lead assembly 800 is designed such that the distal end of the lead assembly 800 does not go past the junction with the internal jugular vein of the human anatomy.

Figure 8B:
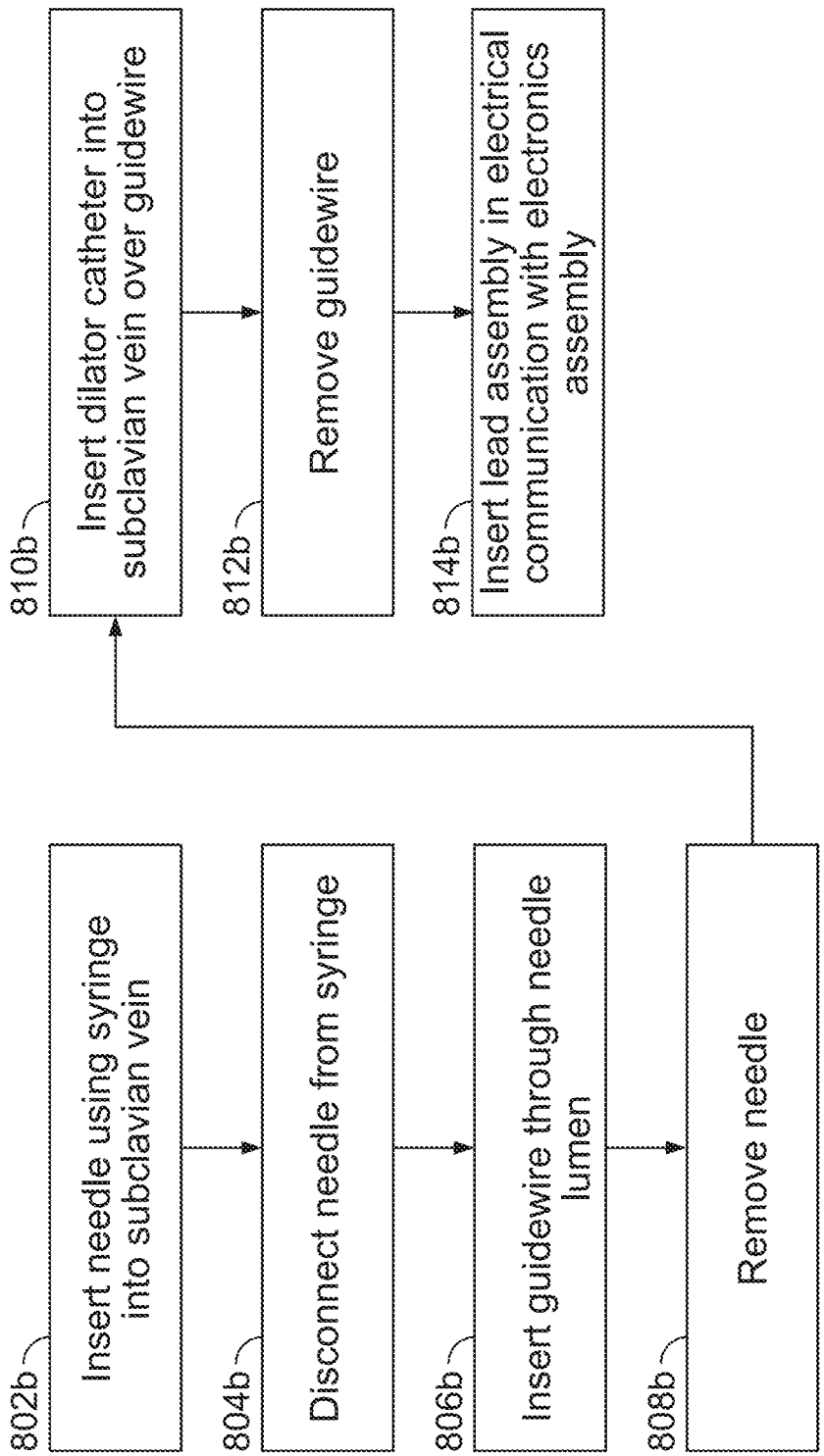
FIG. 8B illustrates an exemplary process of placing a glucose sensor lead assembly within a patient, in accordance with some embodiments of the present specification.

FIG. 8B illustrates an exemplary process of inserting and/or implanting the lead assembly 800 in accordance with some embodiments of the present specification. The insertion technique for the lead assembly 800 can be accomplished via a multi-step process that may or may not be guided by other medical diagnostic tools (such as ultrasound). The insertion technique begins at step 802b with a syringe needle puncture into the subclavian vein 802 by holding the syringe needle parallel to the body and clavicle while inserting it under the clavicle. The needle insertion position is approximately at the level of the top of the manubrium and about two-thirds distal of that just beyond the clavicle. Once blood has entered the syringe, the needle is properly placed in the subclavian vein 802. At step 804b, the syringe is then disconnected from the needle while holding the needle in its position. At step 806b, a guide wire is inserted through the lumen of the needle and then the needle is extracted at step 808b. An incision of approximately 1 to 2 centimeter (cm) is made to facilitate the entry of a dilator catheter and eventually the lead assembly 800. At step 810b, the dilator catheter is inserted over the guide wire and into the subclavian vein 802, after which at step 812b, the guide wire is also removed. At step 814b, the lead assembly 800 is inserted through the dilator catheter until it is in the subclavian vein 802 at a sufficient depth. The depth of insertion of lead assembly 800 can be determined with visual indicators, such as markings (for example, cm markings), on the guidewire, the dilator catheter, and lead assembly 800. Once inserted, a portion of proximal end of the lead assembly 800 is positioned to temporarily remain outside the human body. A tunneling tube is used to create a subcutaneous pocket for electronics assembly 820 so that the pocket is created beginning at the incision made earlier at a depth of 1 to 2 cm. The lead assembly 800 is connected to the electronics assembly 820 at the proximal end of the lead assembly 800. The electronics assembly 820 is inserted into the subcutaneous pocket, thus making the entire glucose sensor, including lead assembly 800 and electronics assembly 820, implanted within the human anatomy. The incision is subsequently closed using sutures, suture tape, or suture glue.

In embodiments, the continuous glucose monitor (CGM) of the present specification can be implanted anywhere in a patient's body as long as the site of implantation provides ease of access and the intravascular vein or vessel has a size that is sufficiently large to accommodate the dimensions of the CGM device of the present specification. In some cases, the continuous glucose sensor of the present specification is positioned within the central venous vasculature through the subclavian vein and superior vena cava as illustrated in FIG. 8A. In some other cases, the continuous glucose sensor of the present specification is positioned within the peripheral venous vasculature, such as through arms or legs, or in an epidural space. In the case of peripheral venous vasculature, sufficient mechanisms are included in the configuration of the glucose sensor device to prevent clotting. In an embodiment, a heparin coating is used with the sensor device to prevent clotting. In other embodiments, the continuous glucose sensor of the present specification is positioned within the spinal column or epidural space to measure glucose levels in the cerebrospinal fluid.

Figure 9:
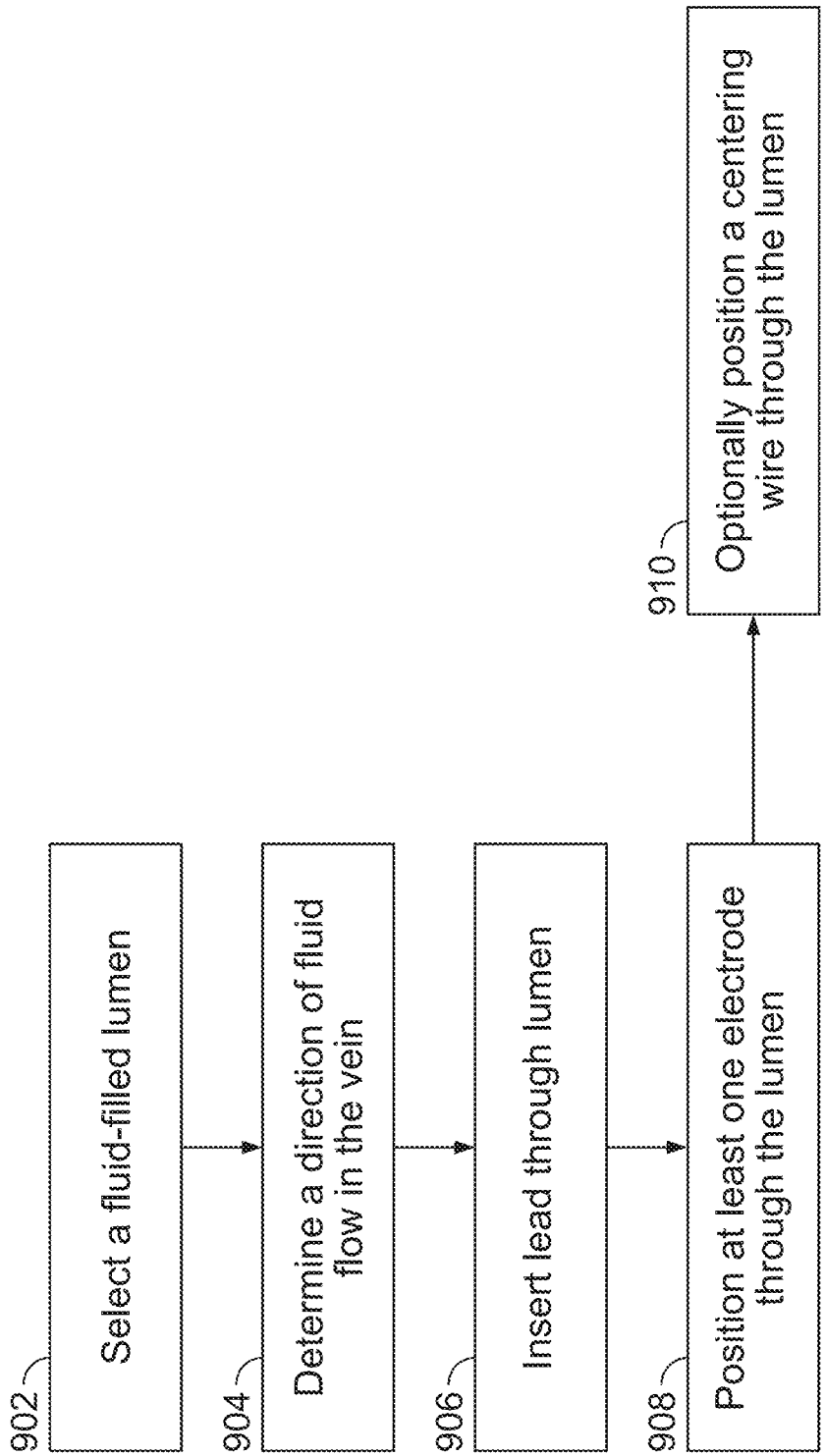
FIG. 9 is a flow chart detailing a method of implanting a glucose sensor adapted to sense a glucose level of a host within a fluid-filled lumen of the host.

FIG. 9 is a flow chart detailing an exemplary method of implanting the glucose sensor of the present specification, adapted to sense a glucose level of a host within a fluid-filled lumen of the host. At step 902, a fluid-filled lumen is selected, where the fluid-filled lumen is a vein having a minimum flow rate of 200 mL/minute and a minimum cross-section of 0.7 cm that is located a minimum distance of 6 cm from a branching point. At step 904, a direction of fluid flow in the vein is determined. At step 906, a lead is passed through a wall of the fluid-filled lumen. At step 908, at least one electrode, formed on or coupled with the lead, is positioned within the fluid-filled lumen such that the electrode is able to move within the fluid-filled lumen while the surface area of the electrode only makes transient contact, minimal or tangential contact, or no contact at all with the wall of the fluid-filled lumen and such that the proximal end of the at least one electrode points in the direction of flow. At an optional step 910, the method includes passing a centering wire through a lumen of the lead.

Figure 10:
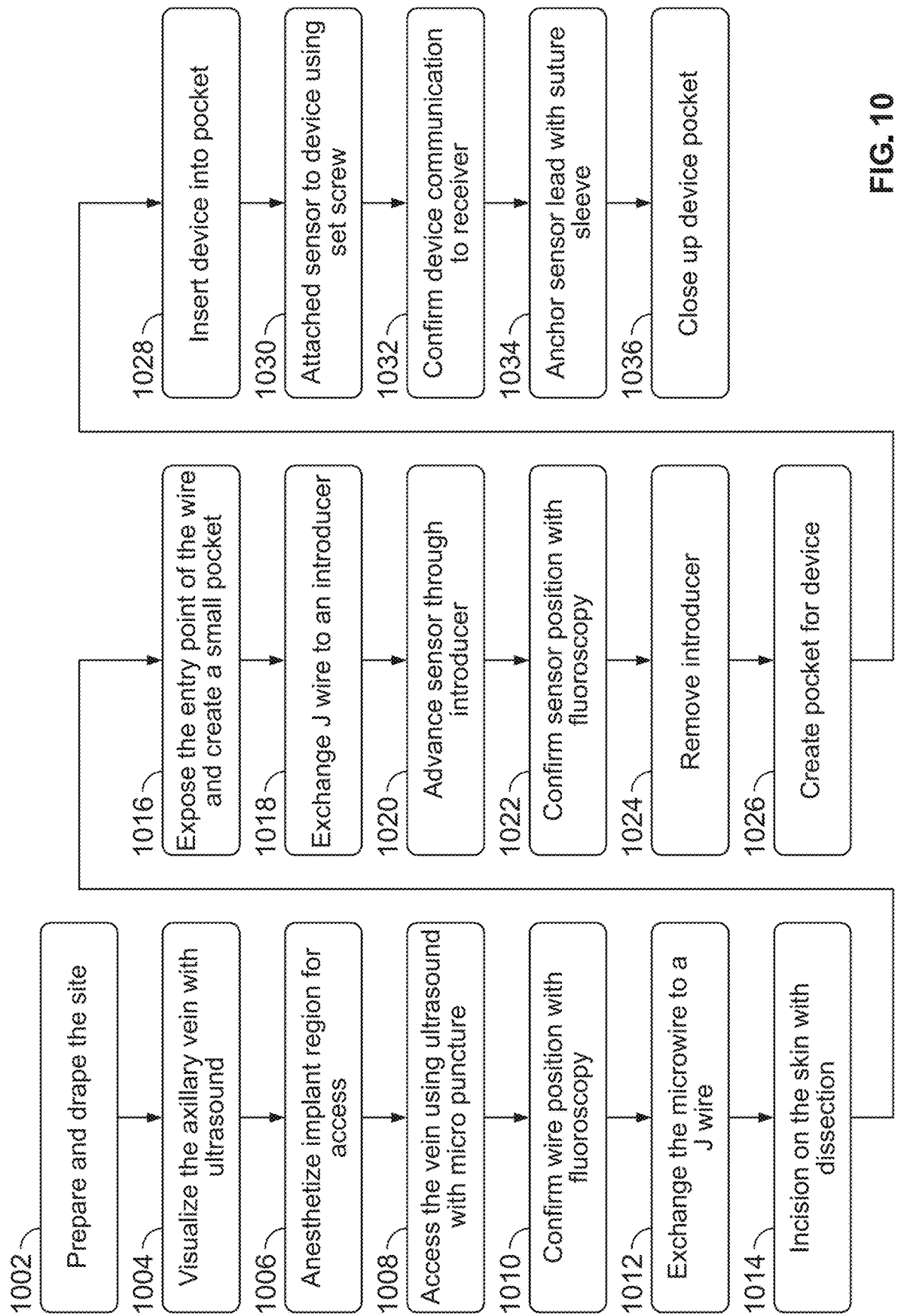
FIG. 10 is a flow diagram describing an exemplary process of accessing an axillary vein for implant of the glucose sensor in accordance with embodiments of the present specification.

FIG. 10 illustrates an exemplary process of accessing an axillary vein for implant of the glucose sensor in accordance with embodiments of the present specification. At step 1002, a venous access site is prepared and draped. At step 1004, the axillary vein is visualized using ultrasound. A linear ultrasound probe can be used. If the site of implantation is the internal jugular vein, then the ideal position for the vein, for the purpose of implantation, is when the vein is laterally displaced from the common carotid artery. The ultrasound probe is used to scan up and down the neck to find an optimal view and ensure that the vein is anterior and lateral to the artery. The ultrasound visualization is also performed to confirm the vein's patency and rule out the presence of a thrombus in the vein.

At step 1006, the implant region is anesthetized for access. At step 1008, the vein is accessed, while using ultrasound visualization, with a micro puncture and insertion of a microwire preferably centrally under the ultrasound probe for optimal visualization. At step 1010, the wire position is determined/confirmed with fluoroscopy. At step 1012, the microwire is changed to a J configuration of the wire. At step 1014, dissection is performed to create an incision on the skin. At step 1016, the entry point of the wire is exposed and a small pocket is created. At step 1018, the J wire is replaced with an introducer needle. At step 1020, the glucose sensor of the present specification is advanced through the introducer. At step 1022, the position of the inserted sensor is confirmed using fluoroscopy. At step 1024, the introducer is removed from the access site. At step 1026, a pocket is created at the access site for electronics assembly. At step 1028, the electronics assembly is inserted into the pocket created at step 1026. At step 1030, a set screw is used to attach the electronics assembly to the lead assembly of the sensor. At step 1032, communication between the electronics assembly and a receiver configured to receive sensor signals through the electronics assembly, are established and confirmed. At step 1034, the lead assembly is anchored inside the accessed vein with a suture sleeve. At step 1036, the pocket created for the electronics assembly is closed using sutures, or any other method of closing a skin incision.

As described below, the sensor and the various components described in the present specification include key functionalities due to the unique combination of dimensions, thicknesses, flexibility, Shore hardness, materials used, and positioning of certain elements. The key functionalities include, but are not limited to stable sensor output, the length of functional lifetime (sensor longevity), reduction or avoidance of loss of signal that occurs with contact with the lumen wall (a favorable signal-to-noise ratio), degree of flexibility of the leads, reduction in decay due to enzyme build-up, sensor accuracy, decreased diffusion time, and minimal turbulence, among other key benefits as described herein. Therefore, the use and combination of these parameters should not be construed as mere design choices and, rather, should be accorded patentable weight. It should also be noted that the various components described herein may be used with any other component as described herein, in any combination or order, even if not described with respect to certain embodiments. Further, it should be noted that the various parameters described herein may apply without restriction to the embodiments in which they are described. Therefore, the components and parameters described throughout this specification are interchangeable and may be combined to achieve the objectives of the present invention and not limited to the specific embodiments.

In embodiments, the sensor of the present specification is adapted to be at least partially positioned within a fluid-filled lumen, vein or epidural space of a host and configured to sense a glucose level of the host. In embodiments, the glucose sensor of the present specification is configured to operate continuously when positioned at least partially within a fluid-filled lumen, vein or the epidural space for at least one year without recharging. In embodiments, the sensors of the present specification include analog front end circuitry and digital circuitry. At least one electrode is provided with the sensor, which is configured to be fully positioned within the vein or the epidural space. A lead (or contacts positioned thereupon) is in electrical communication with the electrode(s). Further, an electronics assembly is in electrical communication with the lead assembly. The electronics assembly includes a potentiostat that is in electrical communication with the lead assembly. In some embodiments, each electrode is in electrical communication with a corresponding potentiostat. The potentiostat is configured to apply a continuous bias potential to signals received via the lead assembly. In embodiments, the digital circuitry (or subassembly) is also configured within the electronics assembly to receive the signals from the potentiostat and to adaptively apply a gain to said signals.

Figure 11:
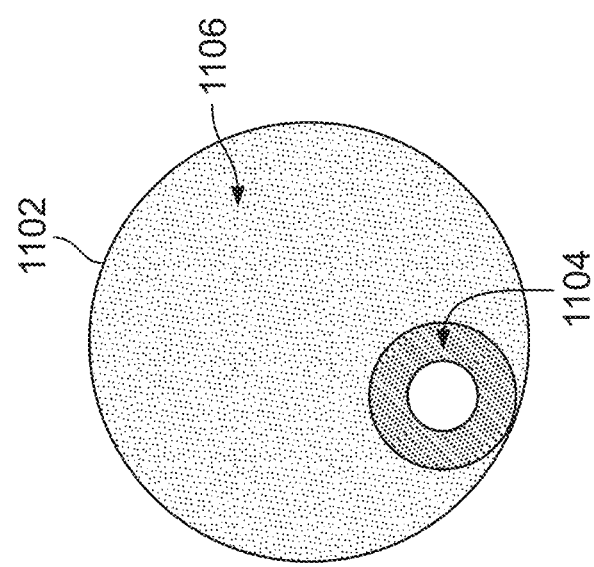
FIG. 11 illustrates a cross-sectional view of a vessel or lumen within which a lead assembly of a sensor is positioned, in accordance with the embodiments of the present specification.

In embodiments, the sensors of the present specification are designed such that they are not prone to brownouts. Brownouts are signal losses that are caused by a buildup of encapsulation tissue against the electrode region's surface (specifically, against the surface of the WE). In embodiments, brownouts or signal losses result when transient contact of the surface of the electrode with the vessel wall is less than 30%, less than 20%, less than 10%, less than 5%, less than 4%, less than 35, less than 2%, or less than 1%. FIG. 11 is a cross-sectional view of a vessel or lumen 1102 within which a concentric lead assembly 1104 is shown, in accordance with the embodiments of the present specification. In embodiments, the term "cross-sectional area" is used to refer to the area that is defined by the sensor or vessel as seen in a plane that is perpendicular (at a 90-degree angle) to the longitudinal axis of the vessel. In embodiments, the cross-sectional area may also refer to the area defined by an exterior periphery of a cross-sectional slice of the sensor or vessel taken at the thickest point of the sensor or vessel, which may also be the point of the sensor or vessel having the largest diameter. In the case of a vessel, the cross-sectional area is defined by an exterior periphery of a cross-sectional slice of the internal area of the vessel through which blood flows and is typically circular in arteries and veins.

The figure illustrates a gap or space 1106 surrounding lead assembly 1104, within a wall of lumen 1102. In embodiments, the sensors of the present specification can be positioned in any blood vessel where a cross-sectional area of the sensor does not occupy more than 0.4% to 10% of the cross-sectional area of the vessel, and preferably 1% to 3% of the cross-sectional area of the vessel. In still other embodiments, the sensors of the present specification can be positioned in any blood vessel where a cross-sectional area of the sensor does not occupy more than 10% of a cross-sectional area of a vessel in which it is positioned, and preferably no more than 3% of the cross-sectional area of the vessel. In embodiments, a diameter of the sensor is in a range from 0.5 mm to 3.0 mm and is approximately 1.3 mm in a preferred embodiment. In still other embodiments, the lead assembly of the present specification can be positioned in any blood vessel or lumen where the lead assembly of the sensor does not occupy more than 40% of the vessel in which it is positioned, and preferably only occupies a volume in a range of 10-15% of the vessel volume. In an embodiment, tangential contact of the lead assembly 1104 (and therefore the WE) is no more than 20% of the (surface area of the working electrode) with a wall of the fluid-filled lumen (lumen 1102), which results in a greater than 10% signal decrease relative to the remaining sensor surface area.

The glucose sensors of the present specification are adapted to be at least partially positioned in a fluid-filled lumen within a host and are configured to sense a glucose level of the host, where the lumen is defined by a wall of tissue. The lead assembly of the sensor includes one or more electrodes having a density that is less than or equal to the fluid in the lumen. A membrane layer is positioned on the surface area of each electrode, wherein the membrane layer includes an enzyme layer and a glucose limiting layer. The lead assembly includes a lead substrate with a lumen and a degree of flexibility, wherein the degree of flexibility of the lead is at least one of a) a flex modulus in a range of 10 MPa to 2000 MPa or b) a shore hardness in a range of Shore A20 to Shore D75. In embodiments, in a lower flexibility range, the flexural modulus ranges from 250 MPa to about 2000 MPa, with a shore hardness ranging from D50 to D75. In embodiments, in a moderate flexibility range, the flexural modulus ranges from 50 MPa to about 1000 MPa, with a shore hardness ranging from A70 to D50. In embodiments, in a higher flexibility range, the flexural modulus ranges from 10 MPa to about 250 MPa, with a shore hardness ranging from A20 to A70. Additionally, a wire is adapted to pass through the lumen of the lead and position the electrode(s) in the fluid-filled lumen such that the at least one electrode moves within the fluid-filled lumen and is not in physical contact with wall of tissue.

It should be noted that a buildup of enzymes and any other particulates along the surface area of the electrode(s) over a period of time results in delay in sensing the signals (diffusion delay). In embodiments of the present specification, the generation of current does not experience a delay of more than 5 minutes over the life of the sensor. In embodiments of the present specification, generation of current does not experience a delay of more than 2 minutes over the life of the sensor. In embodiments of the present specification, the generation of current does not experience a delay of more than 1 minute during the first year of operation. In embodiments of the present specification, the generation of current does not experience a delay of more than 2 minutes during the first year of operation. In embodiments of the present specification, the generation of current does not experience a delay of more than 2 minutes during the second year of operation. In embodiments of the present specification, the generation of current does not experience a delay of more than 2 minutes during the third year of operation.

In embodiments, the lead assembly of glucose sensors of the present specification is adapted to be at least partially positioned within a vein or the epidural space of a host and configured to sense a glucose level of the host. One or more electrodes formed on or coupled with the lead substrate of the lead assembly and used in the sensor have a surface area in a range of 2 mm$^2$ to 30 mm$^2$. A membrane layer is positioned on the surface area of each electrode, wherein the membrane layer has a thickness in a range of 3 microns to 60 microns. Each electrode is configured to "move" such that the contact of the surface area of each electrode with a wall of a fluid-filled lumen or vessel is minimized. Upon initial operation within the host and referring to the current (in amperage) that is measured by the working electrode, the glucose sensor has a current amperage of at least 120 nA (at 200 mg/dL glucose) and an amperage decay rate is no greater than 50% over a one-year period, preferably no greater than 40% over a one-year period, and still preferably no greater than 10% to 20% over a one-year period. It should be noted that signal loss can be measured as a current, amperage, or a raw signal. Further, upon initial operation, a time duration between a change in the glucose level of the host and a detection of the change by the glucose sensor is equal to a first time period. Then, after one year of operation, the time between the change in the glucose level of the host and the detection of the change by the glucose sensor is equal to a second time period.

The location, geometry and profile of the various embodiments of the enzyme layer of the sensor of the present specification, which comprises glucose oxidase ion, minimizes turbulence. In embodiments, the glucose sensors of the present specification are adapted to be at least partially positioned in a fluid-filled lumen within a host and configured to sense a glucose level of the host, wherein the fluid-filled lumen is defined by a wall of tissue. The sensor includes a lead assembly which comprises a lead substrate with a lumen and a degree of flexibility, wherein the degree of flexibility of at least a portion of the lead substrate is at least one of a) a flex modulus in a range of 10 MPa to 2000 MPa or b) a shore hardness in a range of Shore A20 to Shore D75. The flexibility of the lead substrate is tested at its middle section (328 shown in FIG. 3B). In embodiments, in a lower flexibility range, the flexural modulus ranges from 250 MPa to about 2000 MPa, with a shore hardness ranging from D50 to D75. In embodiments, in a moderate flexibility range, the flexural modulus ranges from 50 MPa to about 1000 MPa, with a shore hardness ranging from A70 to D50. In embodiments, in a higher flexibility range, the flexural modulus ranges from 10 MPa to about 250 MPa, with a shore hardness ranging from A20 to A70.

In an embodiment, but not limited to such embodiment and by way of example only, Pellethane 75D is used for the lead substrate material, which has a flexural modulus of 1930 MPa (280K PSI) according to the ASTM D790 and a Shore hardness of Shore D75, as rated by the ASTM D2240.

One or more electrodes are formed on or coupled with the lead substrate of the lead assembly where each electrode has a surface area in a range of 2 mm$^2$ to 30 mm$^2$. Further, each sensor diameter is in a range of 10%-80% of a diameter of the fluid-filled lumen. In embodiments, the sensors of the present specification can be positioned in any fluid-filled lumen where a cross-sectional area of the sensor does not occupy more than 0.4% to 10% of the cross-sectional area of the lumen, and preferably 1% to 3% of the cross-sectional area of the lumen. In still other embodiments, the sensors of the present specification can be positioned in any fluid-filled lumen where a cross-sectional area of the sensor does not occupy more than 10% of a cross-sectional area of a lumen in which it is positioned, and preferably no more than 3% of the cross-sectional area of the lumen. In embodiments, a diameter of the sensor is in a range from 0.5 mm to 3.0 mm and is approximately 1.3 mm in a preferred embodiment At least one membrane layer is positioned on the surface area of the electrode(s). The membrane layer is made from glucose oxidase, and has a thickness, such that a ratio of the membrane layer thickness to the electrode diameter is in a range of 1:10 to 1:50. The glucose oxidase enzyme layer covers at least a portion of the working electrode surface area, and in some embodiments, may cover a portion of any adjacent portion of the sensor lead assembly such as the RE, CE, or any spacer. In embodiments, the glucose oxidase enzyme layer covers at least 50% of the working electrode surface area. In embodiments, the glucose oxidase enzyme layer covers up to 100% of the working electrode surface area. In embodiments, the glucose oxidase enzyme layer covers 100% of the working electrode surface area.

In some embodiments, the implantation method of the lead assembly of the sensor of the present specification, where the lead assembly has an approximate diameter of 1.3 mm, is limited only by vein placement within vein of a minimum cross-sectional diameter ranging from 7 mm to 12 mm, and preferably a minimum cross-sectional diameter of 10 mm. In embodiments, the sensor includes a lead assembly having one or more electrodes positioned on a lead substrate and an electronics assembly, which is couple to and in electrical communication with the lead assembly. A fluid-filled lumen is selected for positioning the lead assembly of the glucose sensor. The lumen is a vein having a minimum flow rate of 200 mL/minute and a minimum cross-section of 0.7 cm that is located at a minimum distance of 6 cm from the branching point. Subsequently, a direction of flow in the vein is determined. Arteries carry blood away from the heart and veins carry blood back to the heart. The lead assembly is passed through a wall of the lumen, whereby the electrode that is formed on or couple with the lead substrate is positioned within the fluid-filled lumen such that the electrode resides within the fluid-filled lumen with minimal contact to the wall of the lumen and such that a proximal end of the electrode points in the direction of flow. Further, a centering wire is passed through a lumen of the lead, which enables centering the lead inside the vein so that contact of the lead with the walls of the lumen is minimized.

In embodiments, the sensors of the present specification are adapted to be at least partially positioned in a fluid-filled lumen within a host and configured to sense a glucose level of the host. The glucose sensor includes a lead assembly having a proximal end and a distal end. A first electrode is formed on or coupled with a lead substrate of the lead assembly, wherein the first electrode is positioned within a range of 3 mm to 7 mm from a tip of the distal end of the lead assembly. A second electrode is positioned proximate to the first electrode and is in a range of 4 mm to 8 mm from the first electrode. A diameter of the lead assembly is in a range of 10% to 80% of a diameter of the fluid-filled lumen inside which it is positioned In embodiments, the sensors of the present specification can be positioned in any fluid-filled lumen where a cross-sectional area of the sensor does not occupy more than 0.4% to 10% of the cross-sectional area of the lumen, and preferably 1% to 3% of the cross-sectional area of the lumen. In still other embodiments, the sensors of the present specification can be positioned in any fluid-filled lumen where a cross-sectional area of the sensor does not occupy more than 10% of a cross-sectional area of a lumen in which it is positioned, and preferably no more than 3% of the cross-sectional area of the lumen. In embodiments, a diameter of the sensor is in a range from 0.5 mm to 3.0 mm and is approximately 1.3 mm in a preferred embodiment A distal end of the electronics assembly is attached, via a header interconnect, to the proximal end of the lead assembly and is configured to apply a voltage to the electrodes. In embodiments, a third electrode is optionally positioned apart from the distal end of the lead assembly comprising the first and the second electrodes and is integrated into at least one of the proximal portion of the lead or the electronics assembly. A second sensor may be configured to detect at least one of a heartbeat, an oscillation in blood flow, or a blood flow rate and generate first data thereof. In embodiments, the electronics assembly is configured to sample data from the second sensor. Additionally, the second sensor may be a pressure sensor integrated into at least one of the lead assembly or the electrode assembly.

In embodiments, the continuous glucose monitoring devices of the present specification provide sensors that use working electrodes coated with a glucose oxidase enzyme layer and glucose limiting membrane (GLM) layer. In embodiments, the CBGMs described throughout the present specification are designed and configured for implantation with a lifetime of more than 1.5 years, and preferably of more than 2 years and sometimes even more than 3 years. Accuracy of measurement and simplified calibration is supported by low noise during measurement using the sensor assembly of the present specification. Additionally, sensor embodiments of the present specification target reduced response times that are conventionally experienced in CGMs. In some embodiments the response time is reduced to less than 180 seconds. Over its lifetime, the CBGM of the present specification, displays less than 1% change in signal response to 20% variation in GLM layer thickness. The design embodiments of the present sensor assembly minimize sensor drift over its implanted lifetime.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. An enzymatic electrochemical glucose sensor adapted to be at least partially positioned within a fluid-filled lumen of a biological host and configured to generate data indicative of a glucose level of the biological host, comprising:
    a lead assembly configured to extend into said fluid-filled lumen, wherein the lead assembly comprises at least one electrode and a membrane positioned over the electrode and wherein the at least one electrode is configured to generate a current, and wherein the current is indicative of, and responsive to, the glucose level of the biological host; and,
    an electronics assembly, comprising a potentiostat and a digital subassembly, wherein the electronics assembly is configured to connect to a proximal end of the lead assembly and be in electrical communication with the at least one electrode, wherein the potentiostat is configured to apply a bias potential to generate the current at the lead assembly, to receive the current from the lead assembly, and to convert the current into an analog voltage signal, and wherein the digital subassembly is configured to receive the analog voltage signal from the potentiostat and to apply an adaptive gain to said analog voltage signal to generate an adaptive gain signal wherein the applied adaptive gain is based on changes to the current, and wherein the adaptive gain is increased by a first predetermined amount when the current falls below a first predetermined level over a first time period and is increased by a second predetermined amount when the current falls below a second predetermined level over a second time period.

2. The enzymatic electrochemical glucose sensor of claim 1, wherein the digital subassembly is configured to set the adaptive gain to a first value upon initiating operation of the glucose sensor at an end of a break-in period and wherein said first value is increased by the first predetermined amount when the current falls below the first predetermined level over the first time period.

3. The enzymatic electrochemical glucose sensor of claim 2, wherein the surface area of the at least one electrode is between 6 mm$^2$ to 14 mm$^2$.

4. The enzymatic electrochemical glucose sensor of claim 1, wherein an amperage of the current is in a range of 0.5 nA to 5 nA per milligrams per deciliter (mg/dL).

5. The enzymatic electrochemical glucose sensor of claim 2, wherein an amperage of the current is in a range of 42 pA to 420 pA per milligrams per deciliter (mg/dL) in a one mm$^2$ area of the surface of the at least one electrode.

6. The enzymatic electrochemical glucose sensor of claim 2, wherein the enzyme layer comprises glucose oxidase.

7. The enzymatic electrochemical glucose sensor of claim 2, wherein a ratio of a thickness of the membrane to a diameter of the at least one electrode is in a range of 1:10 to 1:50.

8. The enzymatic electrochemical glucose sensor of claim 7, wherein said ratio is in a range of 1:25 to 1:50.

9. The enzymatic electrochemical glucose sensor of claim 1, wherein the membrane has a thickness of at least 30 microns.

10. The enzymatic electrochemical glucose sensor of claim 2, wherein the membrane further comprises a glucose limiting membrane (GLM) layer, and wherein the GLM layer is positioned over the enzyme layer.

11. The enzymatic electrochemical glucose sensor of claim 10, wherein the membrane has a maximum thickness of 60 microns, and wherein the enzyme layer has a thickness of at least 30 microns and the GLM layer has a thickness of at least 10 microns.

12. The enzymatic electrochemical glucose sensor of claim 1, wherein, upon initial operation within the biological host, the current has an amperage of at least 120 nA at 200 mg/dL of glucose.

13. The enzymatic electrochemical glucose sensor of claim 1, wherein the digital subassembly is configured to set the adaptive gain to a first level upon initiating operation of the glucose sensor at an end of a break-in period and to increase the adaptive gain to a second level, wherein the second level is higher than the first level, based on said changes to the current.

* * * * *